(12) United States Patent
Yanko et al.

(10) Patent No.: US 10,719,670 B2
(45) Date of Patent: Jul. 21, 2020

(54) KEY ENTRY DEVICE

(71) Applicant: VeriFone, Inc., San Jose, CA (US)

(72) Inventors: Igal Yanko, Rocklin, CA (US); Mehran Mirkazemi-Moud, Rocklin, CA (US); Donald James Jones, Auburn, CA (US)

(73) Assignee: VeriFone, Inc., San Jose, CA (US)

( * ) Notice: Subject to any disclaimer, the term of this patent is extended or adjusted under 35 U.S.C. 154(b) by 188 days.

(21) Appl. No.: 15/754,785

(22) PCT Filed: Mar. 15, 2016

(86) PCT No.: PCT/IL2016/050282
§ 371 (c)(1),
(2) Date: Feb. 23, 2018

(87) PCT Pub. No.: WO2017/033175
PCT Pub. Date: Mar. 2, 2017

(65) Prior Publication Data
US 2018/0254155 A1    Sep. 6, 2018

(30) Foreign Application Priority Data
Aug. 25, 2015 (WO) .................. PCT/IL2015/050851

(51) Int. Cl.
*H01H 13/7065*    (2006.01)
*G06K 7/06*    (2006.01)
(Continued)

(52) U.S. Cl.
CPC ............. *G06K 7/065* (2013.01); *G06F 21/83* (2013.01); *G06F 21/86* (2013.01); *G06K 7/0013* (2013.01);
(Continued)

(58) Field of Classification Search
CPC .... G06K 7/065; G06K 7/0013; G06K 7/0021; G06K 19/07; G06F 21/86; G06F 1/1626;
(Continued)

(56) References Cited

U.S. PATENT DOCUMENTS

| 2001/0048379 A1 | 12/2001 | Kaikuranta et al. |
| 2006/0042923 A1 | 3/2006 | De Richecour et al. |

(Continued)

FOREIGN PATENT DOCUMENTS

| CN | 101165702 | 4/2008 |
| EP | 1780897 | 5/2007 |

(Continued)

OTHER PUBLICATIONS

PCT International Search Report, International Application No. PCT/IL16/50282, dated Aug. 22, 2016, pp. 1-4.
(Continued)

*Primary Examiner* — Edwin A. Leon
(74) *Attorney, Agent, or Firm* — Greenberg Traurig LLP

(57) ABSTRACT

A key entry device including a housing, a keypad array disposed within the housing and including a plurality of keys, a key contact array disposed within the housing below the keypad array and including a plurality of contact pairs, a dome array underlying the keypad array and the key contact array and including a plurality of domes, and a protrusion array underlying the dome array and including a plurality of protrusions, whereby depression of one of the plurality of keys of the keypad array causes a corresponding one of the domes of the dome array to be displaced downwardly and to be deformed by pushing engagement with a corresponding one of the protrusions of the protrusion array into contact with at least one of the contact pairs of the key contact array.

13 Claims, 43 Drawing Sheets

(51) Int. Cl.
*G06K 7/00* (2006.01)
*G06F 21/83* (2013.01)
*G06K 19/07* (2006.01)
*G06F 21/86* (2013.01)

(52) U.S. Cl.
CPC ........... *G06K 7/0021* (2013.01); *G06K 19/07* (2013.01); *H01H 13/7065* (2013.01); *H01H 2201/026* (2013.01); *H01H 2203/038* (2013.01); *H01H 2233/07* (2013.01); *H01H 2233/09* (2013.01); *Y04S 40/24* (2013.01)

(58) Field of Classification Search
CPC ...... G06F 1/1658; G06F 1/1684; G06F 3/023; G06F 21/83; G06F 3/0219; H01H 13/7065; H01H 2201/026; H01H 2203/038; H01H 2233/07; H01H 2233/09; Y04S 40/24; H04M 1/23
USPC ........................................................ 200/341
See application file for complete search history.

(56) References Cited

U.S. PATENT DOCUMENTS

| | | |
|---|---|---|
| 2007/0095910 A1 | 5/2007 | Gallagher et al. |
| 2008/0121706 A1 | 5/2008 | Defibaugh et al. |
| 2008/0164320 A1 | 7/2008 | Garrido-Gadea et al. |
| 2008/0180245 A1* | 7/2008 | Hsu .................. G06F 21/86 340/571 |
| 2009/0042433 A1 | 2/2009 | Bushby |
| 2009/0058628 A1* | 3/2009 | Kirmayer ............ G06Q 20/341 340/501 |
| 2009/0184850 A1 | 7/2009 | Schulz et al. |
| 2009/0200146 A1 | 8/2009 | Yoshihiro |
| 2011/0279279 A1 | 11/2011 | Mirkazemi-Moud et al. |
| 2012/0180140 A1 | 7/2012 | Barrowman et al. |
| 2013/0298252 A1 | 11/2013 | Ribeiro-Pereira |

FOREIGN PATENT DOCUMENTS

| | | |
|---|---|---|
| EP | 1986205 | 10/2008 |
| WO | WO 2010/082190 | 7/2010 |

OTHER PUBLICATIONS

Communication including Supplementary European Search Report, European Patent Office, European Patent Application No. 16838666.2, dated Mar. 13, 2019, pp. 1-8.
Notification of First Office Action, State Intellectual Property Office of PRC, dated Feb. 11, 2018, pp. 1-10 (includes English Translation).
European Communication, European Patent Application No. 15842040.6, dated May 3, 2018, pp. 1-6.
Communication received in corresponding EP Application No. 15 842 040.6, dated Feb. 28, 2019 (4 pages).

* cited by examiner

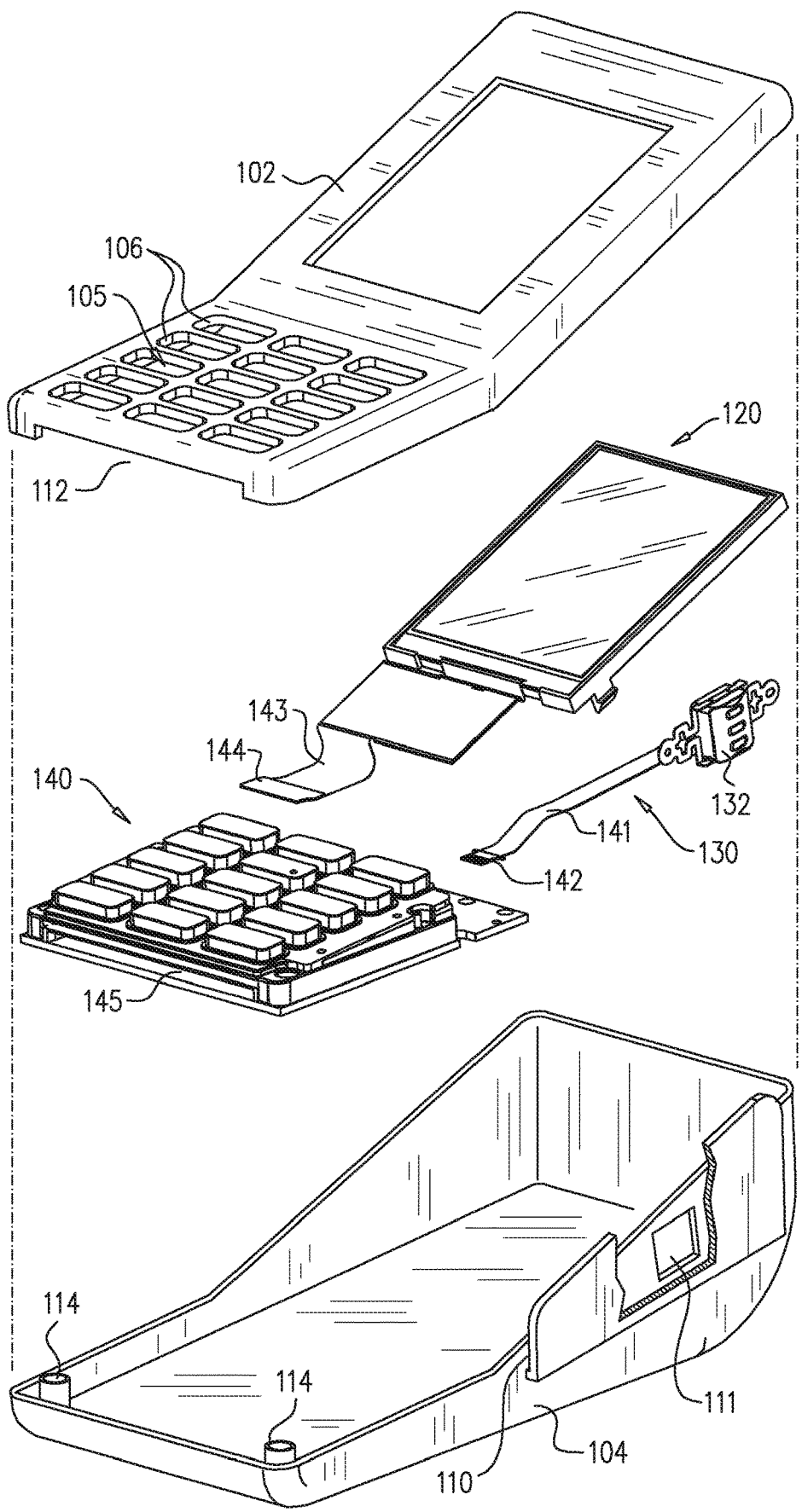

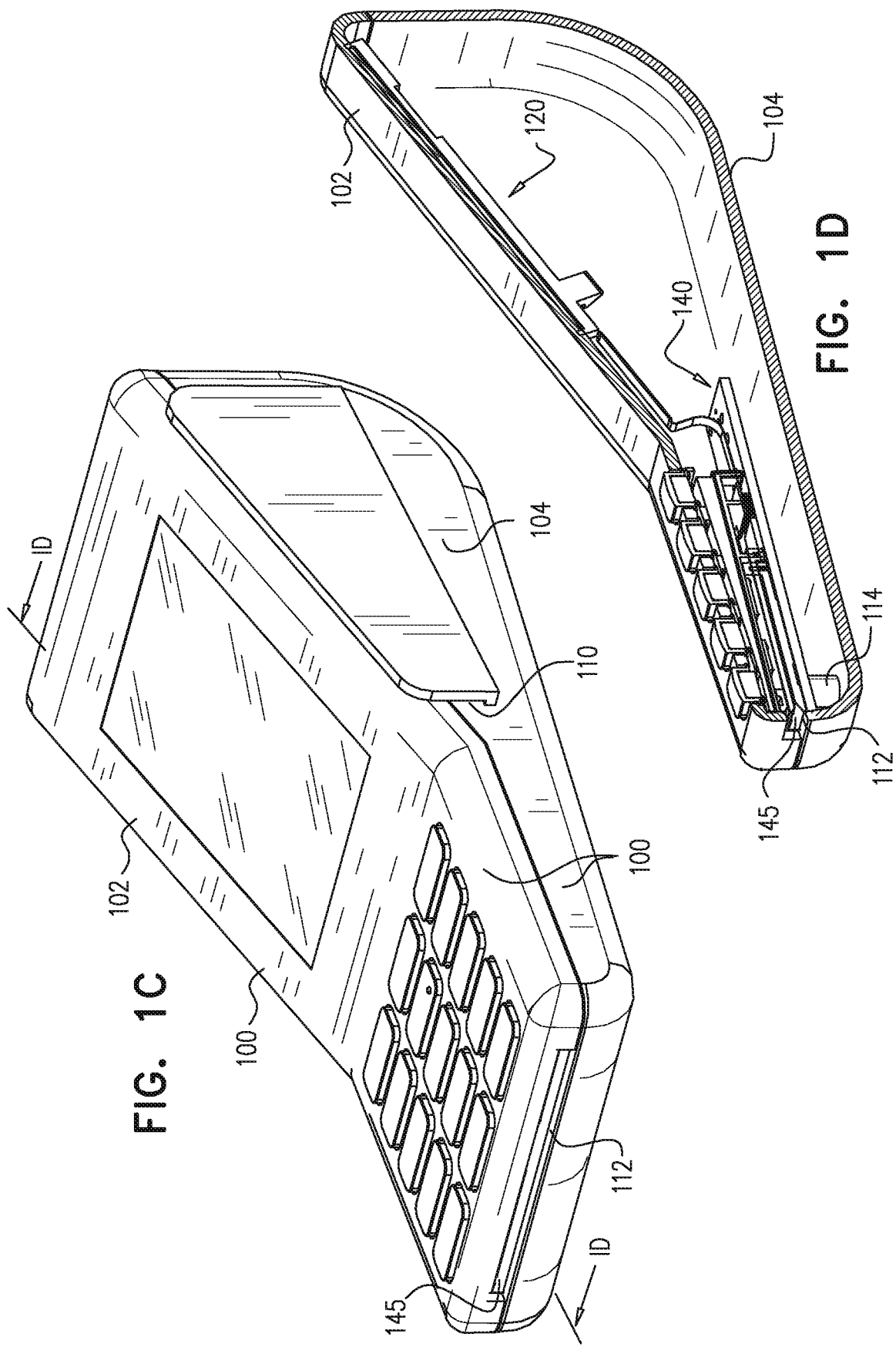

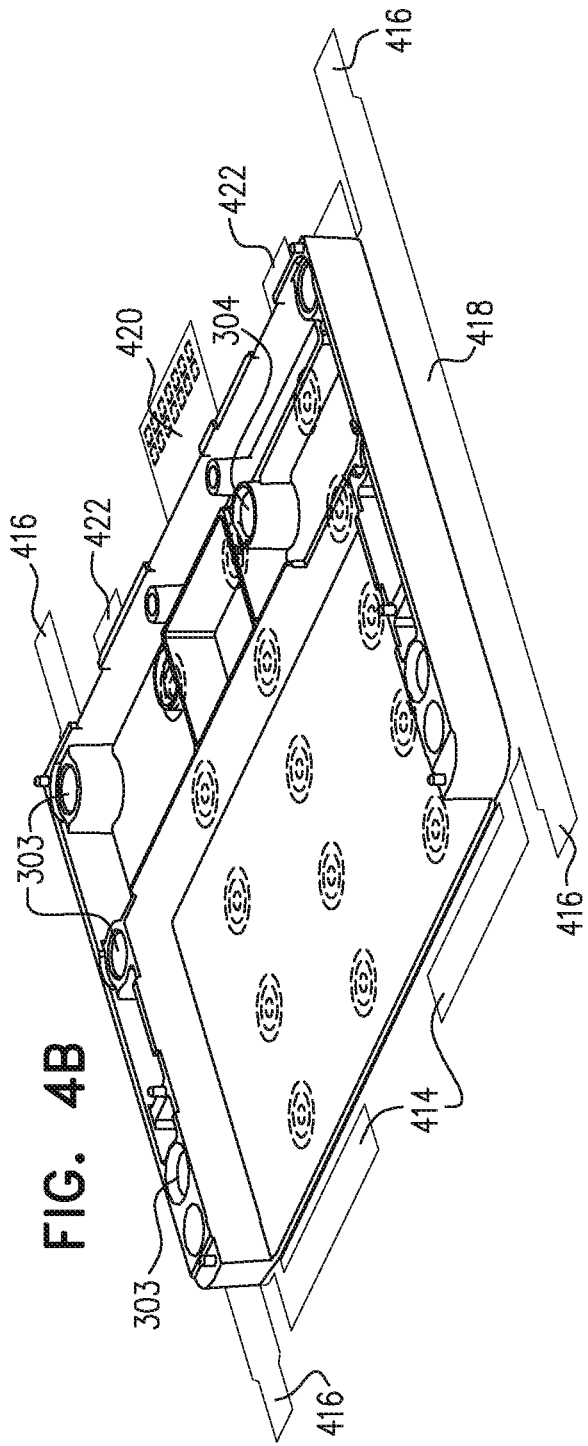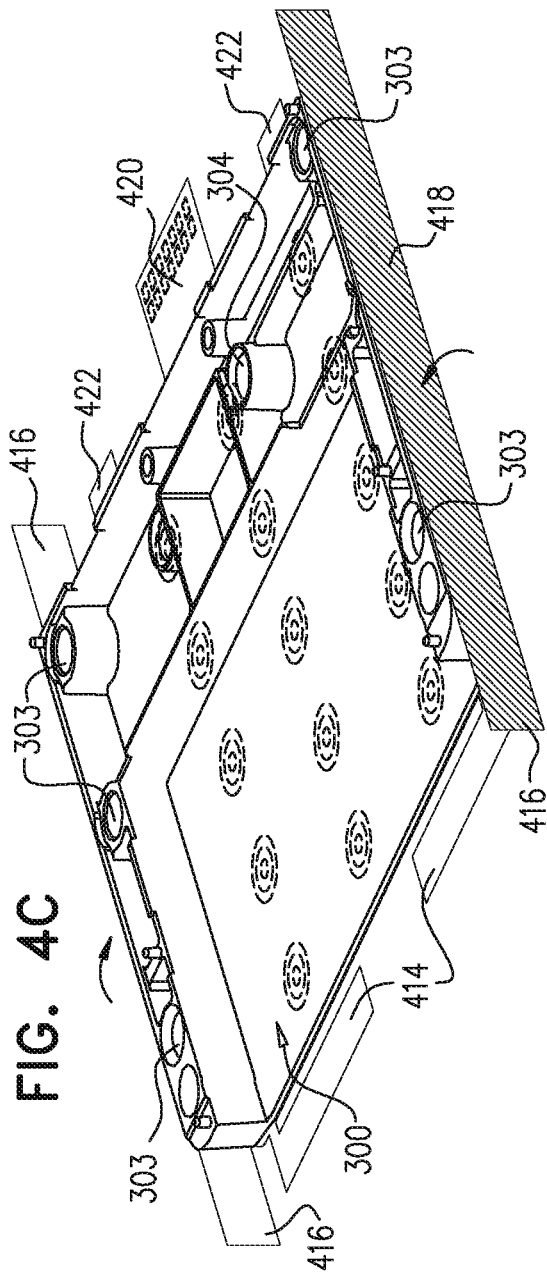

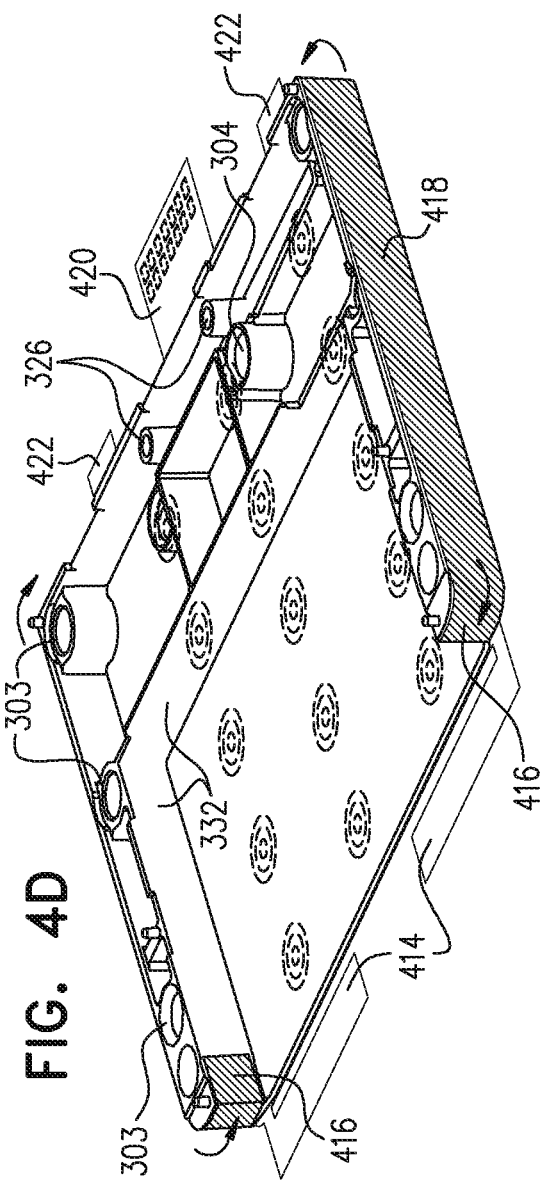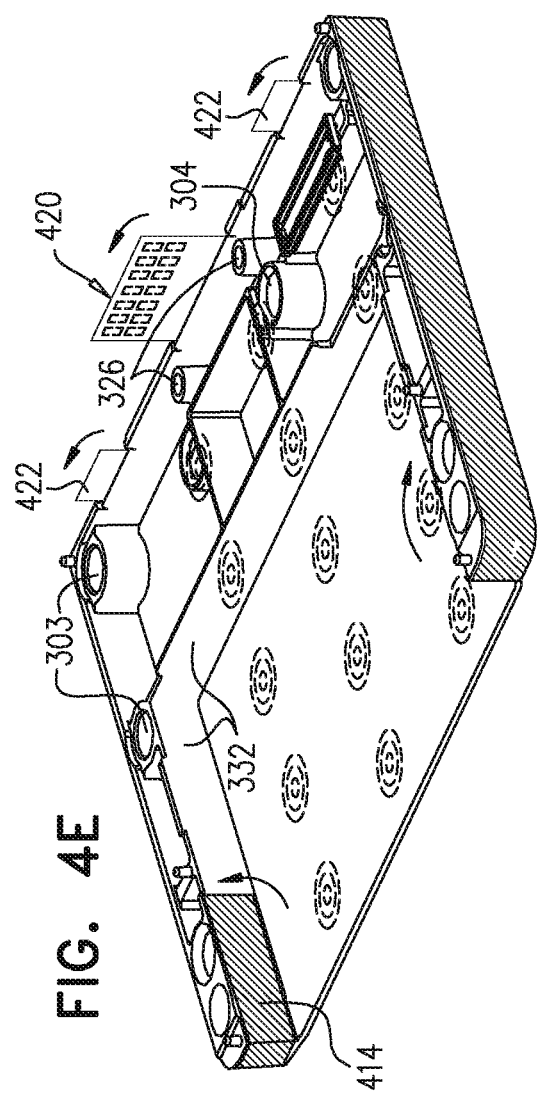

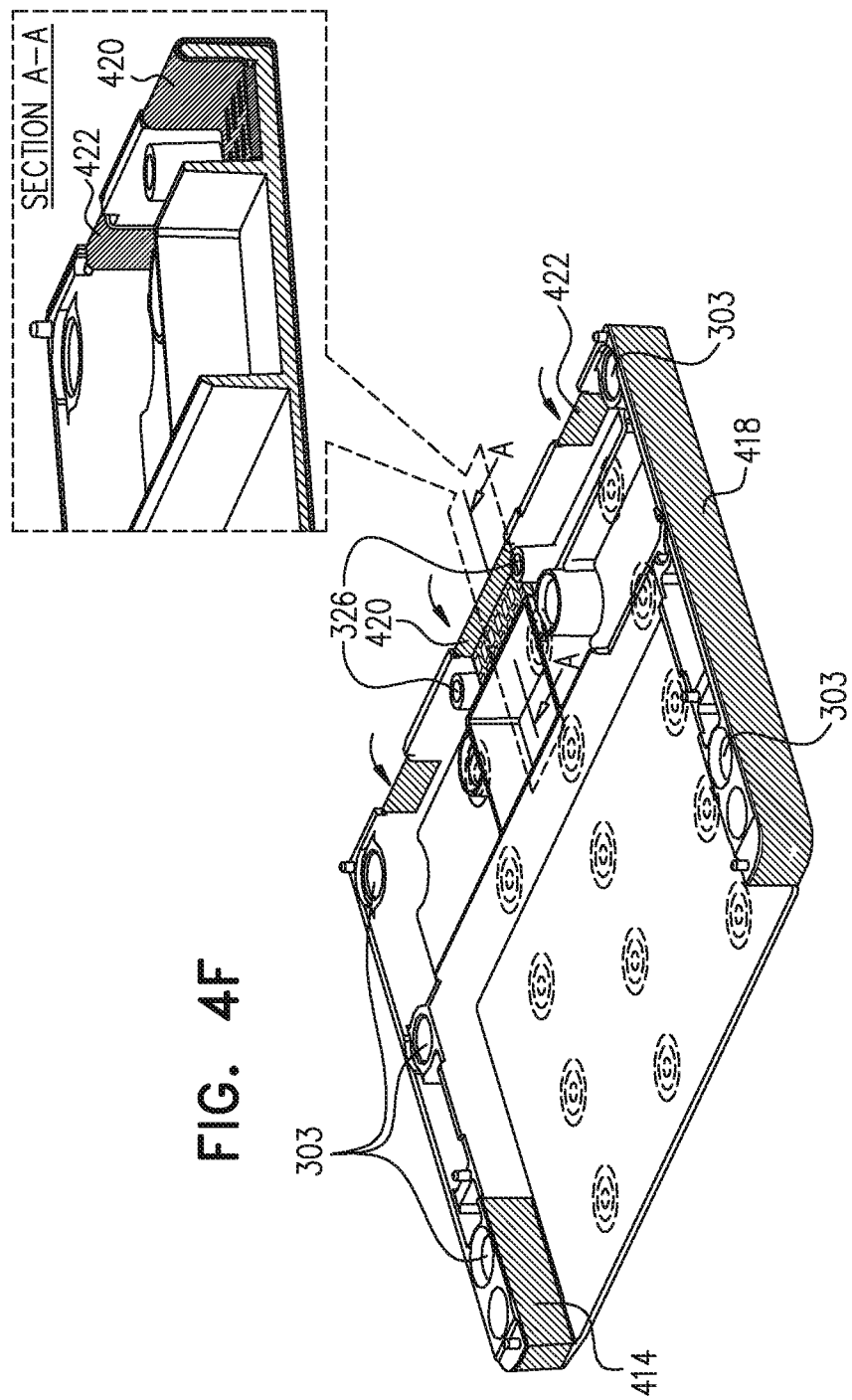

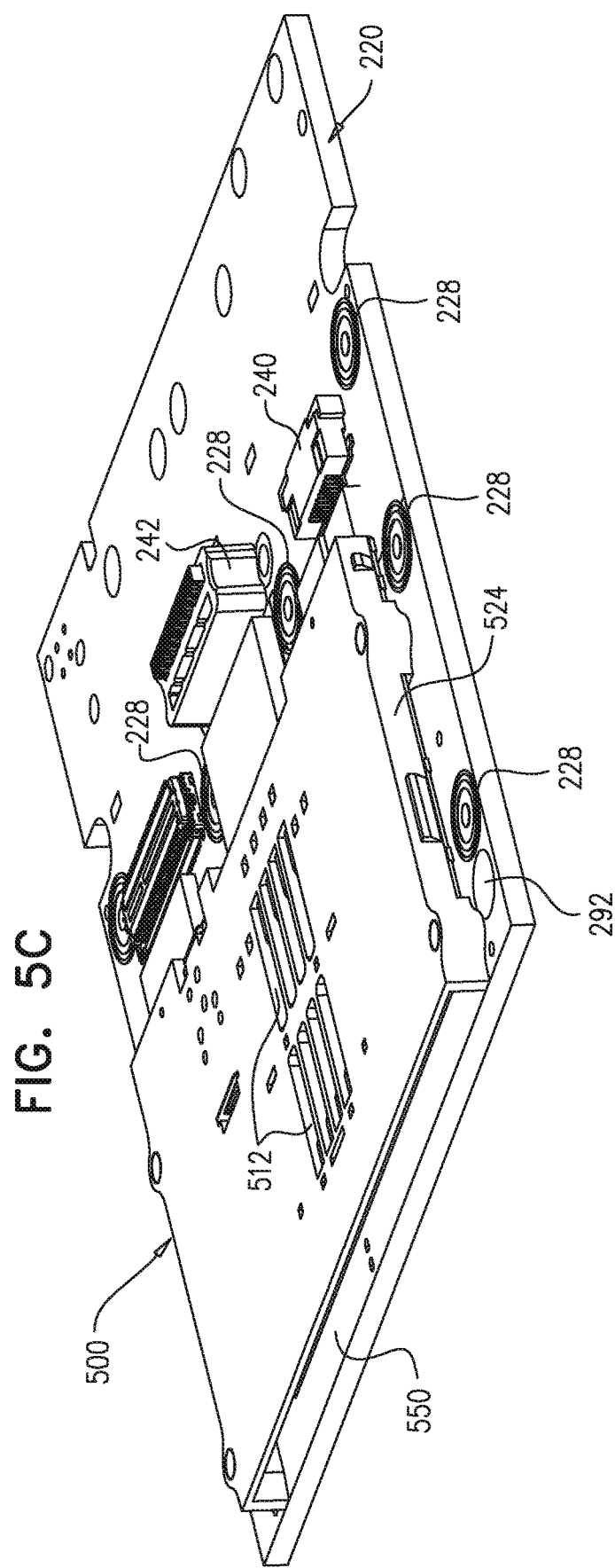

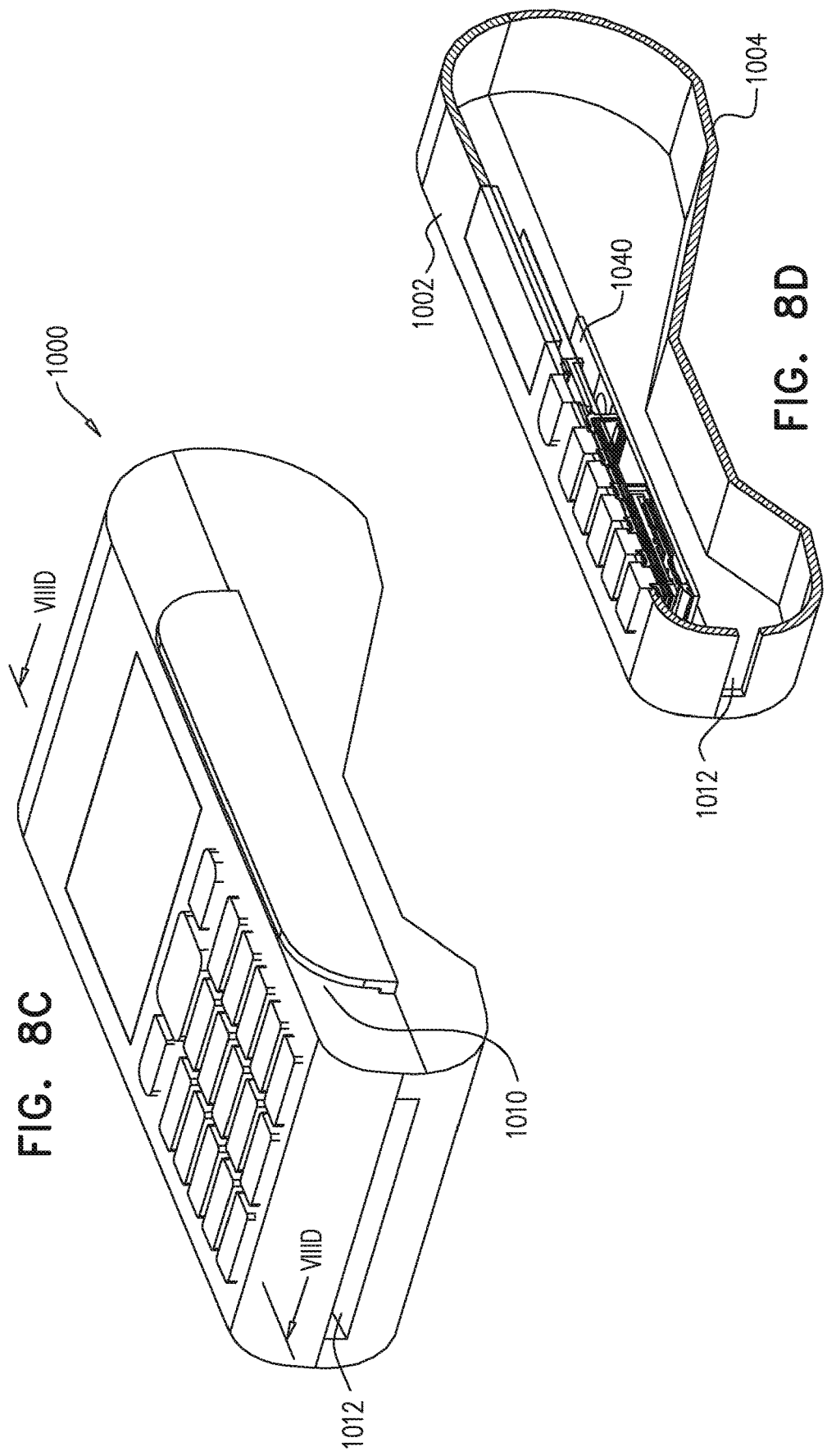

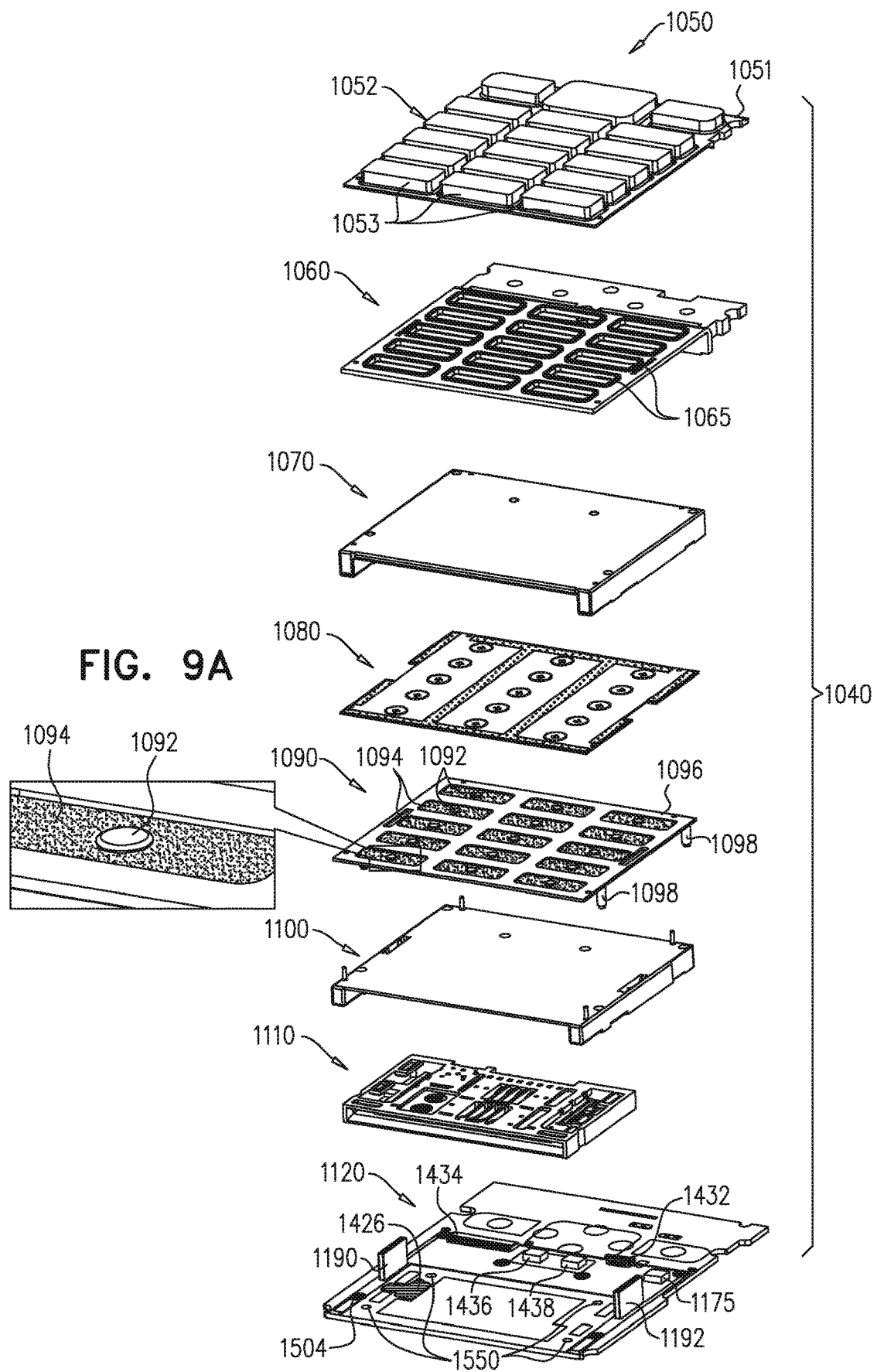

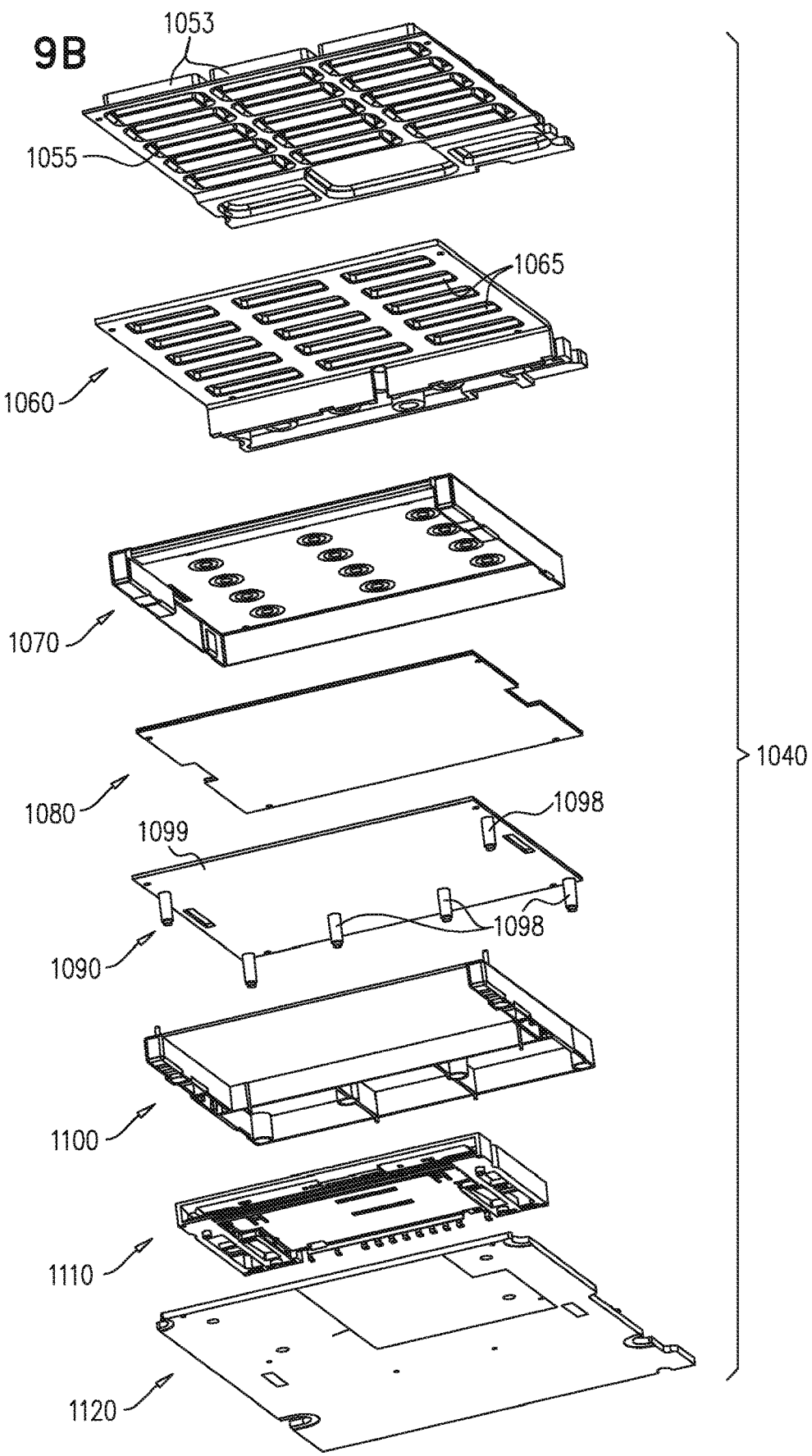

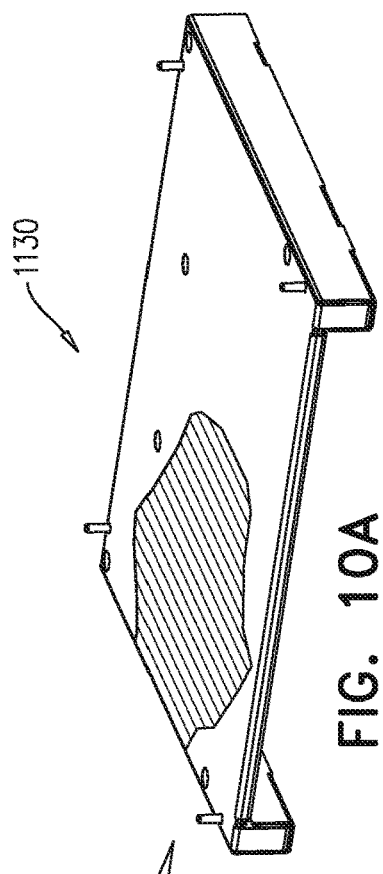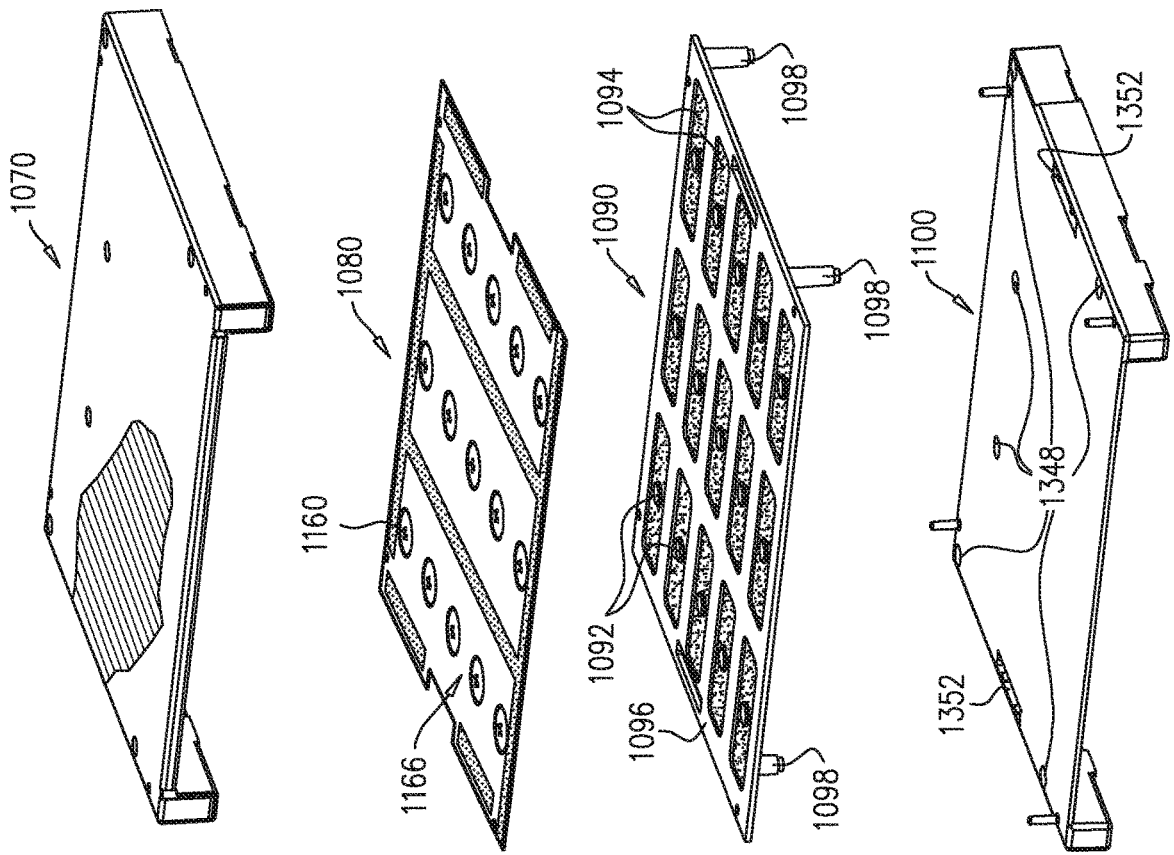
FIG. 10A

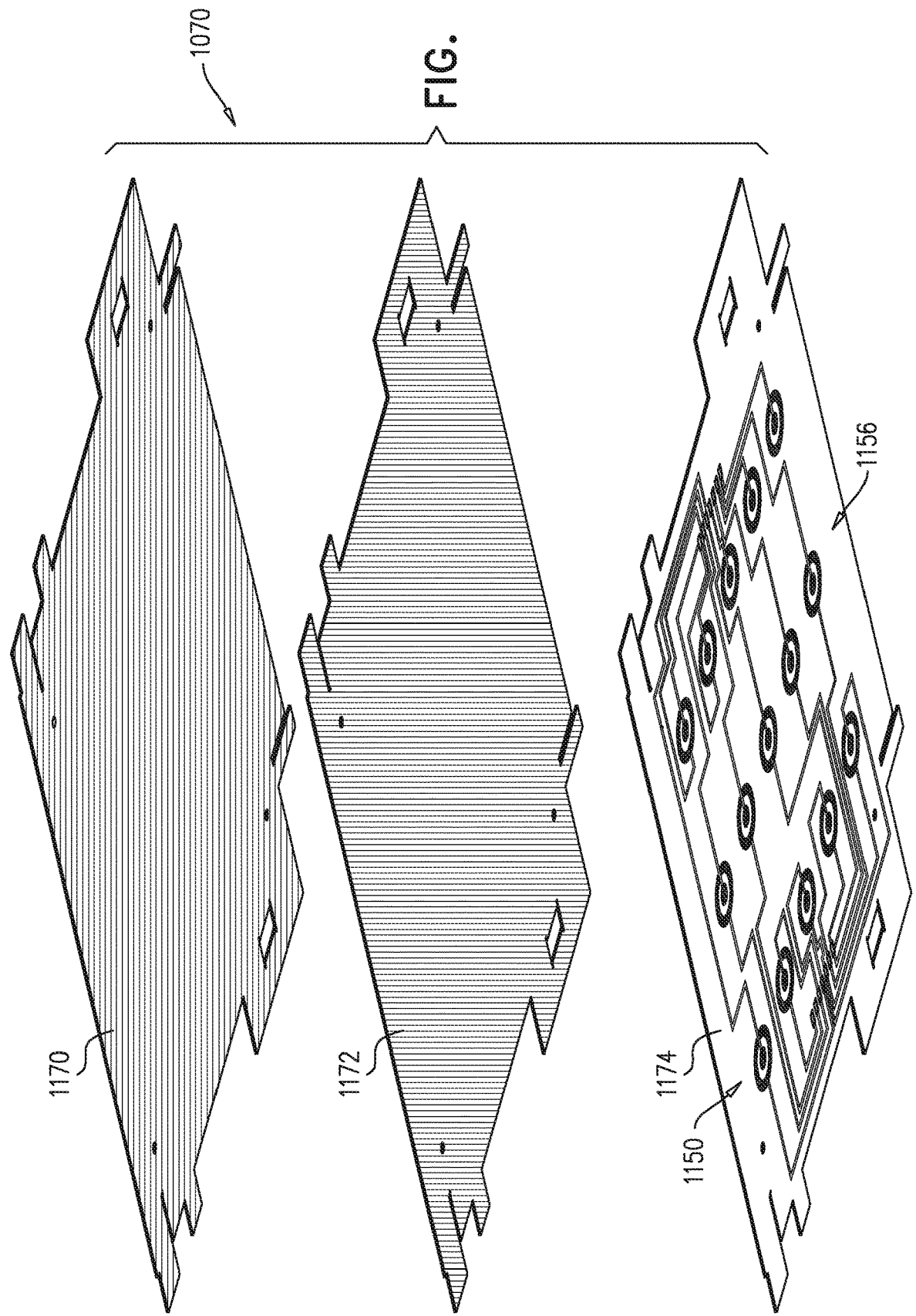

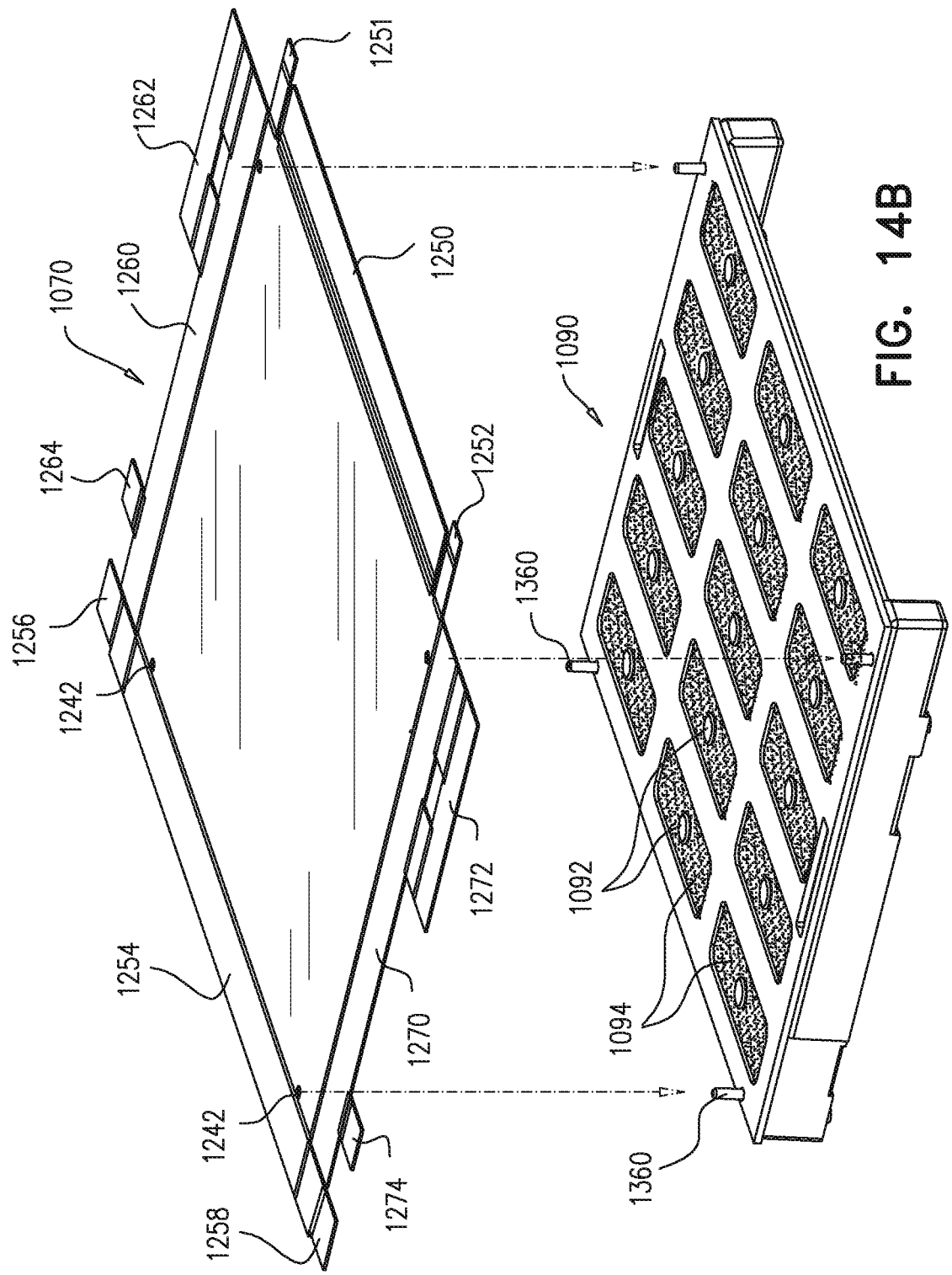

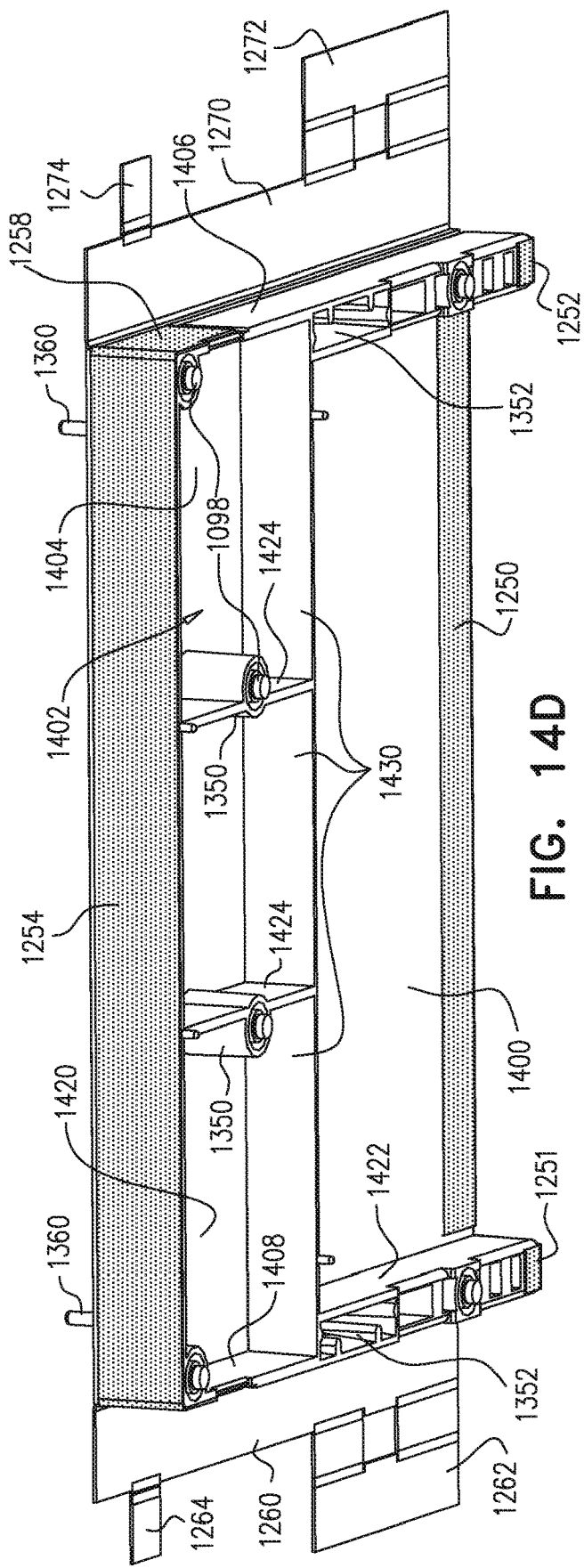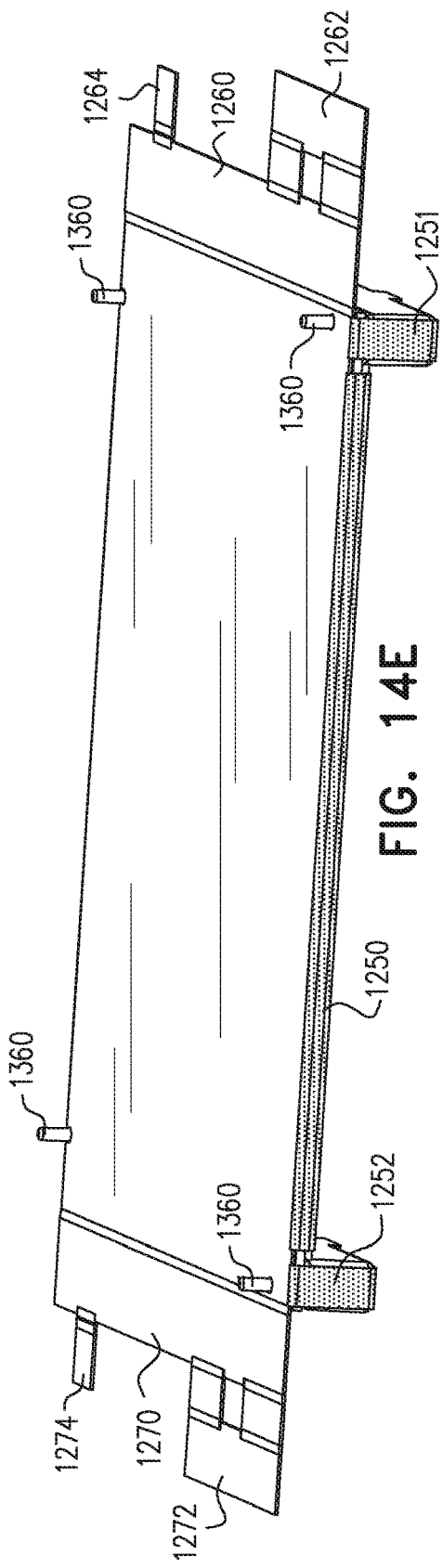

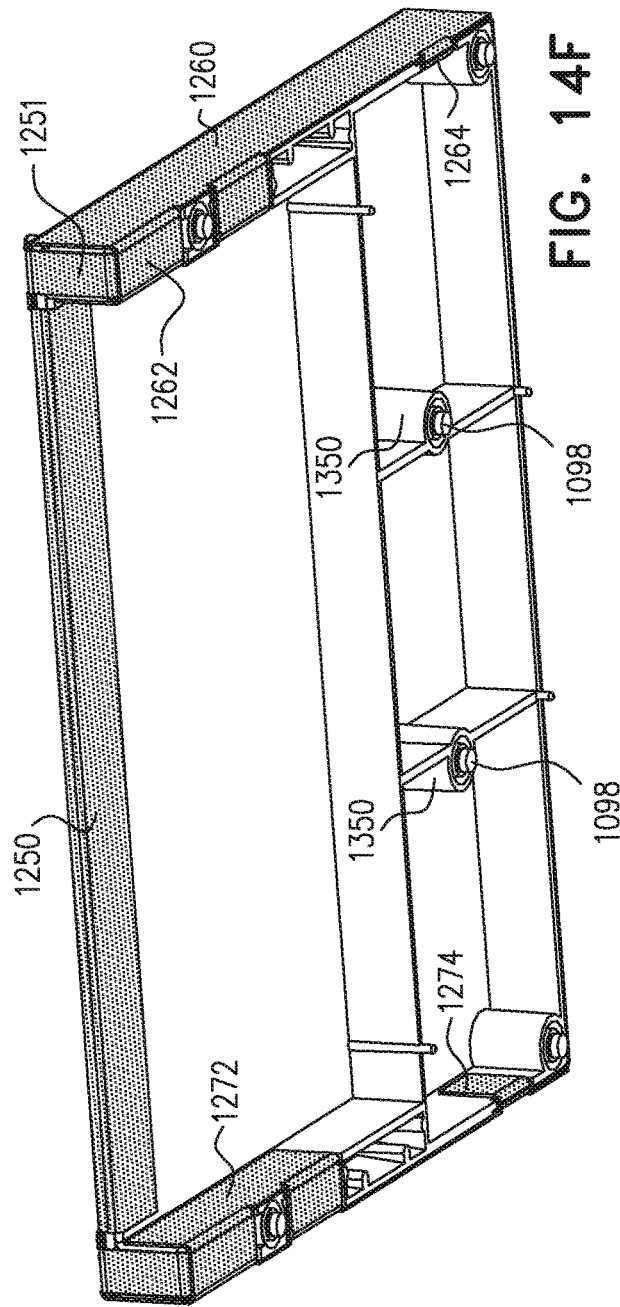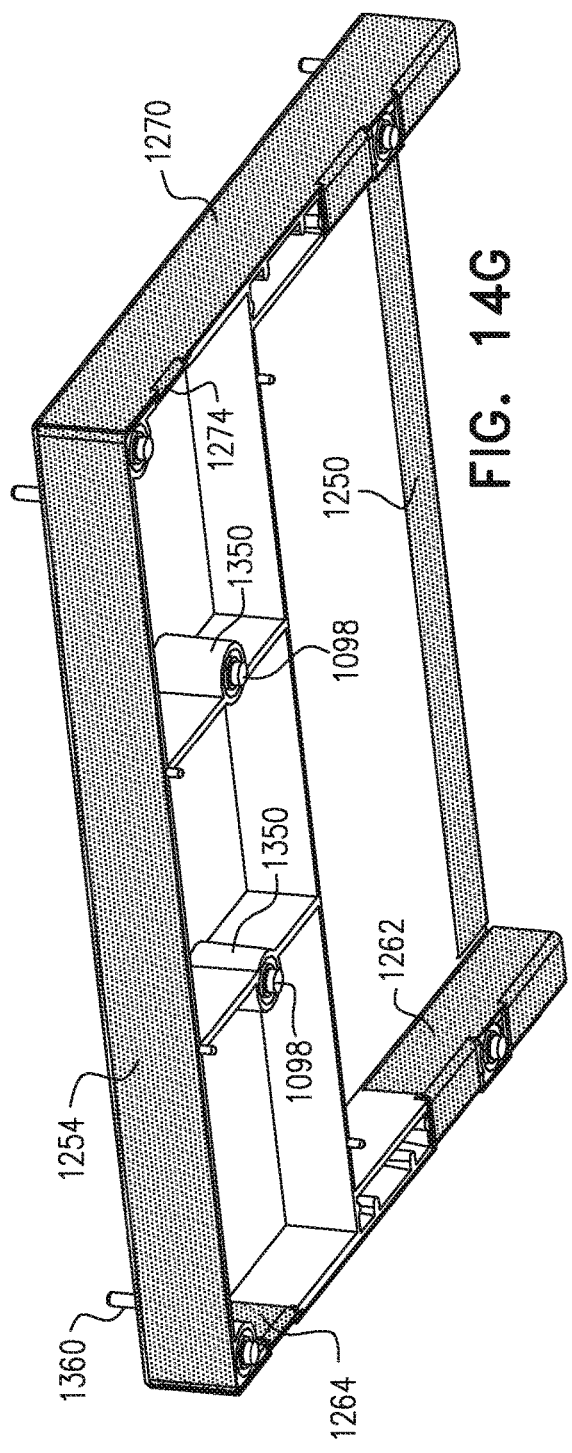

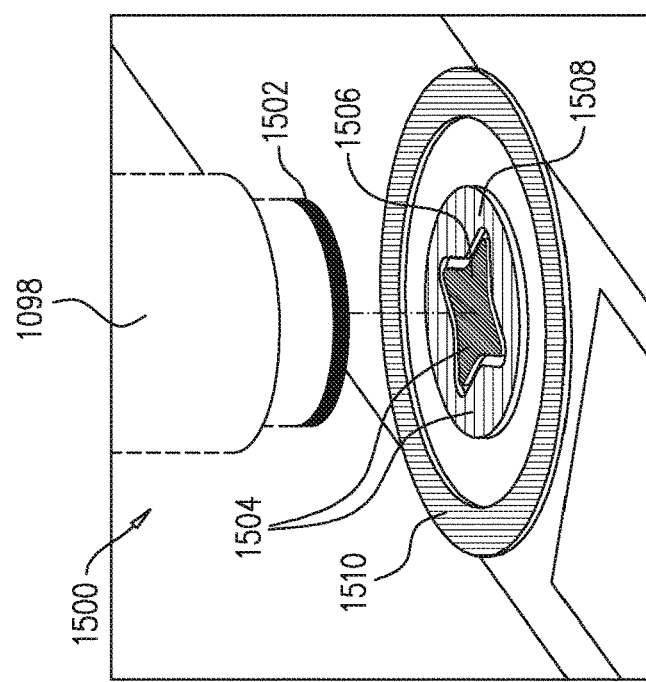
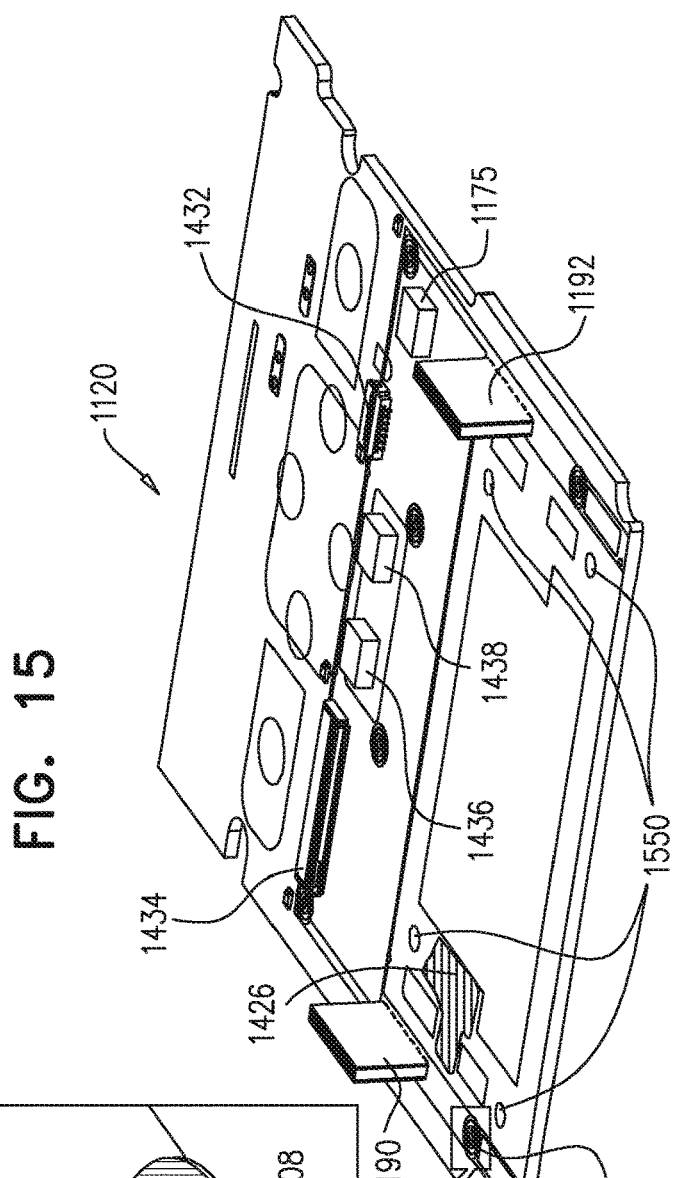
FIG. 15

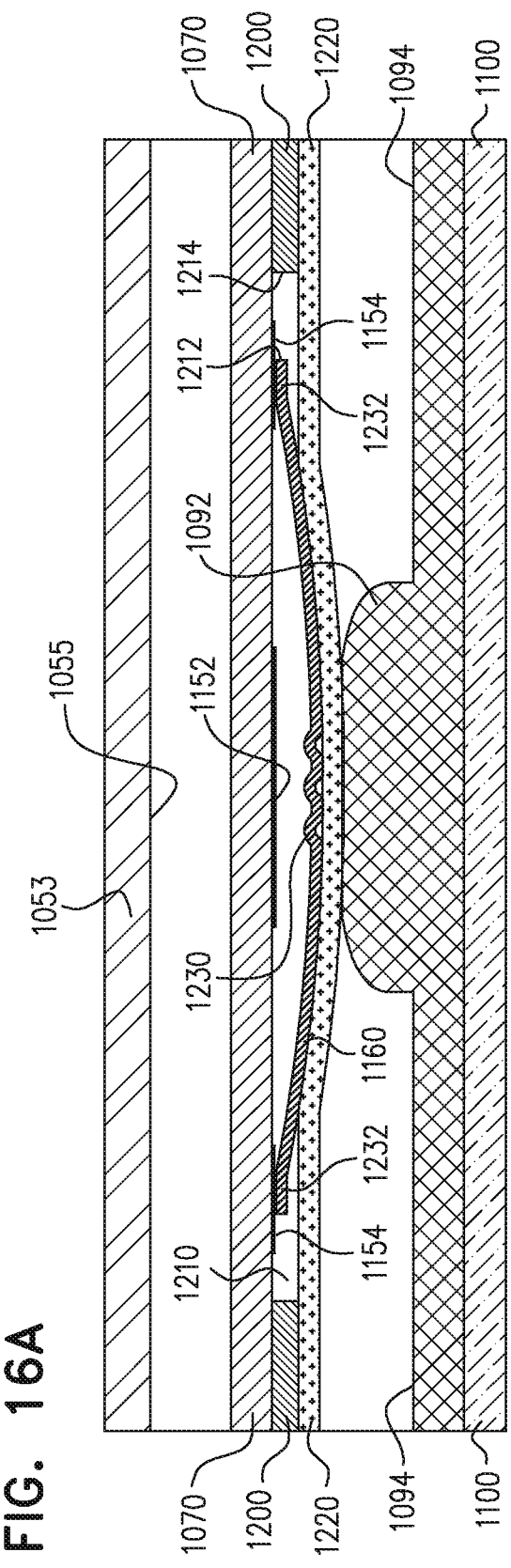
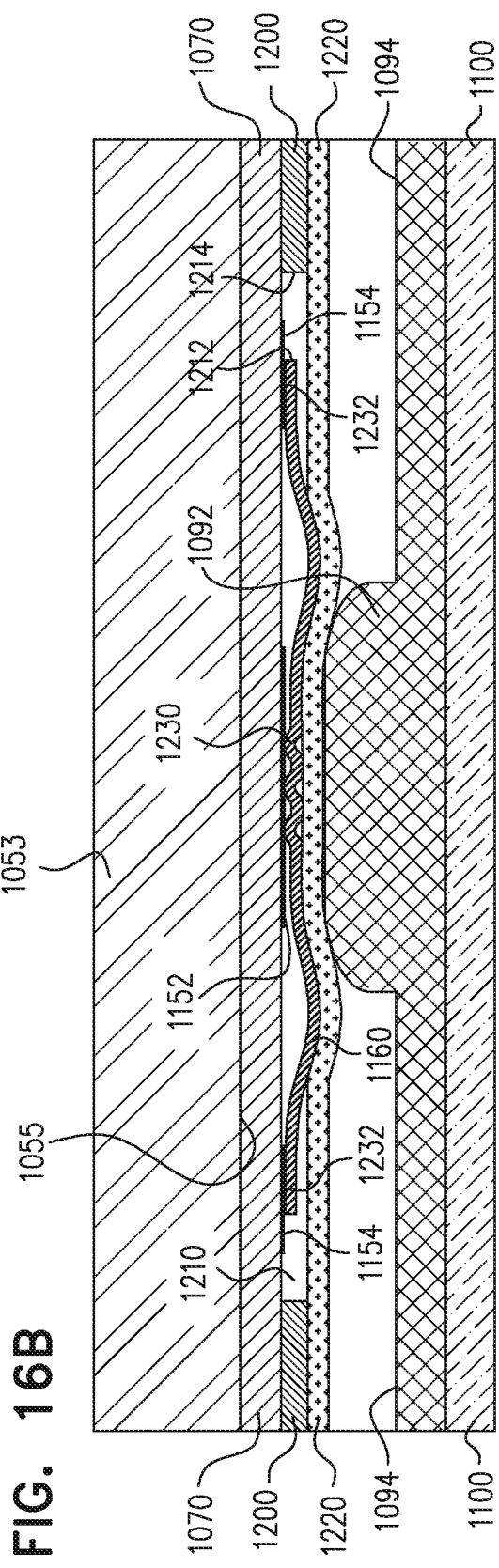

KEY ENTRY DEVICE

REFERENCE TO RELATED APPLICATIONS

This application is a National Stage Application of PCT Application No. PCT/IL2016/050282, filed Mar. 15, 2016, which claims priority to PCT Patent Application No. PCT/IL2015/050851, filed Aug. 25, 2015 and is entitled "SECURE SMARTCARD READER." The disclosures of each of these documents is hereby incorporated by reference in its entirety.

Reference is hereby made to U.S. Provisional Patent Application Ser. No. 62/050,866, filed Sep. 16, 2014 and entitled "SECURE THIN DATA ENTRY DEVICE", the disclosure of which is incorporated by reference in its entirety.

FIELD OF THE INVENTION

The present invention relates to data entry devices generally.

BACKGROUND OF THE INVENTION

Various types of data entry devices are known.

SUMMARY OF THE INVENTION

The present invention seeks to provide improved data entry devices.

There is thus provided in accordance with a preferred embodiment of the present invention a key entry device including a housing, a keypad array disposed within the housing and including a plurality of keys, a key contact array disposed within the housing below the keypad array and including a plurality of contact pairs, each aligned with one of the plurality of keys, a dome array underlying the keypad array and the key contact array and including a plurality of domes, each aligned with one of the plurality of keys and one of the plurality of contact pairs and a protrusion array underlying the dome array and including a plurality of protrusions, each aligned with one of the domes, whereby depression of one of the plurality of keys of the keypad array causes a corresponding one of the domes of the dome array to be displaced downwardly and to be deformed by pushing engagement with a corresponding one of the protrusions of the protrusion array into contact with at least one of the contact pairs of the key contact array.

Preferably, the depression of one of the plurality of keys causes a corresponding portion of the dome array to be displaced towards a corresponding portion of the protrusion array and the depression of one of the plurality of keys causes an underside surface of the one of the plurality of keys to be depressed downwardly into downward pushing engagement with a corresponding contact pair of the key contact array, thereby pressing a flat peripheral rim of a corresponding one of the plurality of domes downward in electrical contact with a conductive ring, being a first one of the contact pair, thus causing a conductive disk, being a second one of the contact pairs, to form an electrical connection with the one of the plurality of domes, thereby forming an electrical connection between the conductive disk and the conductive ring. Additionally, the one of the plurality of domes is thereby deformed to be convex at its center when viewed from above due to engagement of a top surface of the one of the protrusions with the one of the domes.

In accordance with a preferred embodiment of the present invention, the key entry device also includes a protective enclosure including at least one anti-tamper mesh surrounding at least the key contact array and the dome array. Additionally, the protective enclosure including at least one anti-tamper mesh also surrounds the protrusion array.

In accordance with a preferred embodiment of the present invention, the key entry device also includes a plurality of case open switch assemblies located entirely within the protective enclosure and protected thereby. Additionally, the plurality of case open switch assemblies includes elements integrally formed with the protrusion array. Preferably, the elements are directed in a direction opposite to a direction in which the protrusions are directed.

In accordance with a preferred embodiment of the present invention, the key contact array is formed on a flexible printed circuit substrate and underlies at least one anti-tamper mesh. Additionally, the at least one anti-tamper mesh is also formed on the flexible printed circuit substrate. Additionally or alternatively, the at least one anti-tamper mesh includes a plurality of anti-tamper meshes.

Preferably, at least one of the plurality of domes has a generally concave orientation as viewed from above prior to key depression and has an at least partially convex orientation as viewed from above upon key depression.

There is also provided in accordance with another preferred embodiment of the present invention a key entry device including a housing, a keypad array disposed within the housing and including a plurality of keys, a key contact array disposed within the housing below the keypad array and including a plurality of contact pairs, each aligned with one of the plurality of keys and a dome array including a plurality of domes, each aligned with one of the plurality of keys and one of the plurality of contact pairs, at least one of the plurality of domes having a generally concave orientation as viewed from above prior to key depression and having an at least partially convex orientation as viewed from above upon key depression.

In accordance with a preferred embodiment of the present invention the key contact array is formed on a flexible printed circuit substrate and underlies at least one anti-tamper mesh. Additionally, the at least one anti-tamper mesh is also formed on the flexible printed circuit substrate. Additionally or alternatively, the at least one anti-tamper mesh includes a plurality of anti-tamper meshes.

Preferably, the key entry device also includes a protective enclosure including at least one anti-tamper mesh surrounding the key contact array and the dome array.

In accordance with a preferred embodiment of the present invention the key entry device also includes a protrusion array underlying the dome array and including a plurality of protrusions, each aligned with one of the domes and a protective enclosure including at least one anti-tamper mesh and surrounding at least the key contact array, the dome array and the protrusion array. Additionally, the key entry device also includes a plurality of case open switch assemblies located entirely within the protective enclosure and protected thereby.

In accordance with a preferred embodiment of the present invention the key entry device also includes a protrusion array underlying the dome array and including a plurality of protrusions, each aligned with one of the domes, whereby depression of one of the plurality of keys of the keypad array causes a corresponding one of the domes of the dome array to be displaced downwardly and to be deformed by pushing engagement with a corresponding one of the protrusions of the protrusion array into contact with at least one of the contact pairs of the key contact array. Additionally, the depression of one of the plurality of keys causes a corresponding portion of the dome array to be displaced towards a corresponding portion of the protrusion array.

Preferably, the depression of one of the plurality of keys causes an underside surface of the one of the plurality of keys to be depressed downwardly into downward pushing engagement with a corresponding contact pair of the key contact array, thereby pressing a flat peripheral rim of a corresponding one of the plurality of domes downward in electrical contact with a conductive ring, being a first one of the contact pair, thus causing a conductive disk, being a second one of the contact pairs, to form an electrical connection with the one of the plurality of domes, thereby forming an electrical connection between the conductive disk and the conductive ring. Additionally, the one of the plurality of domes is thereby deformed to be convex at its center when viewed from above due to engagement of a top surface of the one of the protrusions with the one of the domes.

In accordance with a preferred embodiment of the present invention the key entry device also includes a plurality of case open switch assemblies including elements integrally formed with the protrusion array. Additionally, the elements are directed in a direction opposite to a direction of the protrusions.

There is further provided in accordance with another preferred embodiment of the present invention a key entry device including a housing, a keypad array disposed within the housing and including a plurality of keys, a key contact array disposed within the housing below the keypad array and including a plurality of contact pairs, each aligned with one of the plurality of keys, a dome array underlying the keypad array and the key contact array and including a plurality of domes, each aligned with one of the plurality of keys and one of the plurality of contact pairs and a protective enclosure including at least one anti-tamper mesh surrounding the key contact array and the dome array.

In accordance with a preferred embodiment of the present invention the key contact array is formed on a flexible printed circuit substrate and underlies at least one anti-tamper mesh. Additionally, the at least one anti-tamper mesh is also formed on the flexible printed circuit substrate. Additionally or alternatively, the at least one anti-tamper mesh includes a plurality of anti-tamper meshes.

Preferably, the key entry device also includes a plurality of case open switch assemblies located entirely within the protective enclosure and protected thereby.

In accordance with a preferred embodiment of the present invention the key entry device also includes a protrusion array underlying the dome array and including a plurality of protrusions, each aligned with one of the domes, whereby depression of one of the plurality of keys of the keypad array causes a corresponding one of the domes of the dome array to be displaced downwardly and to be deformed by pushing engagement with a corresponding one of the protrusions of the protrusion array into contact with at least one of the contact pairs of the key contact array. Additionally, the depression of one of the plurality of keys causes a corresponding portion of the dome array to be displaced towards a corresponding portion of the protrusion array.

In accordance with a preferred embodiment of the present invention the depression of one of the plurality of keys causes an underside surface of the one of the plurality of keys to be depressed downwardly into downward pushing engagement with a corresponding contact pair of the key contact array, thereby pressing a flat peripheral rim of a corresponding one of the plurality of domes downward in electrical contact with a conductive ring, being a first one of the contact pair, thus causing a conductive disk, being a second one of the contact pairs, to form an electrical connection with the one of the plurality of domes, thereby forming an electrical connection between the conductive disk and the conductive ring. Additionally or alternatively, the one of the plurality of domes is thereby deformed to be convex at its center when viewed from above due to engagement of a top surface of the one of the protrusions with the one of the domes.

Preferably, the protective enclosure also surrounds the protrusion array.

In accordance with a preferred embodiment of the present invention the plurality of case open switch assemblies includes elements integrally formed with the protrusion array. Additionally, the elements are directed in a direction opposite to a direction of the protrusions.

In accordance with a preferred embodiment of the present invention at least one of the plurality of domes has a generally concave orientation as viewed from above prior to key depression and has an at least partially convex orientation as viewed from above upon key depression.

There is yet further provided in accordance with still another preferred embodiment of the present invention a key entry device including a housing, a keypad array disposed within the housing and including a plurality of keys, a key contact array disposed within the housing below the keypad array and including a plurality of contact pairs, each aligned with one of the plurality of keys, a dome array and including a plurality of domes, each aligned with one of the plurality of keys and one of the plurality of contact pairs, a protective enclosure including at least one anti-tamper mesh surrounding the key contact array and the dome array and a plurality of case open switch assemblies located entirely within the protective enclosure and protected thereby.

Preferably, the key entry device also includes a protrusion array underlying the dome array and including a plurality of protrusions, each aligned with one of the domes, whereby depression of one of the plurality of keys of the keypad array causes a corresponding one of the domes of the dome array to be displaced downwardly and to be deformed by pushing engagement with a corresponding one of the protrusions of the protrusion array into contact with at least one of the contact pairs of the key contact array. Additionally, the depression of one of the plurality of keys causes a corresponding portion of the dome array to be displaced towards a corresponding portion of the protrusion array.

Preferably, the depression of one of the plurality of keys causes an underside surface of the one of the plurality of keys to be depressed downwardly into downward pushing engagement with a corresponding contact pair of the key contact array, thereby pressing a flat peripheral rim of a corresponding one of the plurality of domes downward in electrical contact with a conductive ring, being a first one of the contact pair, thus causing a conductive disk, being a second one of the contact pairs, to form an electrical connection with the one of the plurality of domes, thereby forming an electrical connection between the conductive disk and the conductive ring. Additionally or alternatively, the one of the plurality of domes is thereby deformed to be convex at its center when viewed from above due to engagement of a top surface of the one of the protrusions with the one of the domes.

In accordance with a preferred embodiment of the present invention the plurality of case open switch assemblies includes elements integrally formed with the protrusion array. Additionally, the elements are directed in a direction opposite to a direction of the protrusions.

In accordance with a preferred embodiment of the present invention the key contact array is formed on a flexible printed circuit substrate and underlies at least one anti-tamper mesh. Additionally, the at least one anti-tamper mesh is also formed on the flexible printed circuit substrate. Additionally or alternatively, the at least one anti-tamper mesh includes a plurality of anti-tamper meshes.

Preferably, at least one of the plurality of domes has a generally concave orientation as viewed from above prior to key depression and has an at least partially convex orientation as viewed from above upon key depression.

In accordance with a preferred embodiment of the present invention the protective enclosure also surrounds the protrusion array.

There is even further provided in accordance with yet another preferred embodiment of the present invention a key entry device including a housing, a keypad array disposed within the housing and including a plurality of keys, a key contact array disposed within the housing below the keypad array and including a plurality of contact pairs, each aligned with one of the plurality of keys, a dome array underlying the keypad array and the key contact array and including a plurality of domes, each aligned with one of the plurality of keys and one of the plurality of contact pairs, a protrusion array underlying the dome array and including a plurality of protrusions, each aligned with one of the domes, a protective enclosure including at least one anti-tamper mesh surrounding at least the key contact array and the dome array and a plurality of case open switch assemblies located entirely within the protective enclosure and protected thereby, the plurality of case open switch assemblies including elements integrally formed with the protrusion array.

In accordance with a preferred embodiment of the present invention the elements are directed in a direction opposite to a direction of the protrusions. Preferably, the protective enclosure also surrounds the protrusion array.

In accordance with a preferred embodiment of the present invention the key contact array is formed on a flexible printed circuit substrate and underlies at least one anti-tamper mesh. Additionally, the at least one anti-tamper mesh is also formed on the flexible printed circuit substrate. Additionally or alternatively, the at least one anti-tamper mesh includes a plurality of anti-tamper meshes.

In accordance with a preferred embodiment of the present invention at least one of the plurality of domes has a generally concave orientation as viewed from above prior to key depression and has an at least partially convex orientation as viewed from above upon key depression. Additionally, the depression of one of the plurality of keys of the keypad array causes a corresponding one of the domes of the dome array to be displaced downwardly and to be deformed by pushing engagement with a corresponding one of the protrusions of the protrusion array into contact with at least one of the contact pairs of the key contact array.

Preferably, the depression of one of the plurality of keys causes a corresponding portion of the dome array to be displaced towards a corresponding portion of the protrusion array. Additionally or alternatively, the depression of one of the plurality of keys causes an underside surface of the one of the plurality of keys to be depressed downwardly into downward pushing engagement with a corresponding contact pair of the key contact array, thereby pressing a flat peripheral rim of a corresponding one of the plurality of domes downward in electrical contact with a conductive ring, being a first one of the contact pair, thus causing a conductive disk, being a second one of the contact pairs, to form an electrical connection with the one of the plurality of domes, thereby forming an electrical connection between the conductive disk and the conductive ring. Additionally, the one of the plurality of domes is thereby deformed to be convex at its center when viewed from above due to engagement of a top surface of the one of the protrusions with the one of the domes.

BRIEF DESCRIPTION OF THE DRAWINGS

The present invention will be understood and appreciated more fully from the following detailed description, taken in conjunction with the drawings in which:

FIGS. 1A and 1B are simplified pictorial exploded view illustrations of a smart card data entry device constructed and operative in accordance with a preferred embodiment of the present invention, taken in respective downward and upward facing directions;

FIG. 1C is a simplified pictorial assembled view illustration of the smart card data entry device of FIGS. 1A & 1B;

FIG. 1D is a simplified sectional illustration taken along lines 1D-1D in FIG. 1C;

FIGS. 4A, 4B, 4C, 4D, 4E and 4F are simplified illustrations of steps in folding of the folded element of either of FIGS. 3C & 3D;

FIG. 5C is a simplified assembled view illustration of the subassembly of FIGS. 5A & 5B together with a printed circuit board shown in FIGS. 1A-2B, cooperating therewith;

FIG. 8C is a simplified pictorial assembled view illustration of the smart card data entry device of FIGS. 8A & 8B;

FIG. 8D is a simplified sectional illustration taken along lines VIIID-VIIID in FIG. 8C;

FIGS. 9A and 9B are simplified exploded view illustrations of a security volume assembly forming part of the smart card data entry device of FIGS. 8A-8C, taken in respective downward and upward facing directions;

FIGS. 10A and 10B are simplified exploded view illustrations of another subassembly of the security volume assembly of FIGS. 9A & 9B, taken in respective downward and upward facing directions;

FIG. 11 is a simplified exploded view generalized upward-facing view illustration of a subsequently folded element forming part of the subassembly of FIGS. 10A & 10B;

FIGS. 14A, 14B, 14C, 14D, 14E, 14F and 14G are simplified illustrations of steps in assembly of the subassembly of FIGS. 10A and 10B;

FIG. 15 is a simplified pictorial illustration of a printed circuit board forming part of the smart card data entry device of FIGS. 8A-12E; and FIGS. 16A & 16B are simplified illustrations of key engagement operation of the smart card data entry device of FIGS. 8A-14E.

DETAILED DESCRIPTION OF PREFERRED EMBODIMENTS

Figure 1B:
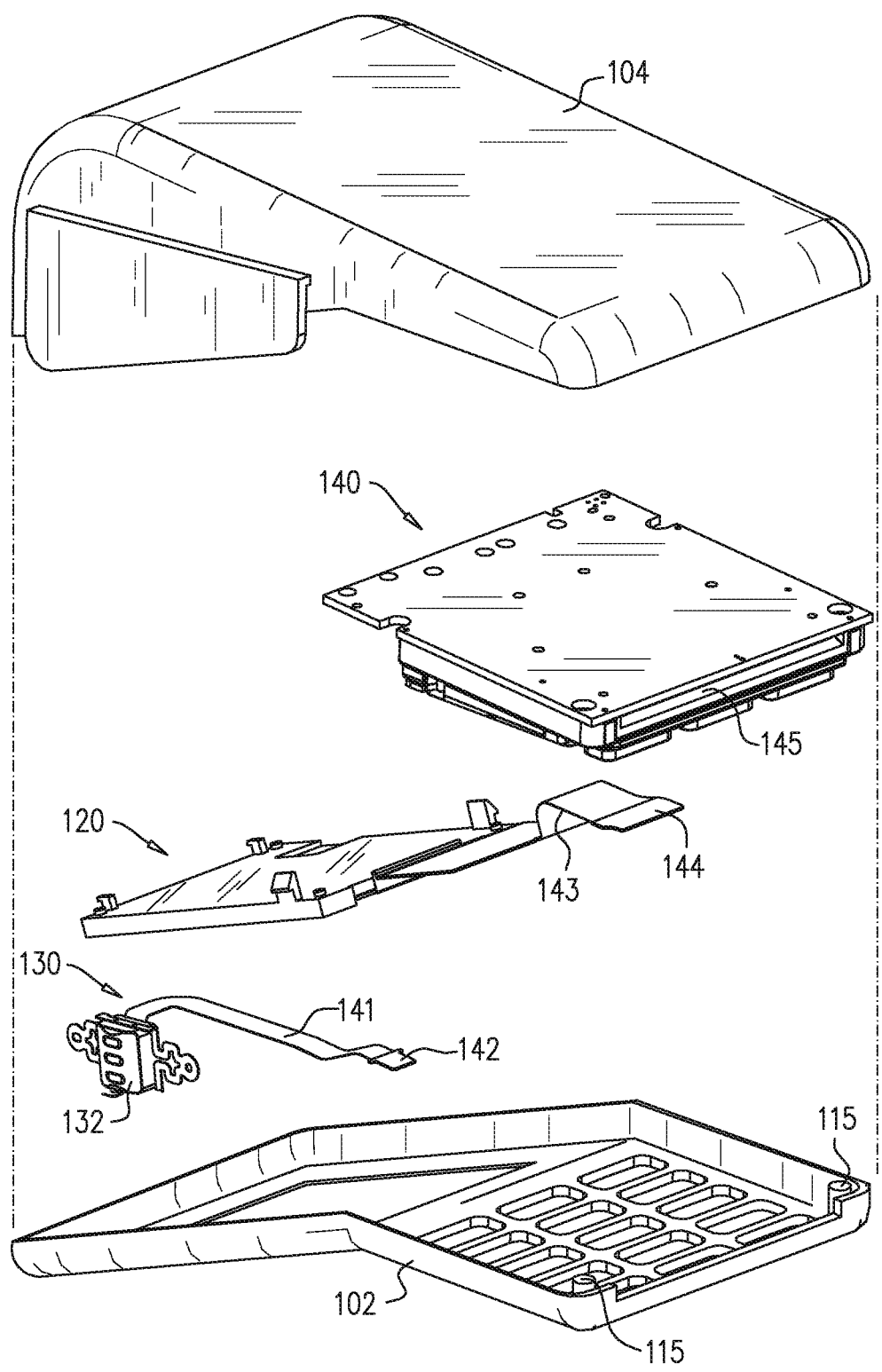

Reference is now made to FIGS. 1A and 1B, which are simplified pictorial exploded view illustrations of a machine readable card data entry device constructed and operative in accordance with a preferred embodiment of the present invention, taken in respective downward and upward facing directions, to FIG. 1C, which is an assembled view of the machine readable card data entry device, and to FIG. 1D, which is a simplified sectional illustration of the machine readable card data entry device of FIGS. 1A-1C.

As seen in FIGS. 1A-1D, the machine readable card entry data entry device preferably comprises a housing 100 including a top housing portion 102 and a bottom housing portion 104. Top housing portion 102 preferably defines an array 105 of key apertures 106. Bottom housing portion 104 preferably defines a magnetic card reading slit 110 having an aperture 111. Top and bottom housing portions preferably together define a smart card reading slot 112. Bottom housing portion 104 defines a plurality of upstanding bosses 114. Top housing portion 102 defines a plurality of downward facing bosses 115.

Located within housing 100 is an LCD assembly 120. LCD assembly 120 may optionally include a touchscreen panel, such as a LCM260-002-01-A, manufactured by GIANTPLUS TECHNOLOGY CO., LTD, 15 Industrial Road, Toufen, Miauli, Taiwan.

Also located within housing 100, adjacent slit 110, is a magnetic card reader subassembly 130. Magnetic card reader subassembly 130 preferably comprises a magnetic card reader head 132, typically a MSR252-011-01-A, manufactured by APOLLO (ZHUHAI) ELECTRONICS CO, Apollo Bldg., Lan-pu Industrial Area E, Jiuzhou Rd, Zhuhai, China, which is mounted into aperture 111.

Additionally located within housing 100 and preferably mounted onto bosses 114 and/or bosses 115, as seen particularly in FIG. 1D, is a security volume assembly 140, which is described hereinbelow in greater detail with reference to FIGS. 2A-7C and within which is defined a security volume. There is provided an electrical connection between magnetic card reader subassembly 130, typically via a flexible cable 141 and a connector 142, and circuitry located within security volume assembly 140. There is also provided an electrical connection between LCD assembly 120, typically via a flexible cable 143 and a connector 144, and circuitry located within security volume assembly 140.

It is appreciated that a smart card to be read may be inserted via slot 112 into operative engagement with an interior of the security volume assembly, as described in detail hereinbelow. Slot 112 is aligned with a corresponding smart card read/write slot 145 formed in assembly 140.

Figure 2A:
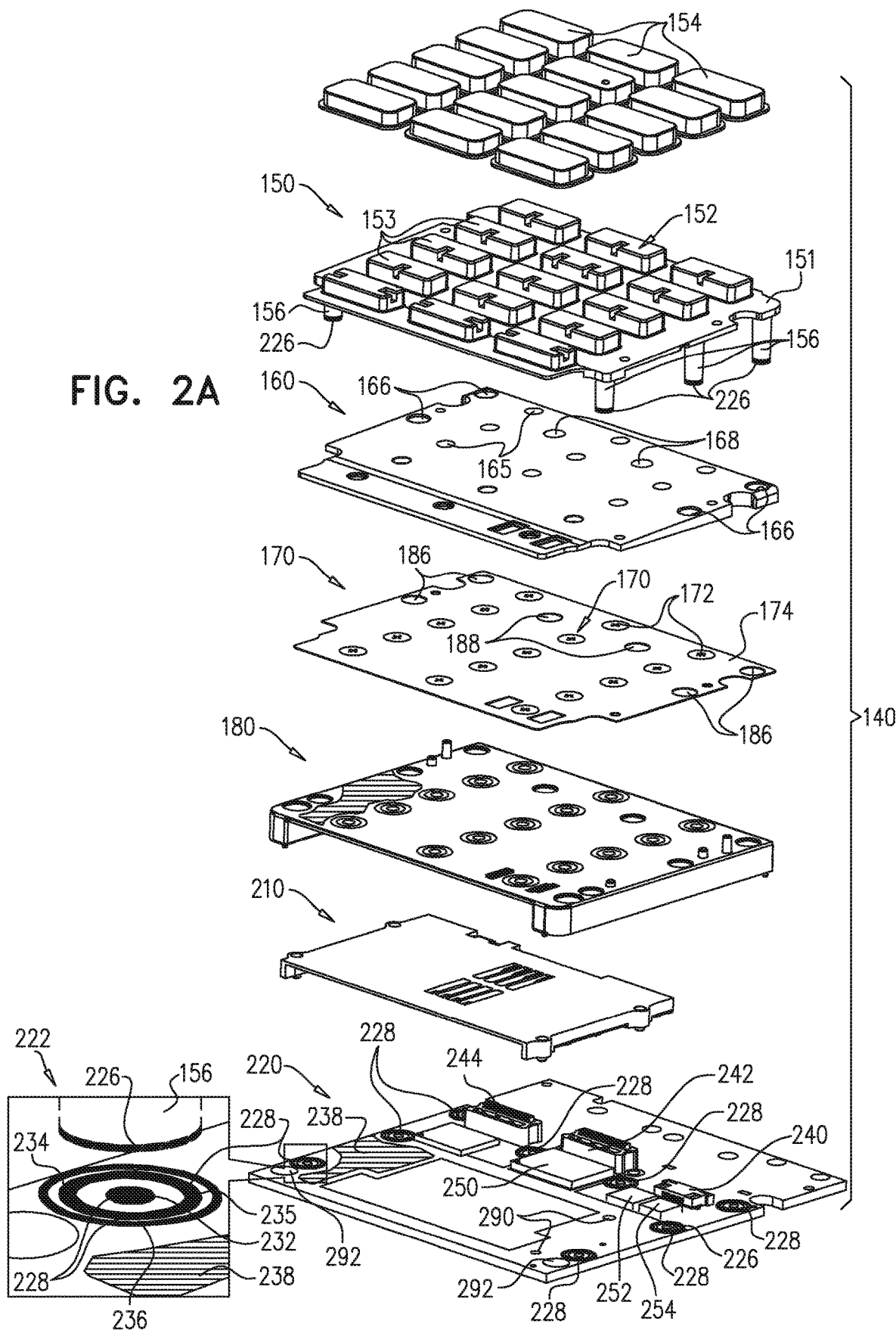
FIGS. 2A and 2B are simplified exploded view illustrations of a security volume assembly forming part of the smart card data entry device of FIGS. 1A-1C, taken in respective downward and upward facing directions.
Figure 2B:
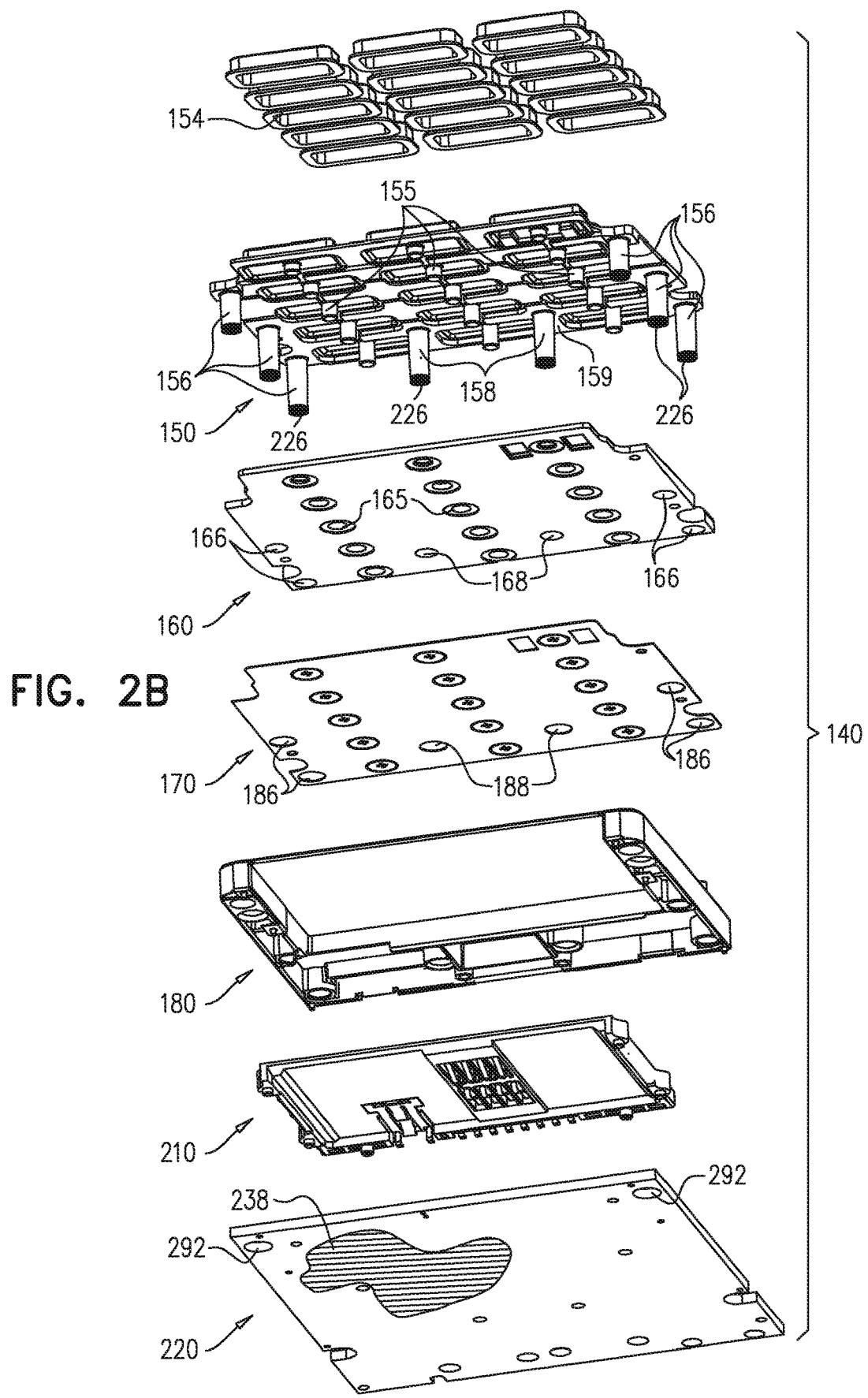

Reference is now made to FIGS. 2A and 2B, which are simplified exploded view illustrations of security volume assembly 140, forming part of the machine readable card data entry device of FIGS. 1A & 1B, taken in respective downward and upward facing directions.

As seen in FIGS. 2A and 2B, the security volume assembly 140 comprises a keypad element 150, preferably formed of a resilient material such as rubber. Keypad element 150 is preferably a unitary element which defines, on a top surface 151 thereof, an array 152 of displaceable keys 153 which are configured to extend through corresponding array 105 of key apertures 106 (FIG. 1A) on top housing element 102. Keypad element 150 may be provided with key covers 154. Each of displaceable keys 153 is preferably formed on an underside thereof with a pin 155. Keypad element 150 preferably is provided with eight pins, including six edge pins 156 and two interior pins 158. Each of pins 156 and 158 extend from a bottom surface 159 of keypad element 150.

Security volume assembly 140 preferably also includes an apertured light guide element 160 having apertures 165, 166 and 168 for accommodating respective pins 155, 156 and 158.

Security volume assembly 140 preferably additionally includes an array 170 of domes 172, which are engaged by pins 155 when keys 153 are depressed. Domes are mounted, as by adhesive, such as an adhesive layer 174, or by soldering, onto a contact subassembly 180, which is described hereinbelow in detail with reference to FIGS. 3A-4G.

Adhesive layer 174 includes six apertures, including four edge apertures 186, for accommodating corresponding pins 156 and two interior apertures 188, for accommodating pins 158.

Located within security volume assembly 140 and forming part thereof is a smart card connector assembly 210, various embodiments of which are described hereinbelow with reference to FIGS. 5A-7C, which is mounted on a printed circuit board 220.

It is seen that in accordance with a preferred embodiment of the invention there are provided a plurality of tamper detection switch assemblies 222.

Each tamper detection switch assembly 222 preferably includes a carbon pill 226, which is fixed to the bottom of pins 156 and 158, and a pair of electrical contacts 228, mounted on printed circuit board 220, preferably each including a central conductor 232 and at least one circumferential ring 234, which preferably includes an inner ring 235 and an outer grounded ring 236, either or both of which may include plural segmented ring portions (not shown).

When the housing is closed and top housing portion 102 and bottom housing portion 104 are fully engaged, carbon pills 226, fixed to the bottom surfaces of pins 156 and 158, are positioned so as to short circuit respective electric central conductors 232 and respective at least one circumferential rings 234. Alternatively, carbon pills 226 may be replaced by deformable conductive domes.

In accordance with a preferred embodiment of the present invention, the printed circuit board 220 is formed with a protective anti-tamper mesh 238, which is preferably at least one layer of a dense array of two conductors arranged side by side and is connected to alarm circuitry, described hereinbelow. Printed circuit board 220 is also preferably provided with connectors 240, 242 and 244, which preferably provide an electrical connection between elements on the printed circuit board 220 and flexible cable 141, contact subassembly 180 and flexible cable 143, respectively. Connector 242 is preferably a Zebra connector.

Printed circuit board 220 preferably has mounted thereon a main processor 250 and its memory 252, which may contain highly sensitive information, as well as tamper detection and alarm circuitry 254. Tamper detection and alarm circuitry 254 may be conventional circuitry which provides an alarm, such as an audio or visually sensible alarm, in response to sensed detection of tampering, evidenced, for example by a short circuit or an open circuit in one or more protective mesh, such as mesh 238. Tamper detection and alarm circuitry 254 may also be responsive to tampering for erasing sensitive information and disabling communication of sensitive information.

Preferably, printed circuit board 220 is also formed with a plurality of apertures 290 for precise parallel spacing between smart card connector assembly 210 and printed circuit board 220. Preferably, printed circuit board 220 is additionally formed with a pair of apertures 292 for receiving bosses 114 and/or bosses 115.

Figure 3A:
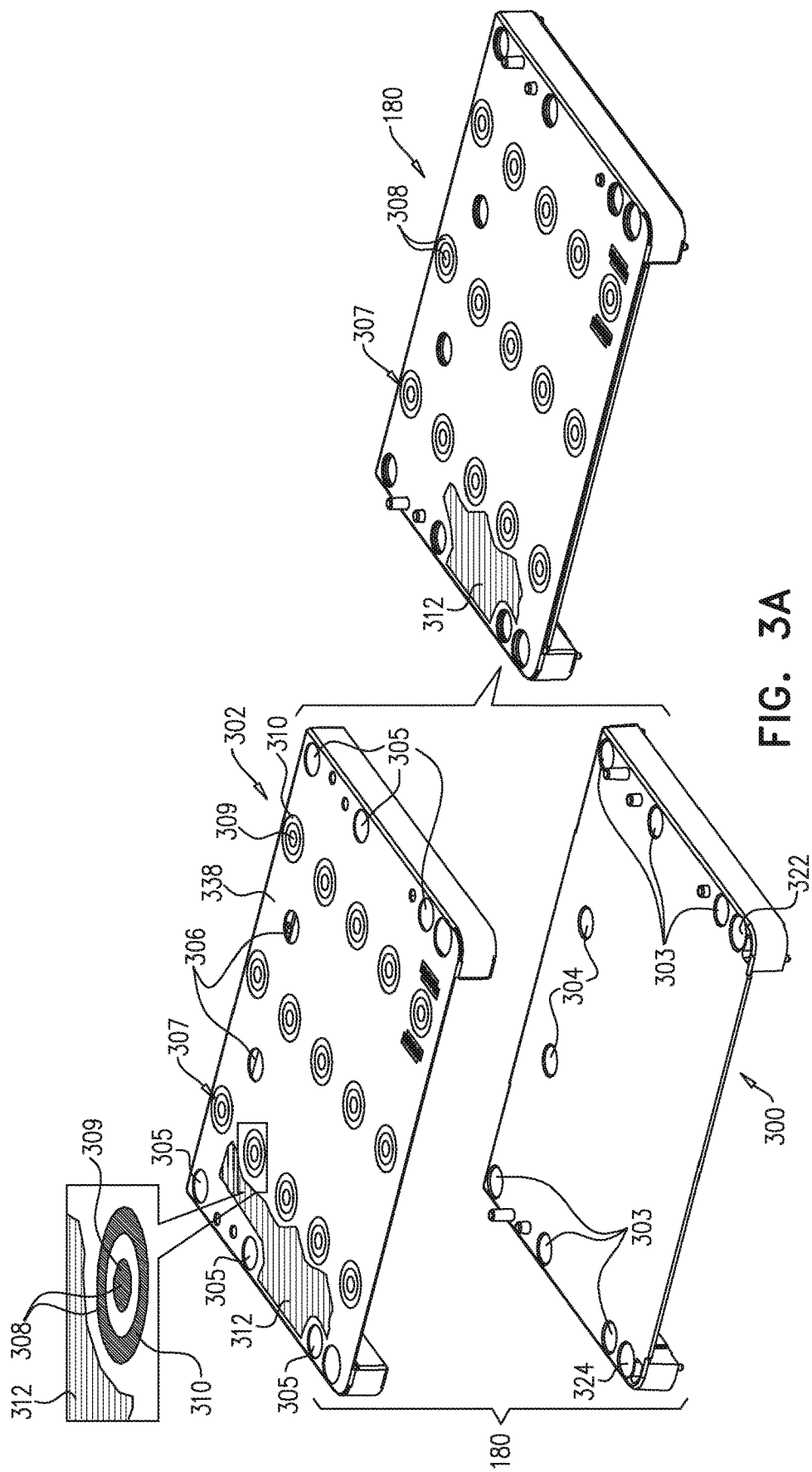
FIGS. 3A and 3B are simplified exploded view illustrations of a subassembly of the security volume assembly of FIGS. 2A & 2B, taken in respective downward and upward facing directions.
Figure 3B:
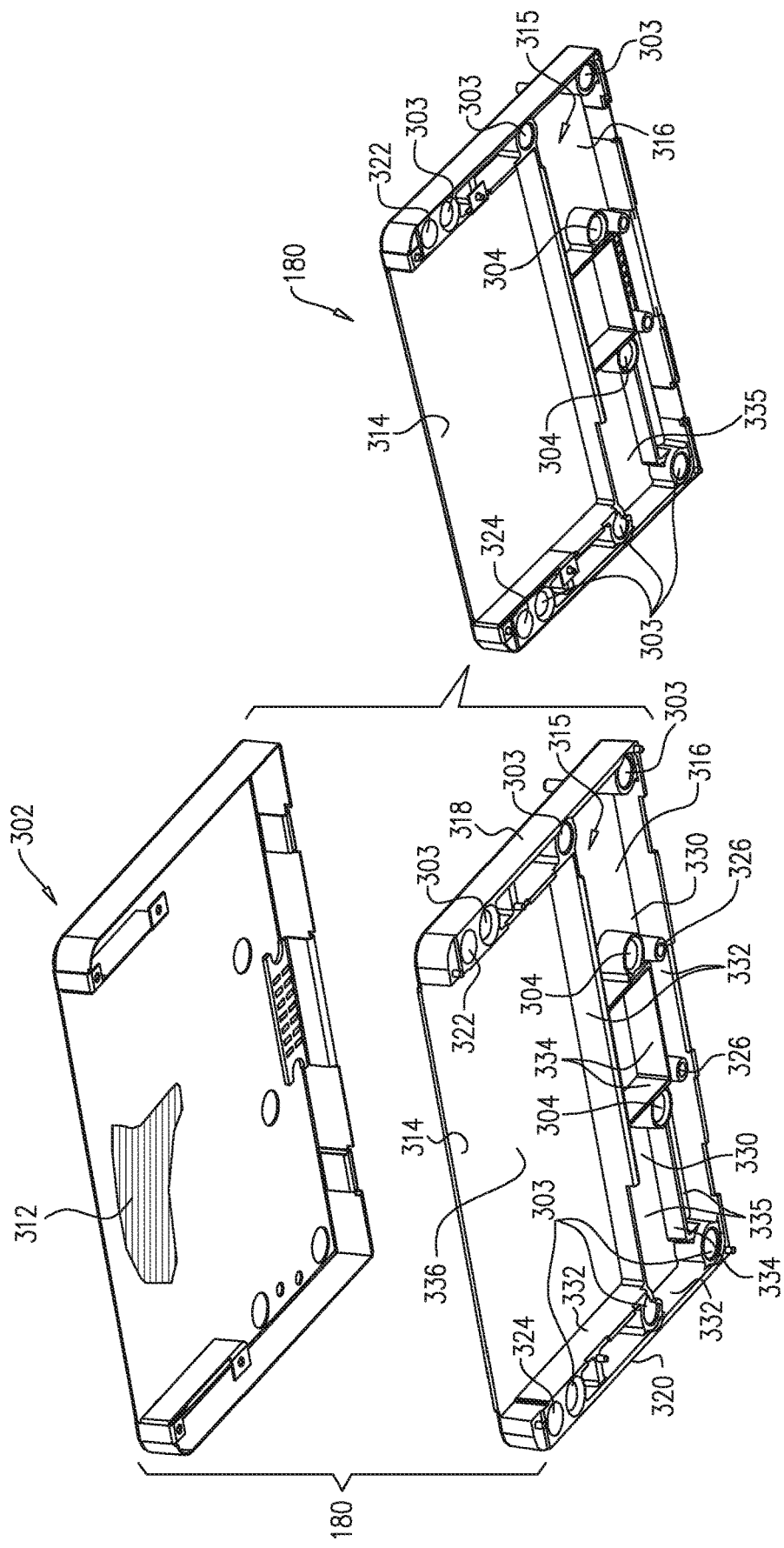

Reference is now made to FIGS. 3A and 3B, which are simplified exploded view illustrations of the contact subassembly 180 of the security volume assembly 140 of FIGS. 2A & 2B, taken in respective downward and upward facing directions, and to FIGS. 3C and 3D, which are simplified planar illustrations of two alternative embodiments of a subsequently folded element forming part of the subassembly of FIGS. 3A & 3B.

As seen in FIGS. 3A & 3B, contact subassembly 180 includes a frame 300, which partially surrounds smart card connector 210 (FIGS. 2A & 2B), and a folded flexible PCB 302, which is wrapped about frame 300. Frame 300 includes eight apertures, including six edge apertures 303, for accommodating corresponding pins 156 and two interior apertures 304, for accommodating corresponding pins 158. Folded flexible PCB 302 includes eight apertures, including six edge apertures 305, corresponding to apertures 303, for accommodating corresponding pins 156, and two interior apertures 306, corresponding to apertures 304, for accommodating corresponding pins 158.

Folded flexible PCB 302 preferably includes an array 307 of electrical contacts 308, preferably each including a central conductor 309 and at least one circumferential ring 310, which are short circuited by engagement therewith of respective domes 172 upon depression of respective keys 153 and resulting deformation of domes 172 by pins 155 of respective keys 153.

Folded flexible PCB 302 preferably further includes a protective anti-tamper mesh 312, preferably formed as at least one layer of a dense array of two electrical conductors arranged side by side and coupled to an alarm circuit, which is described hereinbelow.

As seen particularly in FIG. 3B, an underside of frame 300 includes a generally flat main portion 314 surrounded on three sides by a U-shaped support portion 315, including a central portion 316 and a pair of arms 318 and 320, extending perpendicularly therefrom. Arms 318 and 320 are each also formed with corresponding throughgoing apertures 322 and 324, respectively.

Central portion 316 may also be provided with a pair of internally threaded apertured bosses 326 for accommodating screws (not shown) which connect contact subassembly 180 of the security volume assembly 140 to PCB 220 and which assist in securing zebra connector 242 in place.

U-shaped support portion 315 has a generally recessed flat bottom surface 330, surrounded by an upstanding peripheral wall 332. Anti-tamper mesh 312, peripheral wall 332, a plurality of internal walls 334 and the anti-tamper mesh 238 on the printed circuit board 220 define a number of protected enclosures 335 in which various electronic components, such as magnetic stripe reader connector 142 and corresponding connector 240, LCD connector 144 and corresponding connector 244, main processor 250 and memory 252, which may contain highly sensitive information, such as encryption keys, and tamper detection and alarm circuitry 254 may be located. Zebra connector 242 (FIG. 2A) is preferably located between bosses 326, peripheral wall 332 and one of internal walls 334.

It is appreciated that anti-tamper mesh 312, generally flat main portion 314 and upstanding peripheral wall 332 and the anti-tamper mesh 238 on the printed circuit board 220 together define a protected zone 336 in which smart card connector assembly 210 is located.

If the main processor 250 is a stand-alone secure processor, it may be located outside of a protected zone.

Figure 3C:
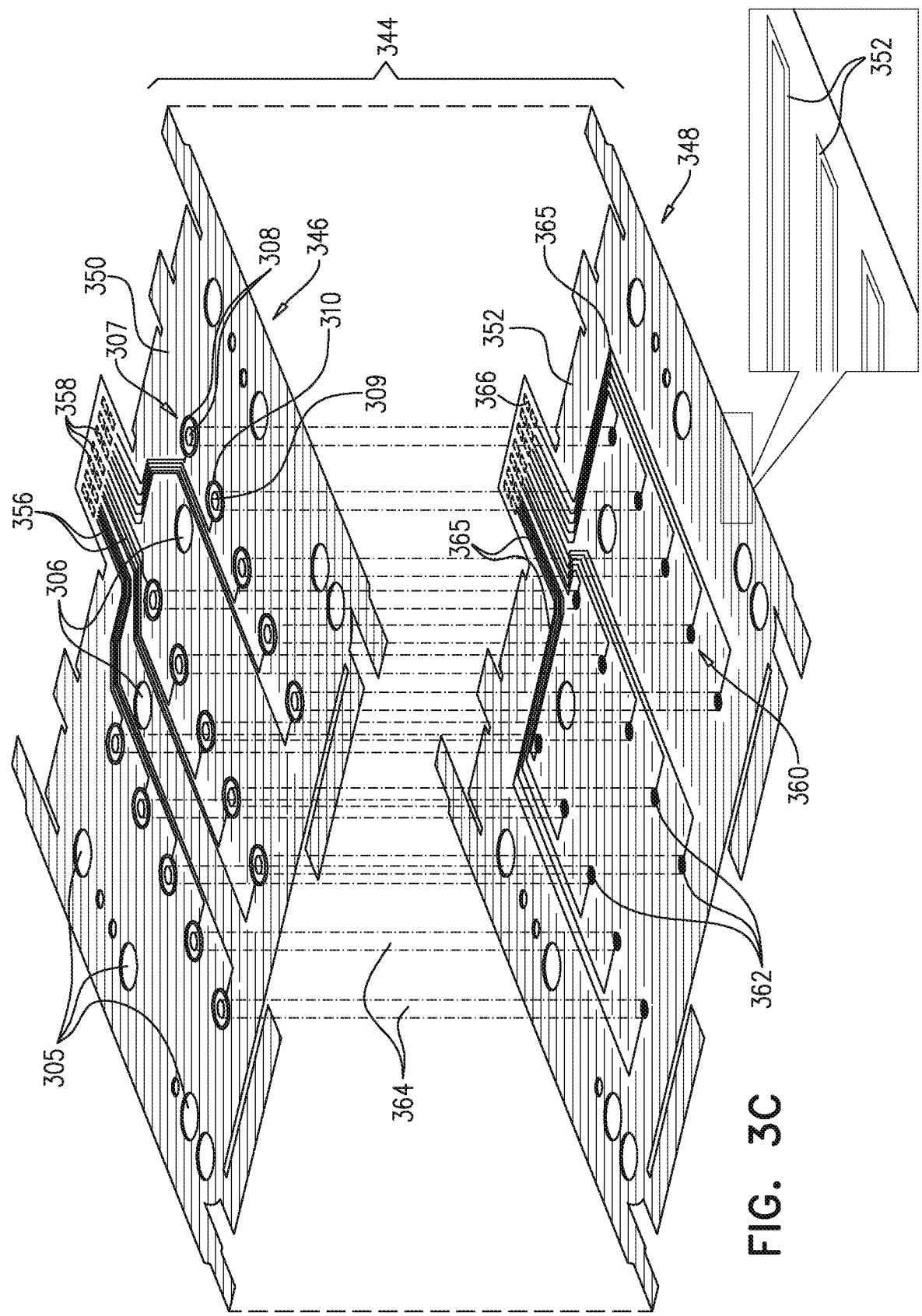
FIGS. 3C and 3D are simplified planar illustrations of two alternative embodiments of a subsequently folded element forming part of the subassembly of FIGS. 3A & 3B.

As seen in FIG. 3C, in one embodiment of the invention, the folded, flexible PCB 302, here shown in a flat state as indicated by reference numeral 344, includes two layers 346 and 348, preferably having respective protective anti-tamper meshes 350 and 352 along substantially their entire surfaces, each of protective anti-tamper meshes 350 and 352 being preferably formed of a dense array of pairs of side-by-side conductors which are coupled to tamper detection and alarm circuitry 254.

Layer 346 preferably includes array 307 of electrical contacts 308, each including each including a central conductor 309 and at least one circumferential ring 310, and is formed with edge apertures 305 and internal apertures 306. Layer 346 also includes conductors 356 which connect each circumferential ring 310 to a corresponding connector pad 358.

Layer 348 preferably includes an array 360 of pads 362, each of which underlies central conductor 309 and is coupled thereto by a via 364. Each of pads 362 is preferably connected by an electrical conductor 365 to a corresponding connector pad 366.

Anti-tamper mesh 350 preferably substantially surrounds each of electrical contacts 308, as well as edge apertures 305 and internal apertures 306, and provides anti-tamper protection thereto. Anti-tamper mesh 350 also protects electrical conductors 365 from above. This is important since electrical conductors 365 normally carry signals representing key presses, which may contain sensitive PIN (Personal Identification Number) information.

Anti-tamper mesh 352 preferably substantially surrounds each of pads 362, electrical conductors 365 and connector pads 366 as well as edge apertures 305 and internal apertures 306 and provides anti-tamper protection thereto.

Figure 3D:
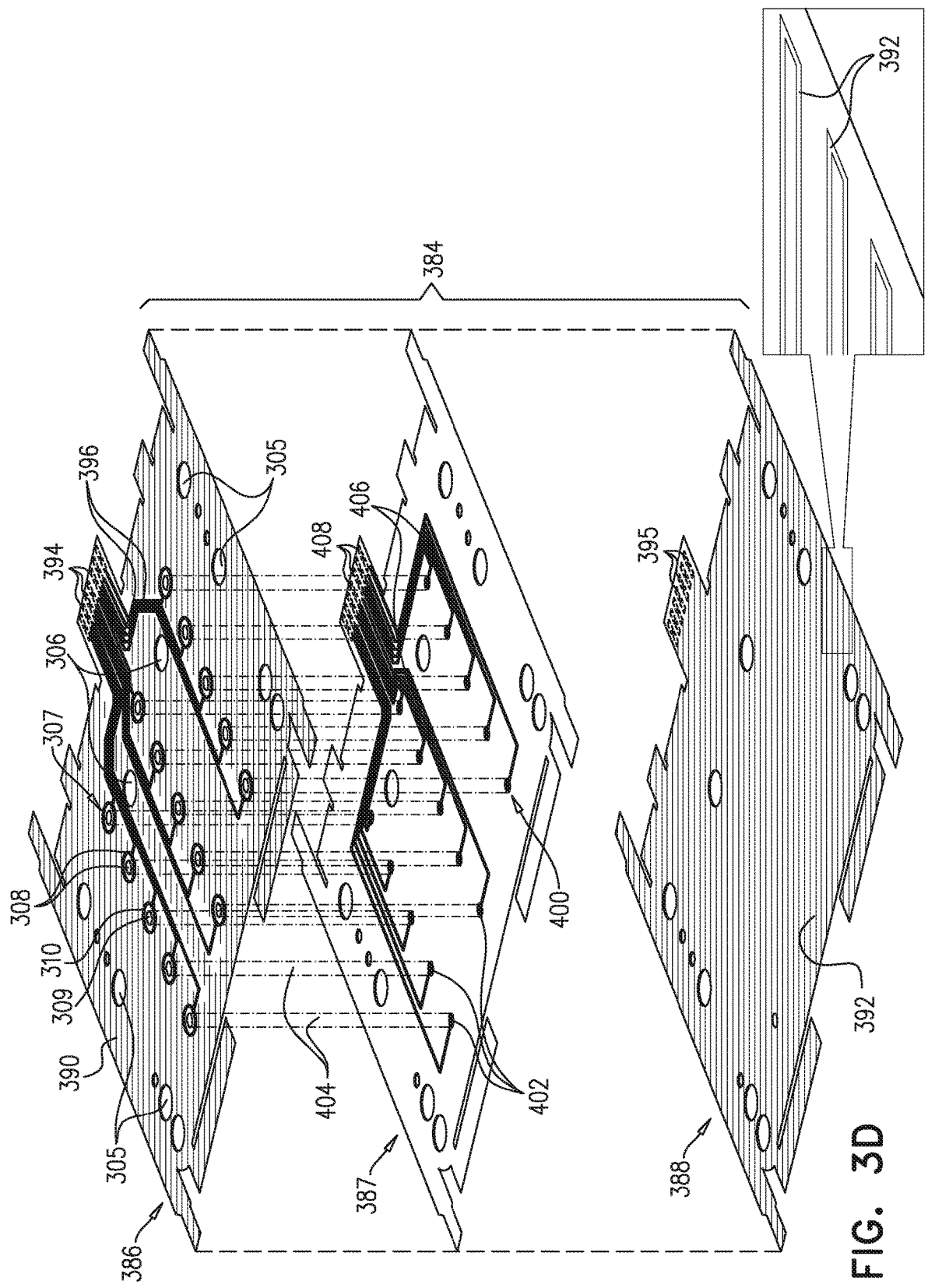

As seen in FIG. 3D, in another embodiment of the invention, the folded flexible PCB, here shown in a flat state as indicated by reference numeral 384, includes three layers 386, 387 and 388. Layer 386 may be identical to layer 346 of the embodiment of FIG. 3C.

Layers 386 and 388 preferably having respective protective anti-tamper meshes 390 and 392 along substantially their entire surfaces. Each of protective anti-tamper meshes 390 and 392 is preferably formed of a dense array of pairs of side-by-side conductors which are coupled to tamper detection and alarm circuitry 254 via respective connector pads 394 and 395. Preferably one of the side-by-side conductors in each pair may be connected to ground, while the other of the side-by-side conductors in each pair may be coupled to a voltage other than ground and preferably carries an anti-tamper signal.

Layer 386 preferably includes array 307 of electrical contacts 308, each including each including a central conductor 309 and at least one circumferential ring 310, and is formed with edge apertures 305 and internal apertures 306. Layer 386 also includes conductors 396 which connect each circumferential ring 310 to a corresponding connector pad 398.

Layer 387 preferably includes an array 400 of pads 402, each of which underlies central conductor 309 and is coupled thereto by a via 404. Each of pads 402 is preferably connected by an electrical conductor 406 to a corresponding connector pad 408.

Anti-tamper mesh 390 preferably substantially surrounds each of electrical contacts 308, as well as edge apertures 305 and internal apertures 306, and provides anti-tamper protection thereto. Anti-tamper mesh 390 also protects electrical conductors 406 from above. This is important since electrical conductors 406 normally carry signals representing key presses, which may contain sensitive PIN (Personal Identification Number) information.

Anti-tamper mesh 392 preferably protects array 307 of electrical contacts 308, electrical conductors 396 and array 400 of pads 402 and electrical conductors 406 from below.

Reference is now made to FIGS. 4A, 4B, 4C, 4D, 4E and 4F, which are simplified illustrations of steps in folding of folded flexible PCB 302 of either of the embodiments shown in FIGS. 3C & 3D.

Figure 4A:
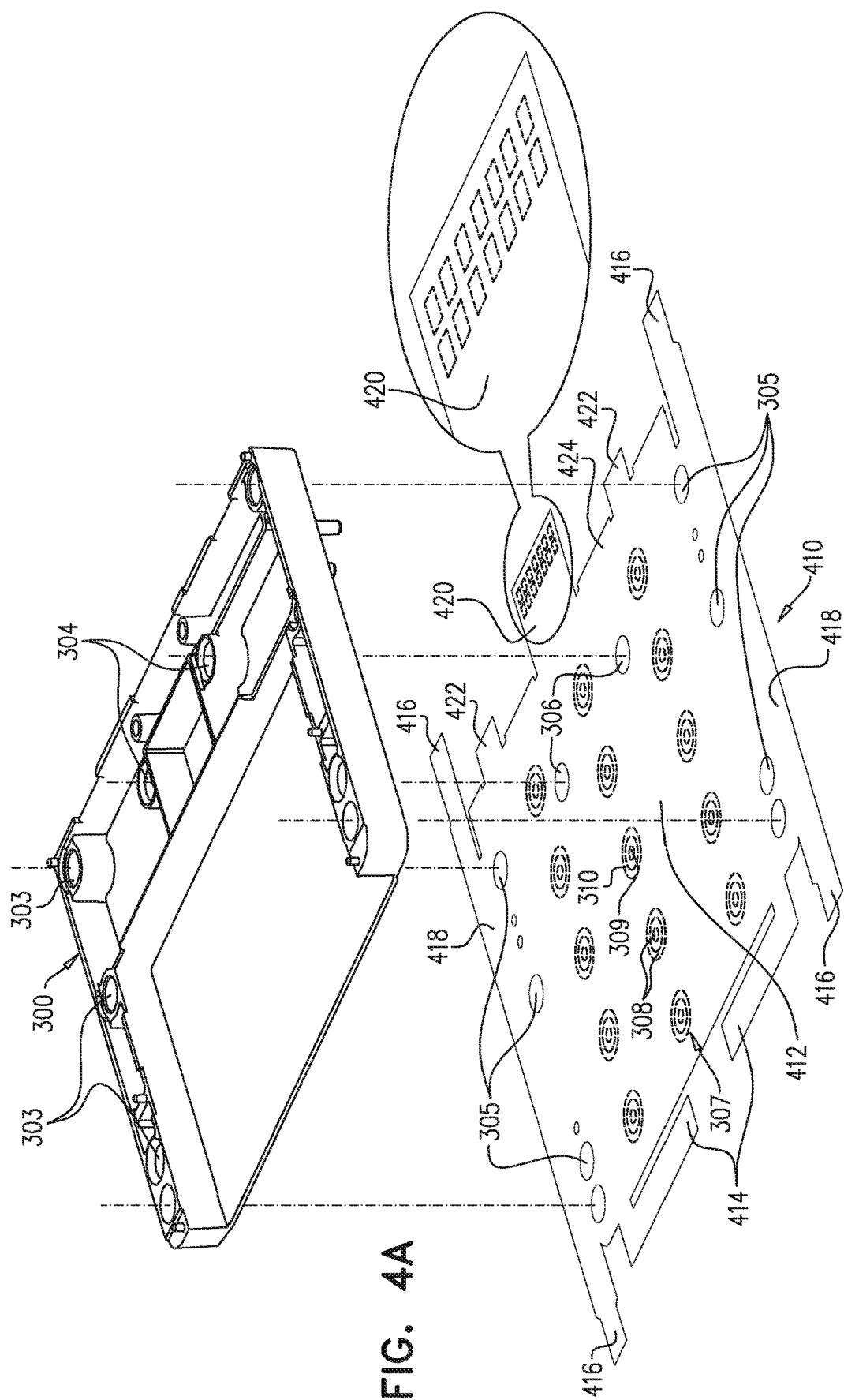

As seen in FIG. 4A, prior to folding, flexible PCB 302, is a generally flat multi-layer PCB 410 of generally rectangular configuration. Generally flat multi-layer PCB 410 preferably includes a main portion 412 having formed on an underside surface thereof (in the sense of FIG. 4A) array 307 of electrical contacts 308, each including each including a central conductor 309 and at least one circumferential ring 310. Main portion 412 is formed with edge apertures 305 and internal apertures 306.

Extending outwardly from main portion 412 are a pair of forward edge flaps 414, four corner flaps 416, two side edge flaps 418, a connector flap 420, a pair of fold over back flaps 422 and a back edge flap 424. It is appreciated that preferably all of the above flaps are provided with anti-tamper meshes along substantially the entire extent thereof.

As seen in FIGS. 4A and 4B, frame 300 is initially aligned over main portion 412, such that apertures 305 and 306 of the multi-layer PCB 410 are aligned with corresponding apertures 303 and 304 of the frame 300.

As seen in FIG. 4C, preferably side flaps 418 are folded up over corresponding side edge surfaces of frame 300. As seen in FIG. 4D, preferably corner flaps 416 are folded over both front corner surfaces of frame 300 and adjacent portions of peripheral wall surface 332 and over corner portions of a back edge surface of frame 300.

FIG. 4E shows that forward edge flaps 414 are folded up over those portions of flaps 416 which extend along peripheral wall surface 332. Folded forward edge flaps 414 also extend further inwardly along peripheral wall surface 332 beyond flaps 416. FIG. 4E also shows that the connector flap 420 and pair of fold over back flaps 422 and the back edge flap 424 are raised and folded over back surface of frame 300.

FIG. 4F shows back flaps 422 folded over corresponding back portions of peripheral wall surface 332 and connector flap 420 being double folded so as to be located within one of protected enclosures 335 between bosses 326.

It is a particular feature of an embodiment of the present invention that there is provided a security volume, which in the illustrated embodiment is defined by anti-tamper meshes 238 and 312, which encloses at least part of the printed circuit board, at least part of the smartcard connector and a plurality of keypad contacts. Tamper detection switch assemblies 222 extend through apertures in anti-tamper meshes 312 and provide further protection for the security volume.

It is also a particular feature of the present invention that the security volume is defined at least in part by a folded single flexible PCB, which provides protection for at least one planar surface of the volume and wherein side folded edges of the PCB provide side edge protection to the enclosure.

Figure 5A:
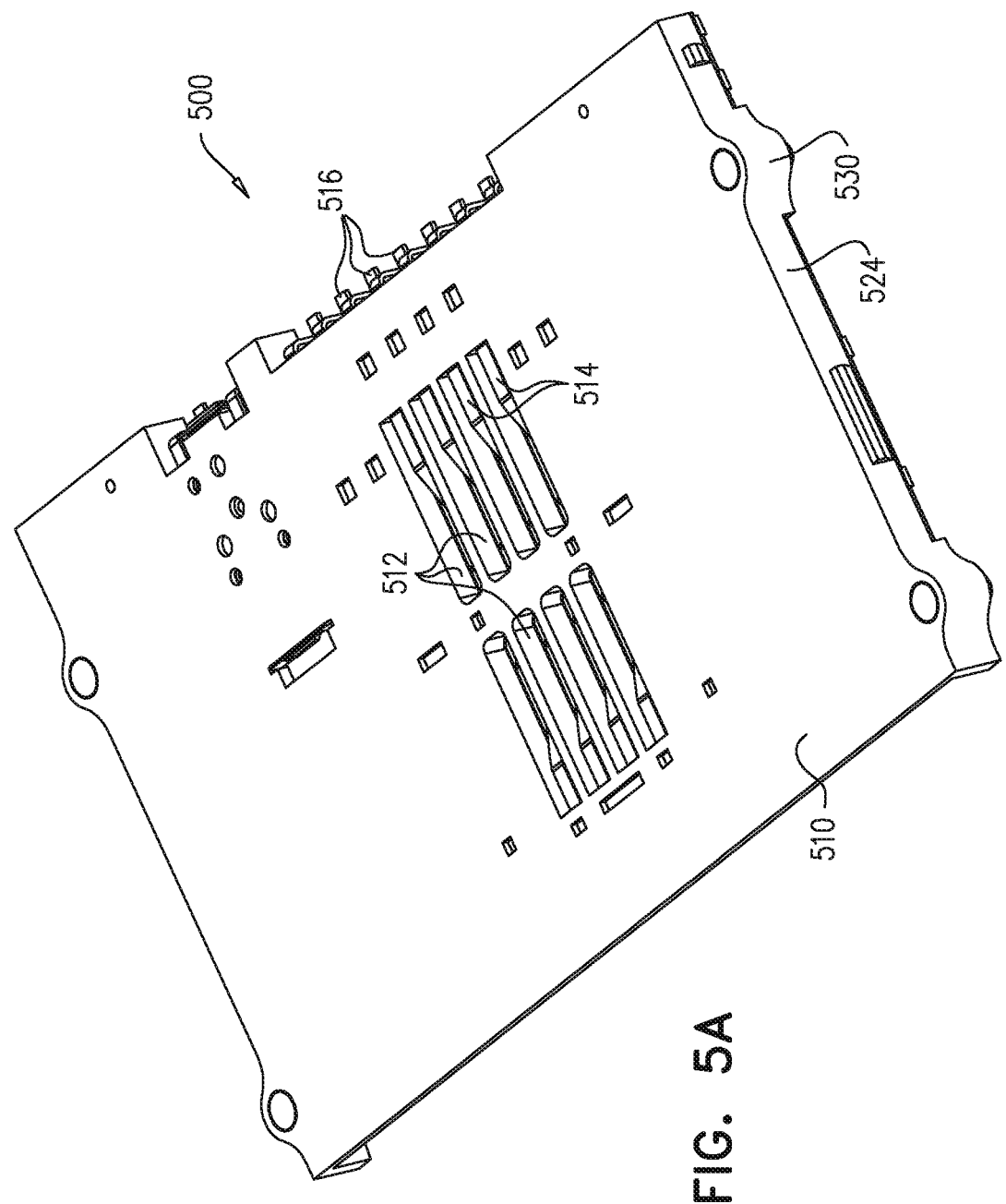
FIGS. 5A and 5B are simplified pictorial illustrations of a first embodiment of another subassembly of the security volume assembly shown in FIGS. 2A & 2B, taken in respective downward and upward facing directions.
Figure 5B:
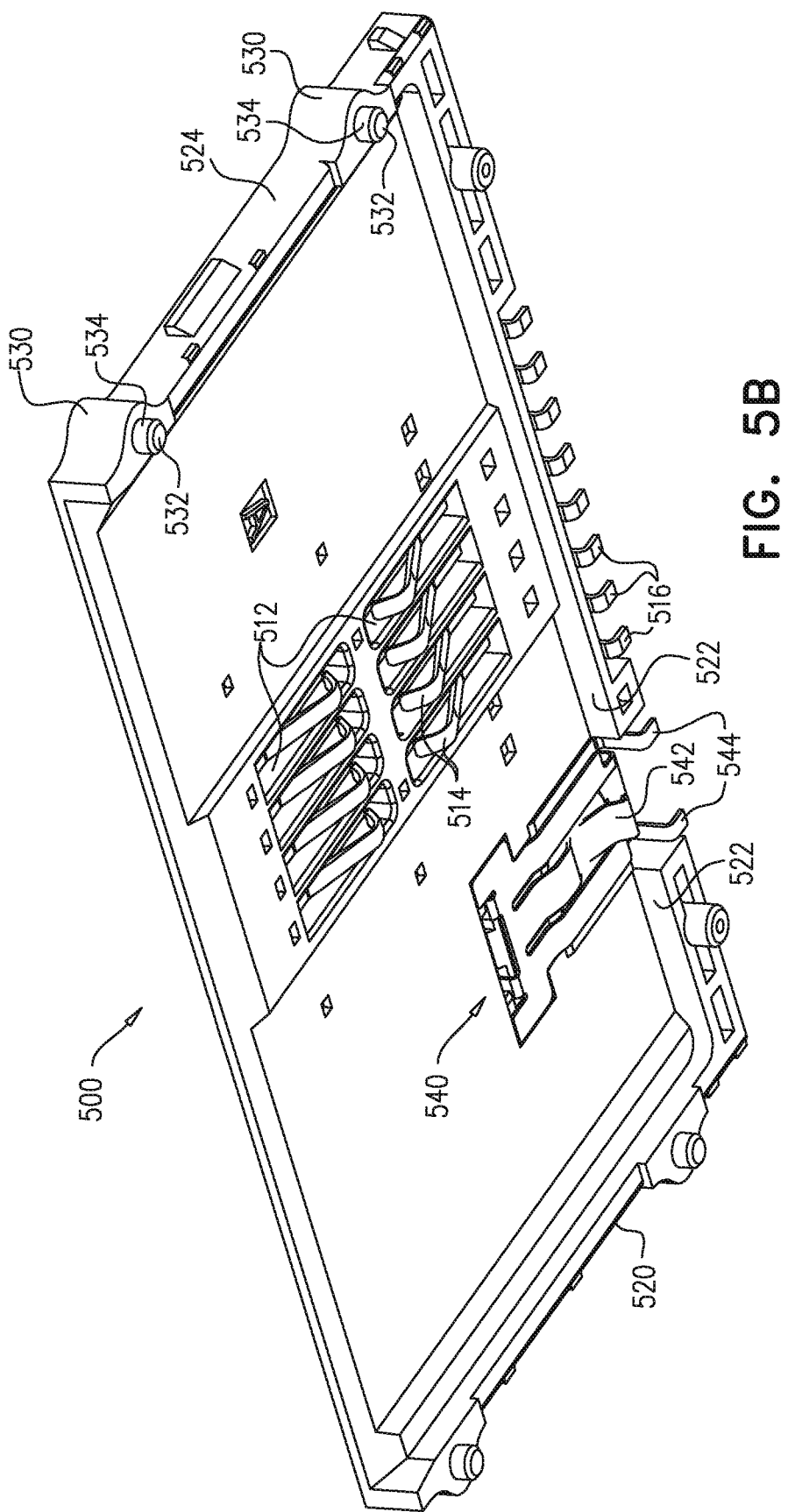

Reference is now made to FIGS. 5A and 5B, which are simplified exploded view illustrations of a first embodiment 500 of smart card connector assembly 210 (FIGS. 2A & 2B), of the security volume assembly 140 shown in FIGS. 2A & 2B, taken in respective downward and upward facing directions, and to FIG. 5C, which is a simplified assembled view illustration of the subassembly of FIGS. 5A & 5B together with printed circuit board 220, shown in FIGS. 1A-2B, cooperating therewith.

As seen in FIGS. 5A-5C, the smart card connector assembly 500 includes a generally rectangular slot surface defining element 510 typically formed of plastic and including an array of eight apertures 512, each of which accommodates a smart card reading spring contact 514. Each of smart card reading spring contacts 514 is coupled to a corresponding electrical edge contact 516. Generally rectangular slot surface defining element 510 is preferably formed with depending wall portions 520, 522 and 524 along three edges thereof.

Adjacent corners of slot surface defining element 510 there are side protrusions 530, each of which is formed with a downward facing peg 532 having a circumferential wall surface 534. Pegs 532 are configured for insertion into apertures 290 on printed circuit board 220 to provide precise parallel spacing between slot surface defining element 510 and printed circuit board 220. Alternatively, protrusions 530 may be obviated and pegs 532 may be formed on a downward facing surface of slot surface defining element 510 adjacent corners thereof. Optionally, additional pegs 532 may be included on a downward facing surface of slot surface defining element 510.

An additional spring contact assembly 540, including a spring contact finger 542, is also mounted on slot surface defining element 510 and is connected to electrical edge contacts 544. Assembly 540 is operative for card entry detection.

Turning particularly to FIG. 5C, it is seen that slot surface defining element 510 is mounted in parallel precise propinquity to printed circuit board 220 by inserting pegs 532 into apertures 290 on printed circuit board 220, thereby defining a smart card read/write slot 550, which corresponds to smart card read/write slot 145 (FIGS. 1A & 1B).

It is a particular feature of this embodiment of the present invention that a significant reduction in the thickness of the smart card reader device is realized by defining slot 550 between slot surface defining element 510 and printed circuit board 220. A preferred embodiment has an overall thickness of 2.5 mm from the top surface of the printed circuit board 220 to the upward facing surface of slot surface defining element 510.

It is a particular feature of the embodiment of FIGS. 5A & 5B that the smart card connector 500 cooperates with printed circuit board 220 to define a smart card reading volume into which a smart card is inserted via slot 550 for reading thereof.

Figure 6A:
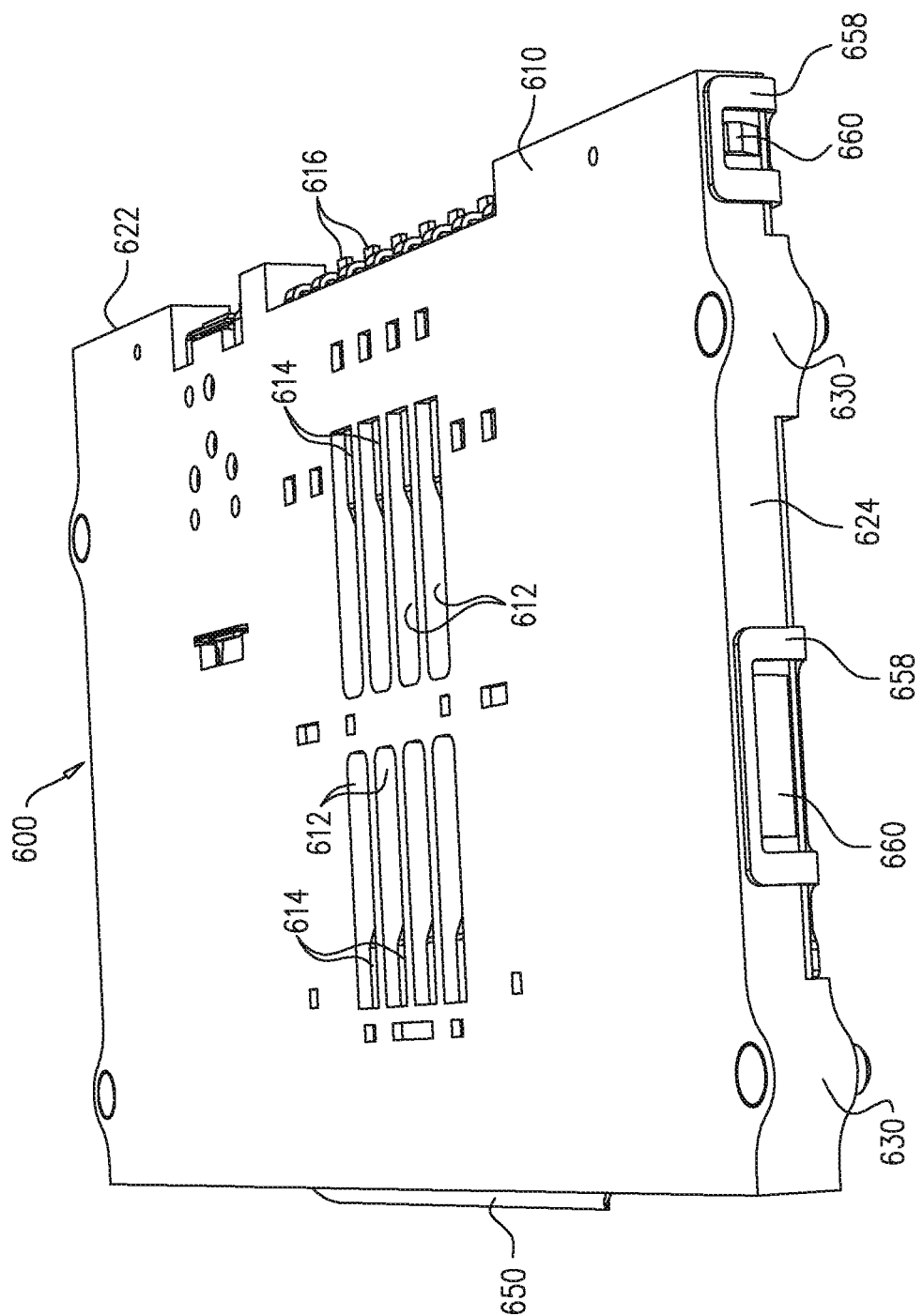
FIGS. 6A and 6B are simplified view illustrations of a second embodiment of another subassembly of the security volume assembly shown in FIGS. 2A & 2B, taken in respective downward and upward facing directions.
Figure 6B:
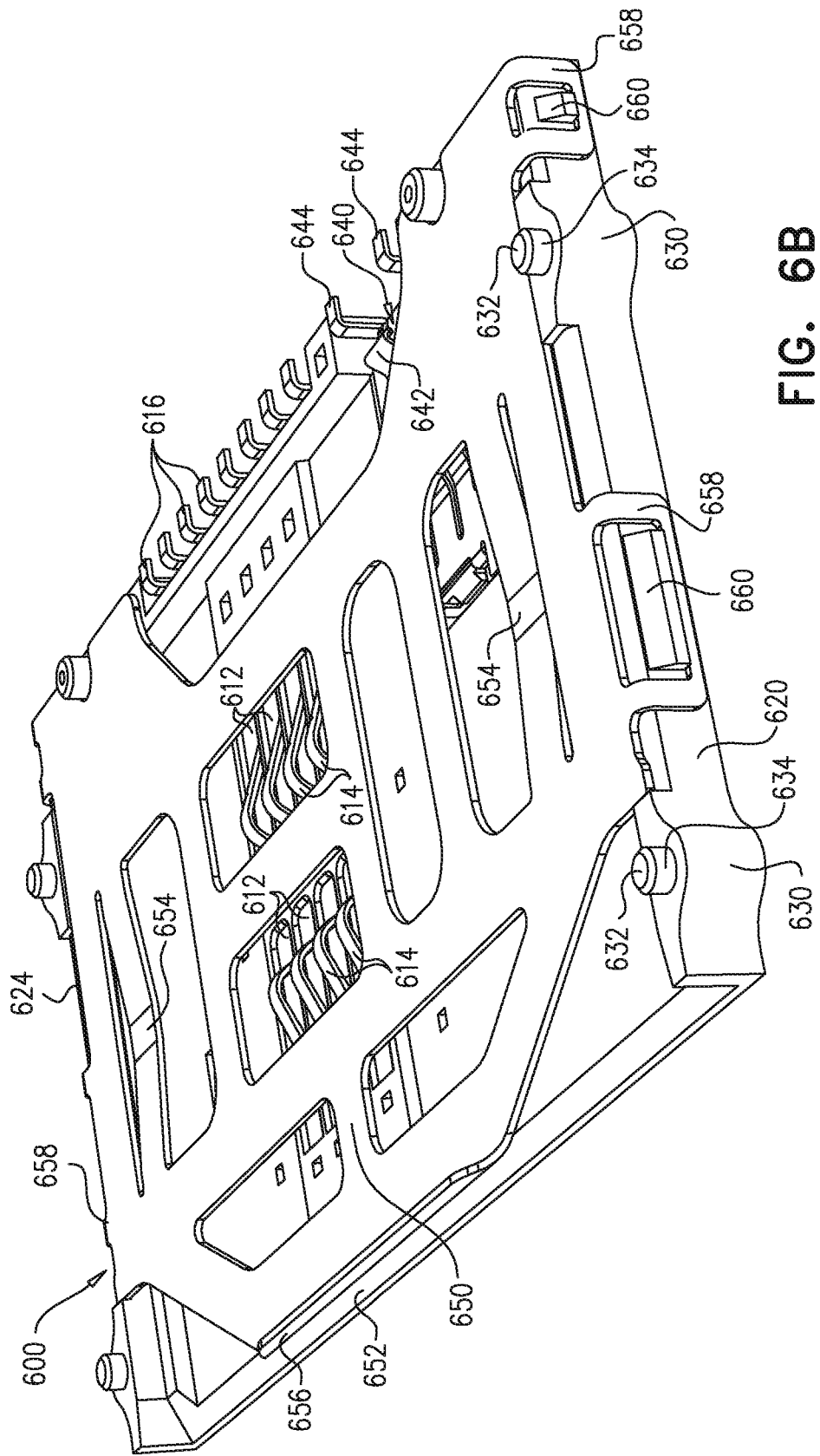
Figure 6C:
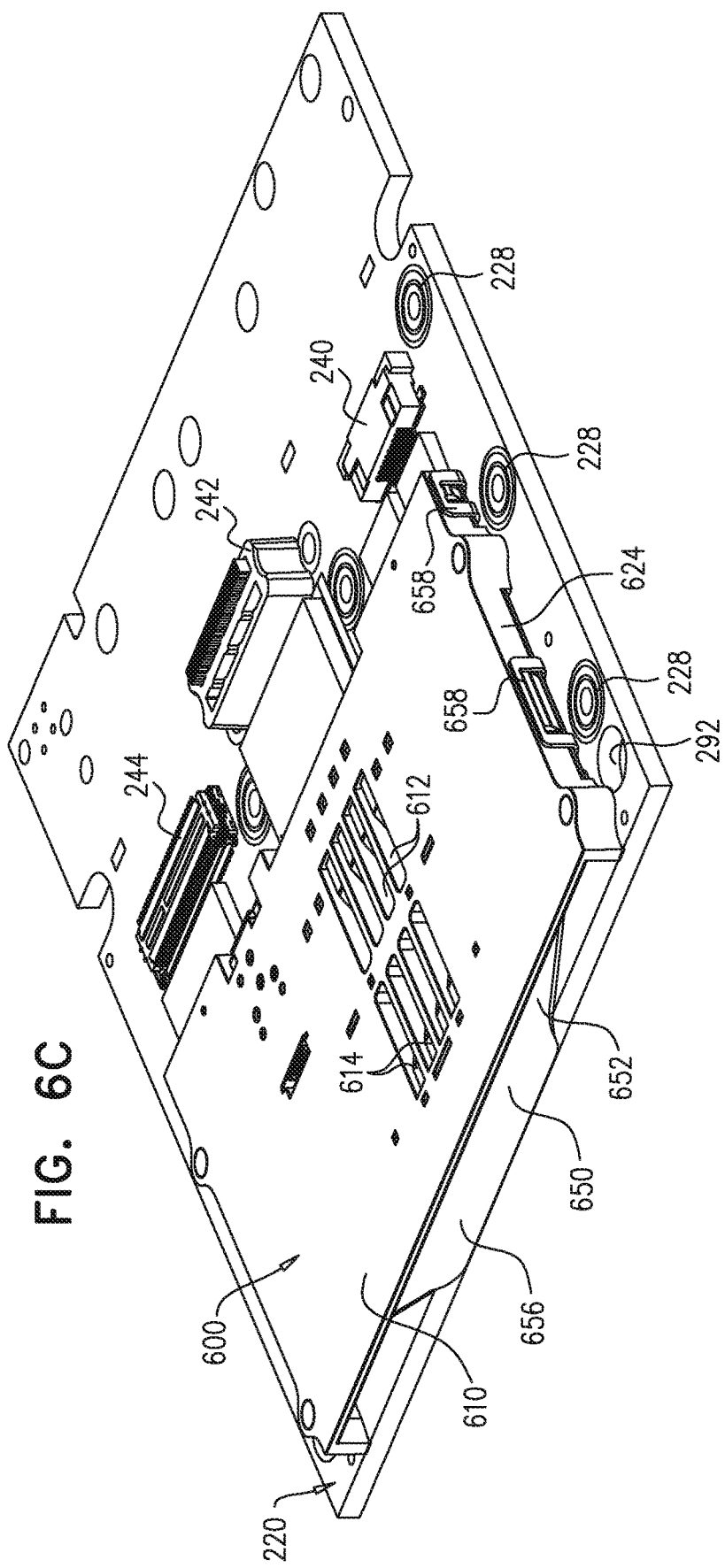
FIG. 6C is a simplified assembled view illustration of the subassembly of FIGS. 6A & 6B together with a printed circuit board shown in FIGS. 1A-2B, cooperating therewith.
Figure 6D:
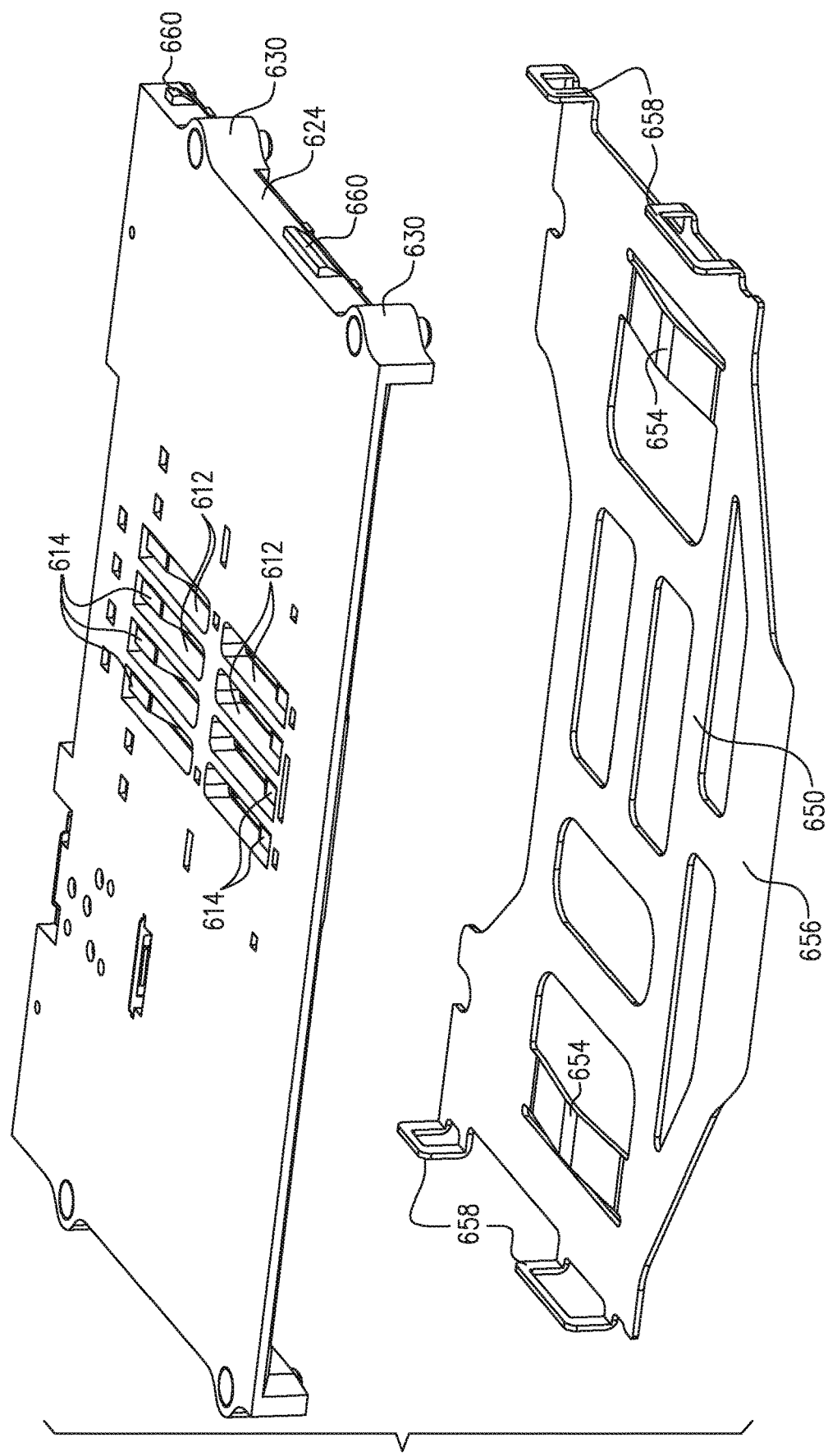
FIG. 6D is a simplified exploded view illustration of the subassembly of FIGS. 6A and 6B.

Reference is now made to FIGS. 6A and 6B, which are simplified exploded view illustrations of a second embodiment 600 of smart card connector assembly 210 (FIGS. 2A & 2B), of the security volume assembly 140 shown in FIGS. 2A & 2B, taken in respective downward and upward facing directions, to FIG. 6C, which is a simplified assembled view illustration of the subassembly of FIGS. 6A & 6B together with printed circuit board 220, shown in FIGS. 1A-2B, cooperating therewith, and to FIG. 6D, which is a simplified exploded view illustration of the subassembly of FIGS. 6A and 6B.

As seen in FIGS. 6A-6D, the smart card connector assembly 600 includes a generally rectangular slot surface defining element 610 typically formed of plastic and including an array of eight apertures 612, each of which accommodates a smart card reading spring contact 614. Each of smart card reading spring contacts 614 is coupled to a corresponding electrical edge contact 616. Generally rectangular slot surface defining element 610 is preferably formed with depending wall portions 620, 622 and 624 along three edges thereof.

Adjacent corners of slot surface defining element 610 are formed side protrusions 630, each of which is formed with a downward facing peg 632 having a circumferential wall surface 634. Pegs 632 are configured for insertion into apertures 290 on printed circuit board 220 to provide precise parallel spacing between slot surface defining element 610 and printed circuit board 220. Alternatively, protrusions 630 may be obviated and pegs 632 may be formed on a downward facing surface of slot surface defining element 610 adjacent corners thereof. Optionally, additional pegs 632 may be included on a downward facing surface of slot surface defining element 610.

An additional spring contact assembly 640, including a spring contact finger 642, is also mounted on slot surface defining element 610, which is connected to electrical edge contacts 644. Assembly 640 is operative for card entry detection.

As distinguished from the embodiment of FIGS. 5A-5C, and as seen particularly in FIGS. 6B and 6C, the smart card connector assembly 600 of FIGS. 6A-6D also includes an apertured metal underplate 650 which provides electrical static discharge and also defines a smart card read/write slot 652, which corresponds to slot 145 (FIGS. 1A & 1B). Additionally, underplate 650 provides enhanced structural integrity to the smart card connector assembly 650.

A pair of springs 654 are integrally formed with underplate 650 and serve urge a smart card upwardly such that electrical contacts of the smart card (not shown) engage smart card reading spring contacts 614. Springs 654 may also provide electrostatic discharge.

Preferably, underplate 650 is formed with a lip 656 for engagement with an edge of printed circuit board 220. Additionally, underplate 650 is preferably provided with two pairs of side engagement portions 658 for engagement with corresponding protrusions 660 on wall portions 620 and 624 of the smart card connector assembly 600.

It is a particular feature of this embodiment of the present invention that a significant reduction in the thickness of the smart card reader device is realized by defining slot 652 between slot surface defining element 610 and metal underplate 650. A preferred embodiment has an overall thickness of 2.8 mm from the top surface of the printed circuit board 220 to the upward facing surface of slot surface defining element 610.

It is a particular feature of the embodiment of FIGS. 6A & 6B that the smart card connector 600 cooperates with underplate 650 to define a smart card reading volume into which a smart card is inserted via slot 652 for reading thereof.

Figure 7A:
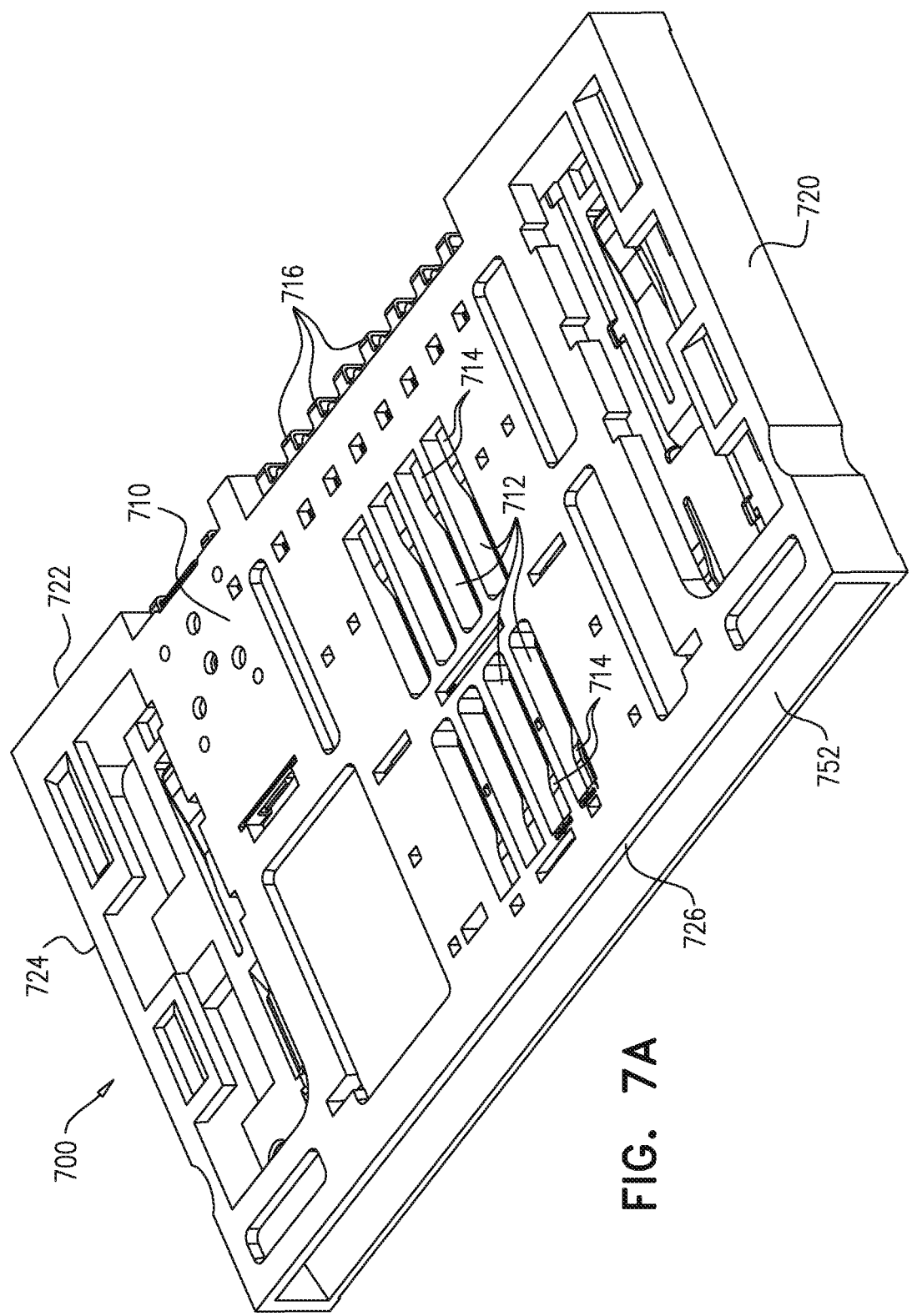
FIGS. 7A and 7B are simplified view illustrations of a third embodiment of another subassembly of the security volume assembly shown in FIGS. 2A & 2B, taken in respective downward and upward facing directions.
Figure 7B:
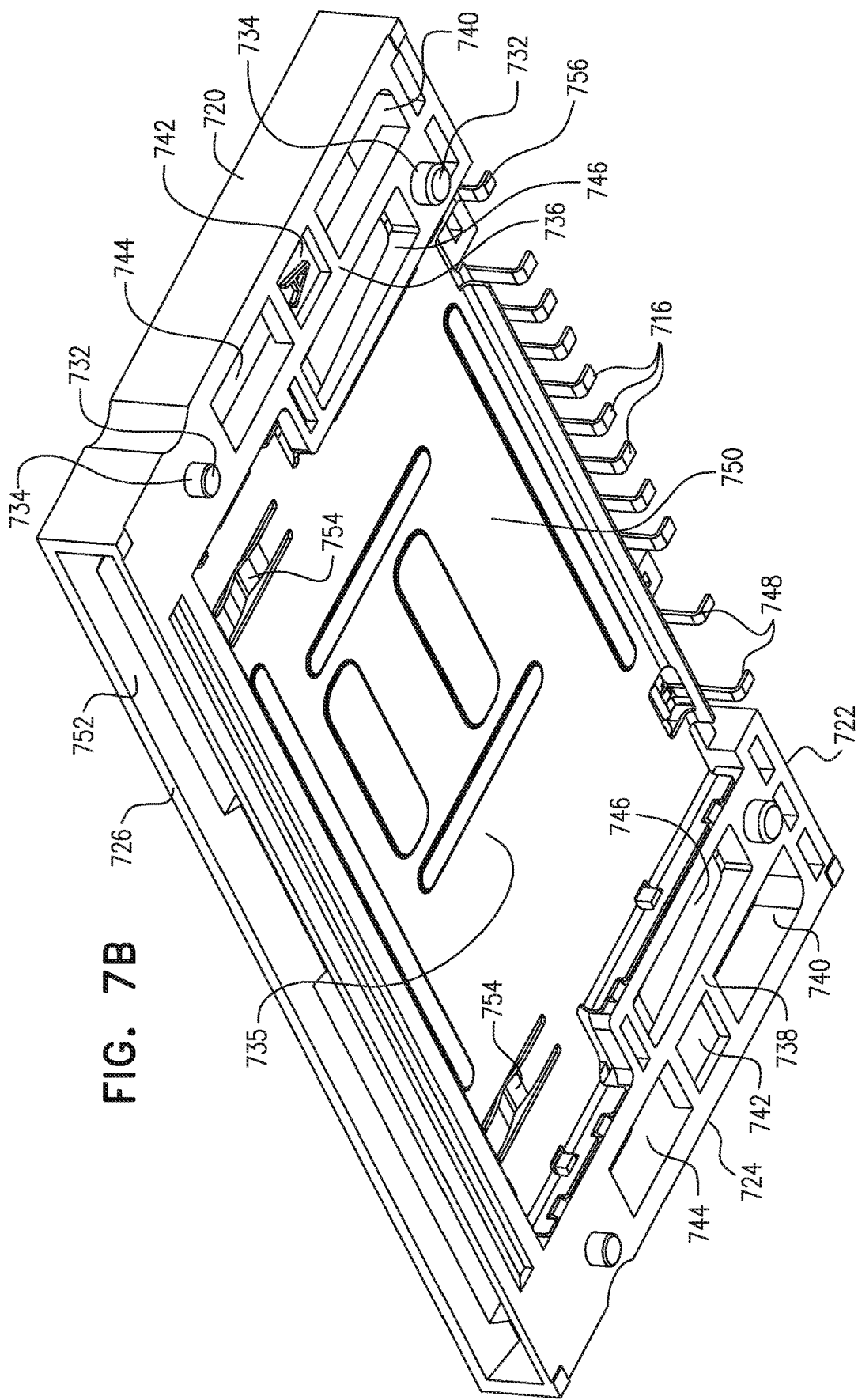
Figure 7C:
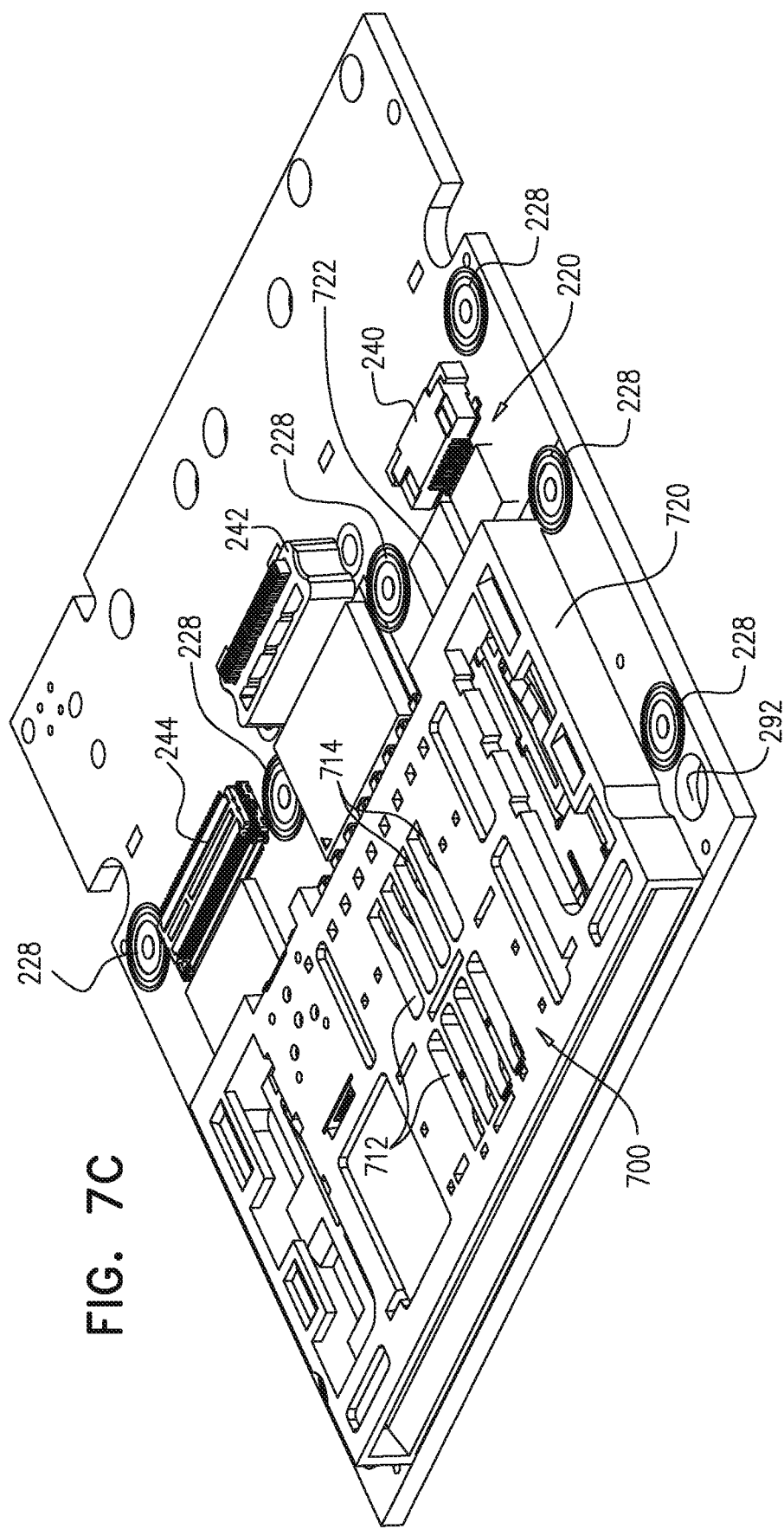
FIG. 7C is a simplified assembled view illustration of the subassembly of FIGS. 7A & 7B together with a printed circuit board shown in FIGS. 1A-2B, cooperating therewith.

Reference is now made to FIGS. 7A and 7B, which are simplified exploded view illustrations of a third embodiment 700 of smart card connector assembly 210 (FIGS. 2A & 2B) of the security volume assembly shown in FIGS. 2A & 2B, taken in respective downward and upward facing directions, and to FIG. 7C, which is a simplified assembled view illustration of the subassembly of FIGS. 7A & 7B together with printed circuit board 220, shown in FIGS. 1A-2B, cooperating therewith.

As seen in FIGS. 7A-7C, smart card connector assembly 700 includes a generally rectangular element 710, typically formed of plastic and including an array of eight apertures 712, each of which accommodates a smart card reading spring contact 714. Each of smart card reading spring contacts 714 is coupled to a corresponding electrical edge contact 716.

Generally rectangular element 710 is preferably formed with depending wall portions 720, 722 and 724 along three edges thereof and with a slot opening defining edge portion 726.

Formed on an underside surface of element 710 are downward facing pegs 732, each having a circumferential wall surface 734. Pegs 732 are configured for insertion into apertures 290 on printed circuit board 220 to provide parallel spacing between element 710 and printed circuit board 220. It is seen in FIG. 7B that a bottom side of element 710 includes a main recess 735, which is bordered by raised side portions 736 and 738, each of which may have multiple openings, such as those designated by reference numerals 740, 742, 744 and 746 for accommodating additional components within the security volume assembly 140 (FIGS. 1A & 1B).

An additional spring contact assembly (not shown), including a spring contact finger (not shown), is also mounted on element 710 and is connected to electrical edge contacts 748. This assembly is operative for card entry detection.

As distinguished from the embodiment of FIGS. 5A-5C, and as seen particularly in FIGS. 7A and 7C, smart card connector assembly 700 of FIGS. 7A-7C also includes an apertured metal underplate 750, which may be molded into element 710 and defines the floor of main recess 735.

Underplate 750 and element 710 together define smart card read/write slot 752, which corresponds to slot 145 (FIGS. 1A & 1B). Underplate 750 may include spring fingers 754, similar to springs 654 in the metal plate in FIG. 6D, which preferably push a smart card located in slot 752 into reading engagement with spring contacts 714 and may also provide electrical static discharge. Additionally, underplate 750 provides enhanced structural integrity to the smart card connector assembly 700. An electrical edge contact 756 is connected to metal underplate 750 for grounding and electrical static discharge protection.

It is a particular feature of embodiments of the present invention that the keypad element 150 and the array 170 of domes 172, the array 307 of electrical contacts 308 and the smart card connector 210 are all located on the same side of the printed circuit board 220.

It is a particular feature of the present invention that electrical contacts 228 of tamper detection switch assemblies 222 are aligned with each one of pins 156 and 158 and corresponding apertures 166 & 168, 186 & 188 and 305 & 306, such that, in the absence of tampering, carbon pills 226 fixed to the bottom surfaces of pins 156 and 158, extend through respective apertures 166 & 168, 186 & 188 and 305 & 306, into circuit closing engagement with central conductor 232 and at least one of at least one circumferential ring 234 of electrical contact arrays 228. If the housing is opened, this electrical engagement is interrupted, producing an alarm.

It is a particular feature of this embodiment of the present invention that pins 156 and 158 extend through at least one protective anti-tamper mesh and thus provide mutual protection.

It is a further particular feature of an embodiment of the present invention that the protective security anti-tamper mesh 312, which is connected to tamper detection and alarm circuitry 254, protects connections to the various electrical contacts 228, connectors 240, 242 and 244 and also protects smart card reading spring contacts, 514, 614 and 714 and electrical edge contacts 516, 616 and 716 from tampering.

It is a further particular feature of an embodiment of the present invention that security volume assembly 140 is protected by at least one zebra connector 242, a plurality of tamper detection switch assemblies 222 and a multi-layer flexible circuit board 302 including at least one protective security anti-tamper mesh 312, which is connected to tamper detection and alarm circuitry 254, and wherein protective security anti-tamper mesh 312 protects the plurality of tamper detection switch assemblies 222 and zebra connector 242 from unauthorized access. Zebra connector 242 and the plurality of tamper detection switch assemblies 222 together protect the protective security anti-tamper mesh 312 from being removed or lifted.

It is appreciated that anti-tamper meshes 238 and 312 and tamper detection switch assemblies 222 are preferably all connected to tamper detection and alarm circuitry 254.

Figure 8A:
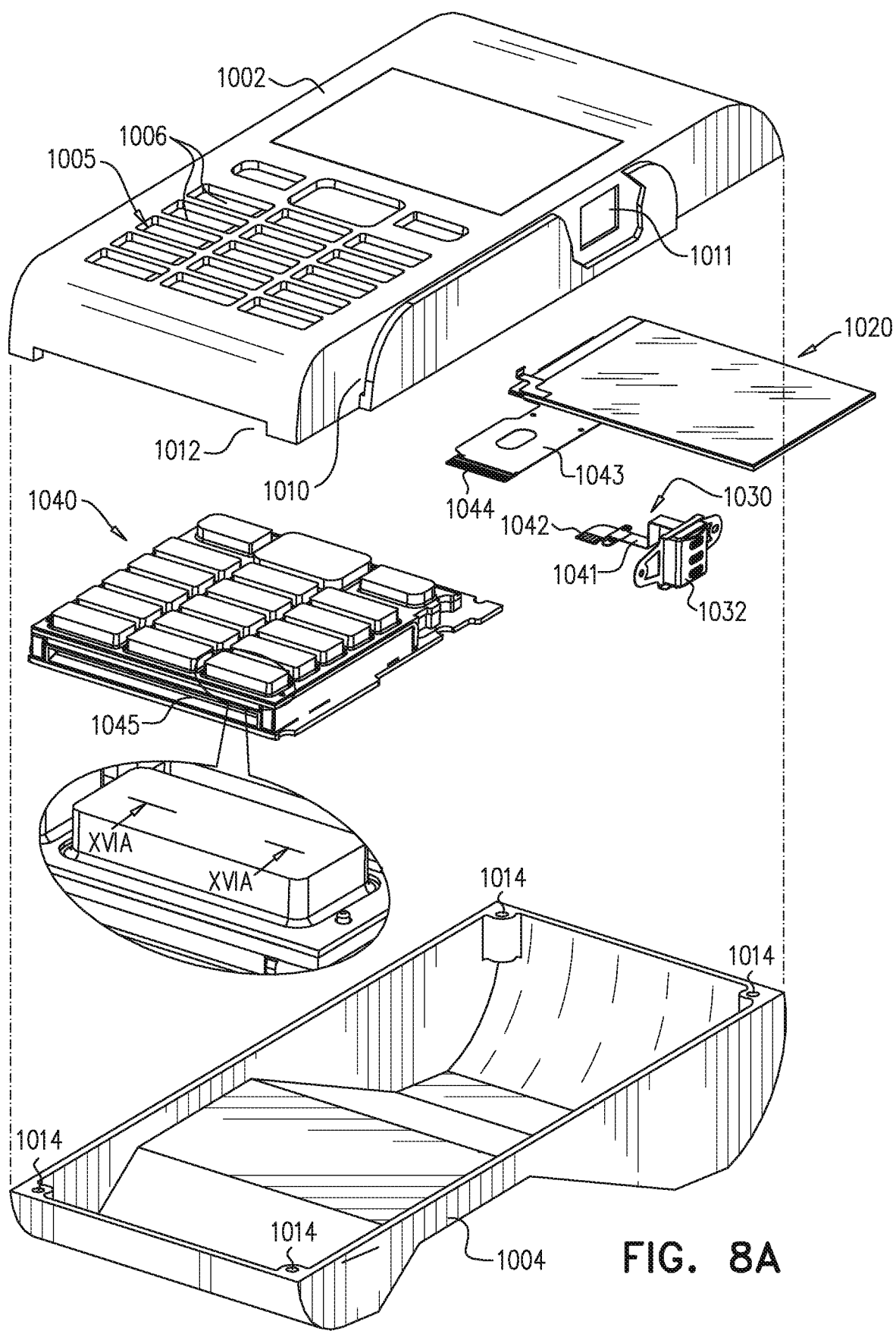
FIGS. 8A and 8B are simplified pictorial exploded view illustrations of a smart card data entry device constructed and operative in accordance with a preferred embodiment of the present invention, taken in respective downward and upward facing directions.
Figure 8B:
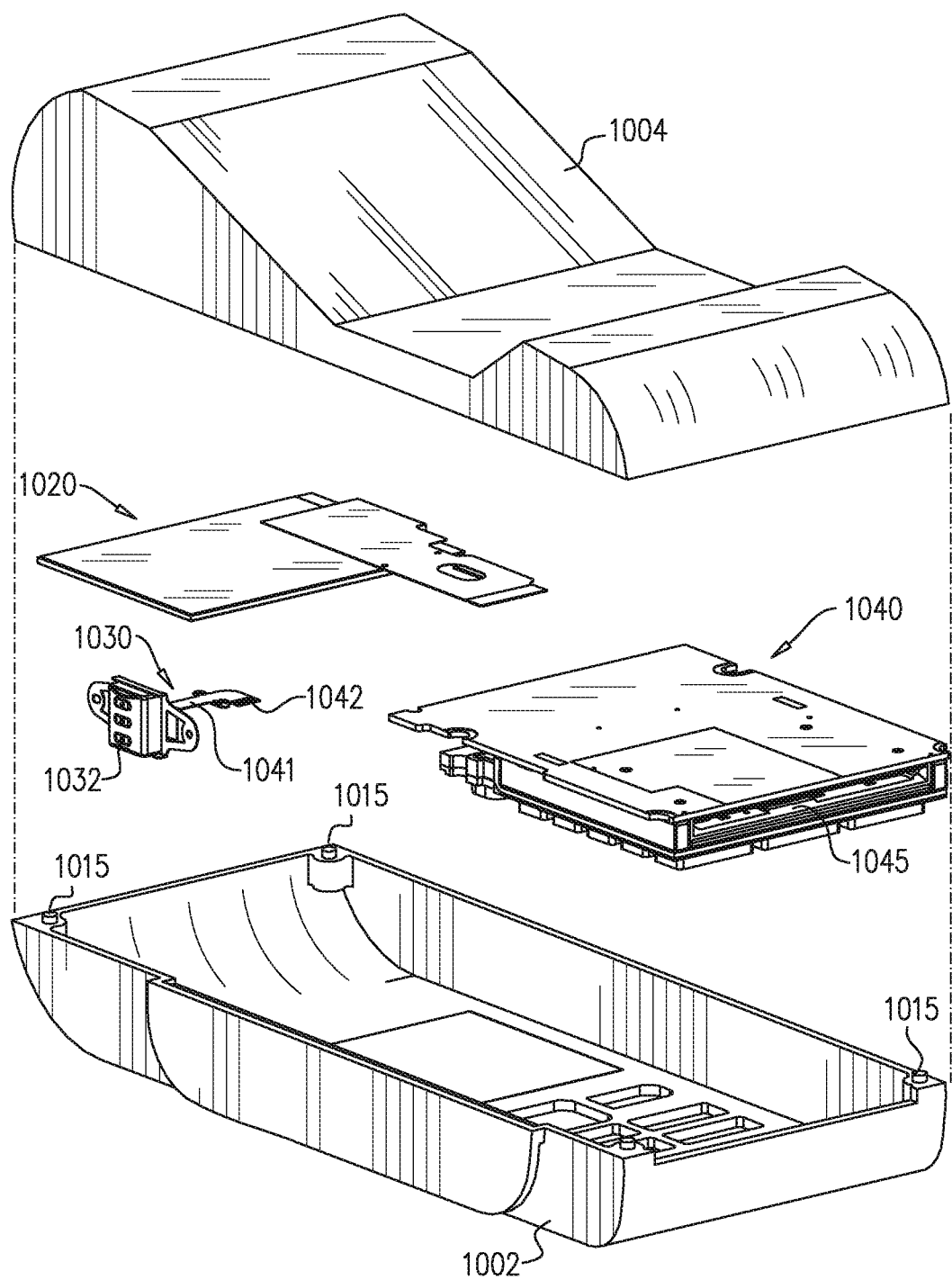

Reference is now made to FIGS. 8A and 8B, which are simplified pictorial exploded view illustrations of a machine readable card data entry device constructed and operative in accordance with another preferred embodiment of the present invention, taken in respective downward and upward facing directions, to FIG. 8C, which is an assembled view of the machine readable card data entry device, and to FIG. 8D, which is a simplified sectional illustration of the machine readable card data entry device of FIGS. 8A-8C.

As seen in FIGS. 8A-8D, the machine readable card entry data entry device preferably comprises a housing 1000 including a top housing portion 1002 and a bottom housing portion 1004. Top housing portion 1002 preferably defines an array 1005 of key apertures 1006. Top housing portion 1002 preferably defines a magnetic card reading slot 1010 and an aperture 1011 communicating with slot 1010. Top and bottom housing portions preferably together define a smart card reading slot 1012. Bottom housing portion 1004 defines a plurality of sockets 1014. Top housing portion 1002 defines a plurality of downward facing bosses 1015, which engage sockets 1014.

Located within housing 1000 is an LCD assembly 1020. LCD assembly 1020 may optionally include a touchscreen panel, such as a LCM260-002-01-A, manufactured by GIANTPLUS TECHNOLOGY CO., LTD, 15 Industrial Road, Toufen, Miauli, Taiwan.

Also located within housing 1000, adjacent slot 1010, is a magnetic card reader subassembly 1030. Magnetic card reader subassembly 1030 preferably comprises a magnetic card reader head 1032, typically a MSR252-011-01-A, manufactured by APOLLO (ZHUHAI) ELECTRONICS CO, Apollo Bldg., Lan-pu Industrial Area E, Jiuzhou Rd, Zhuhai, China, which is mounted into aperture 1011.

Additionally located within housing 1000 and preferably mounted onto top housing portion 1002, as seen particularly in FIG. 8D, is a security volume assembly 1040, which is described hereinbelow with reference to FIGS. 9A-12E. Located within security volume assembly 1040 and forming part thereof is a smart card connector assembly, various embodiments of which are described hereinabove with reference to FIGS. 5A-7C.

There is provided an electrical connection between magnetic card reader subassembly 1030, typically via a flexible cable 1041 and a connector 1042, and circuitry located within security volume assembly 1040. There is also provided an electrical connection between LCD assembly 1020, typically via a flexible cable 1043 and a connector 1044, and circuitry located within security volume assembly 1040.

It is appreciated that a smart card to be read may be inserted via slit 1012 into operative engagement with an interior of the security volume assembly. Slot 1012 is aligned with a corresponding smart card read/write slot 1045 formed in assembly 1040.

Reference is now made to FIGS. 9A and 9B, which are simplified exploded view illustrations of security volume assembly 1040, forming part of the machine readable card data entry device of FIGS. 8A & 8B, taken in respective downward and upward facing directions.

As seen in FIGS. 9A and 9B, the security volume assembly 1040 comprises a keypad element 1050, preferably formed of a resilient material, such as rubber. Keypad element 1050 is preferably a unitary element which defines, on a top surface 1051 thereof, an array 1052 of displaceable keys 1053 which are configured to extend through corresponding array 1005 of key apertures 1006 (FIG. 8A) on top housing element 1002. Each of displaceable keys 1053 is preferably formed with an underside surface 1055.

Security volume assembly 1040 optionally also includes an apertured light guide element 1060 having apertures 1065 for accommodating keys 1053.

Security volume assembly 1040 preferably additionally includes a folded flexible PCB 1070, which is described hereinbelow in detail with reference to FIGS. 11-12C. Underlying folded flexible PCB 1070 is a dome assembly 1080, which is described hereinbelow in detail with reference to FIGS. 13A and 13B. Underlying dome assembly 1080 is a protrusion array element 1090. Protrusion array element 1090 includes an array of protrusions 1092 extending upwardly, in the sense of FIG. 9A, from a corresponding array of recessed surfaces 1094 arranged with respect to a generally planar surface 1096. A plurality of case open switch pins 1098 extend downwardly, in the sense of FIG. 9A, from a downwardly facing planar surface 1099 of element 1090.

Folded flexible PCB 1070, dome assembly 1080 and protrusion array element 1090 are mounted onto a frame 1100, which surrounds a smart card connector 1110, by folding and wrapping flexible PCB 1070 over frame 1100 with dome assembly 1080 and protrusion array 1090 being located and retained between folded flexible PCB 1070 and frame 1100. As noted above, smart card connector 1110 may be any suitable smart card connector, such as those described hereinabove with reference to FIGS. 5A-7C.

Frame 1100 and smart card connector 1110 are preferably mounted onto a printed circuit board 1120, which is illustrated in FIG. 15.

Figure 10B:
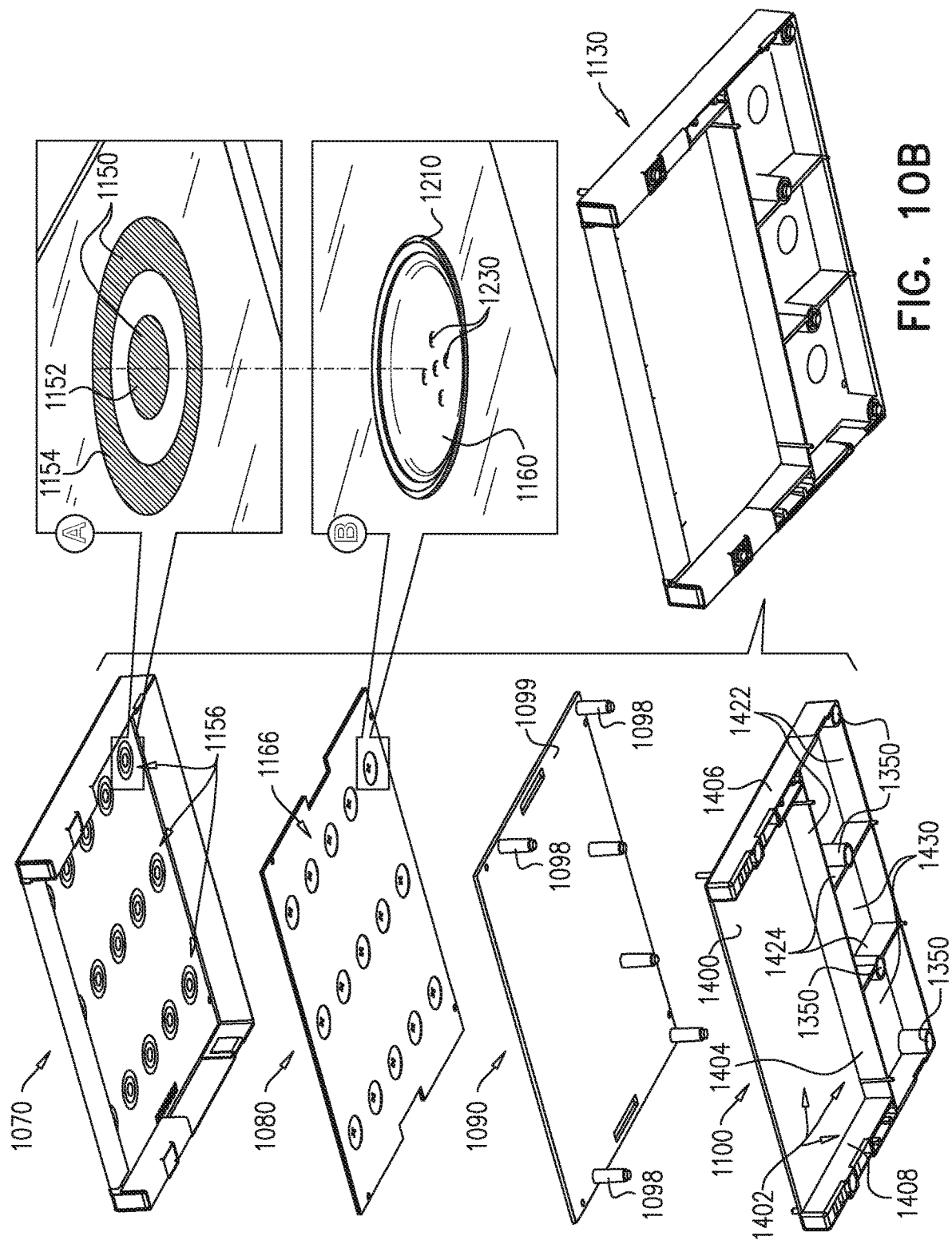

Reference is now made to FIGS. 10A and 10B, which are simplified exploded view illustrations of a subassembly 1130 of the security volume assembly 1040 of FIGS. 9A & 9B, taken in respective downward and upward facing directions. It is seen that subassembly 1130 comprises folded flexible PCB 1070, dome assembly 1080 and protrusion array element 1090, which are together mounted onto frame 1100.

An enlargement A in FIG. 10B shows an entry key contact pad pair 1150, including a conductive disk 1152 and a conductive ring 1154, surrounding and insulated from disk 1152. The entry key contact pad pair 1150 forms part of an array 1156, which is located on a downward facing surface of folded flexible PCB 1070.

An enlargement B in FIG. 10B shows a dimpled dome 1160 having a concave overall configuration, as seen in an upward facing view, when a corresponding key is not depressed. Dome 1160 forms part of an array 1166, which forms part of dome assembly 1080.

Figure 12A:
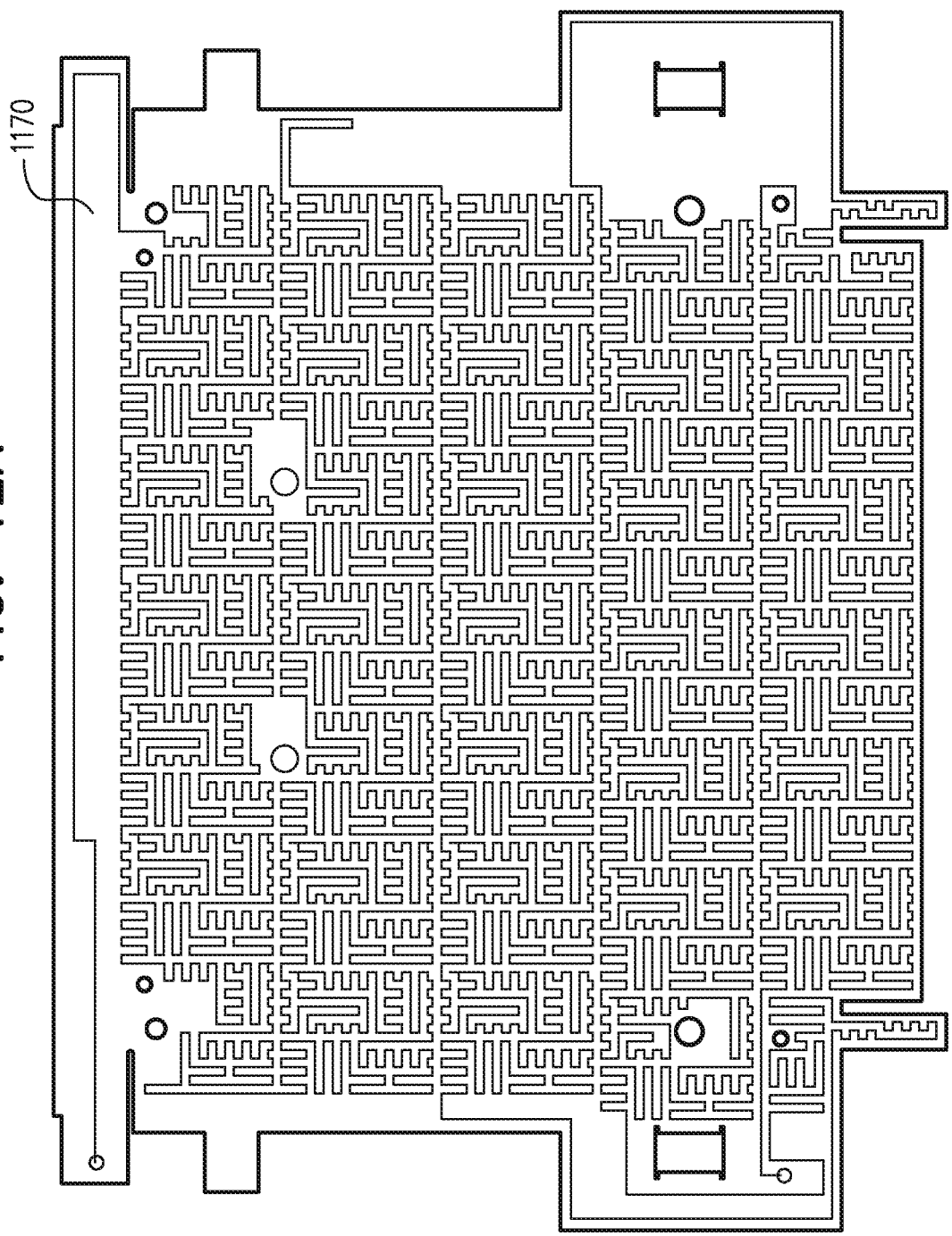
FIGS. 12A, 12B and 12C are simplified planar illustrations of the layers of the subsequently folded element of FIG. 11.
Figure 12B:
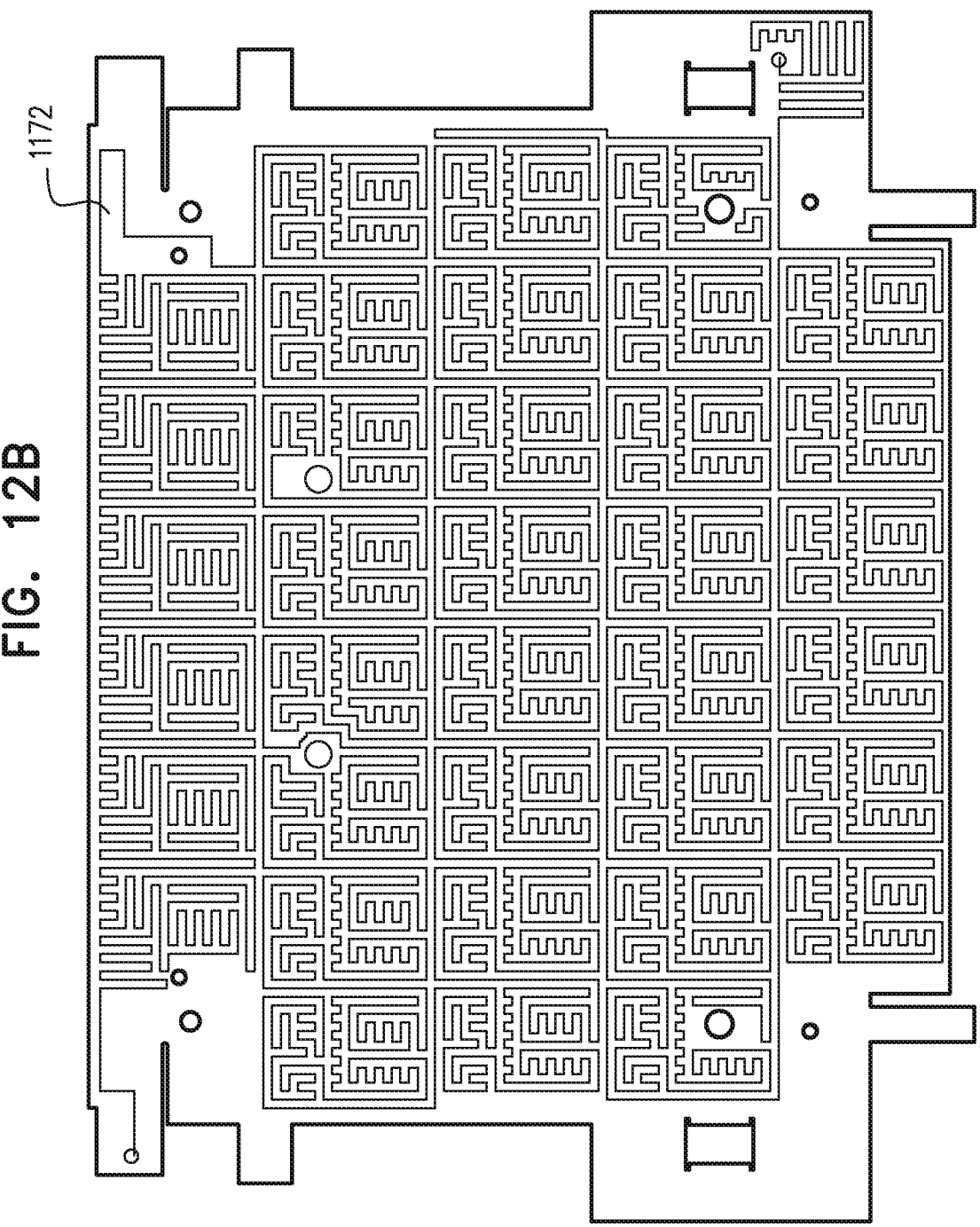

Reference is now made to FIG. 11, which is a simplified exploded view generalized illustration of a subsequently folded flexible PCB 1070 forming part of the subassembly of FIGS. 10A & 10B and to FIGS. 12A, 12B and 12C, which are simplified planar illustrations of the layers of the subsequently folded flexible PCB 1070 of FIG. 11.

As seen generally in FIG. 11, the subsequently folded flexible PCB 1070 includes first and second anti-tamper mesh layers, here designated by reference numerals 1170 and 1172, which overlie contact pad layer 1174. It is seen that contact pad layer 1174 includes downwardly-facing array 1156 of entry key contact pad pairs 1150. It is appreciated that the mesh configurations of the first and second anti-tamper mesh layers 1170 and 1172 are preferably as shown generally in FIGS. 12A and 12B respectively.

Each of protective anti-tamper meshes 1170 and 1172 is preferably formed of a dense array of conductors, which are coupled to tamper detection and alarm circuitry 1175 on printed circuit board 1120 (FIG. 15). Preferably one of the anti-tamper meshes 1170 and 1172 may be connected to ground, while the other of the anti-tamper meshes 1170 and 1172 may be coupled to a voltage other than ground and preferably carries an anti-tamper signal.

Figure 12C:
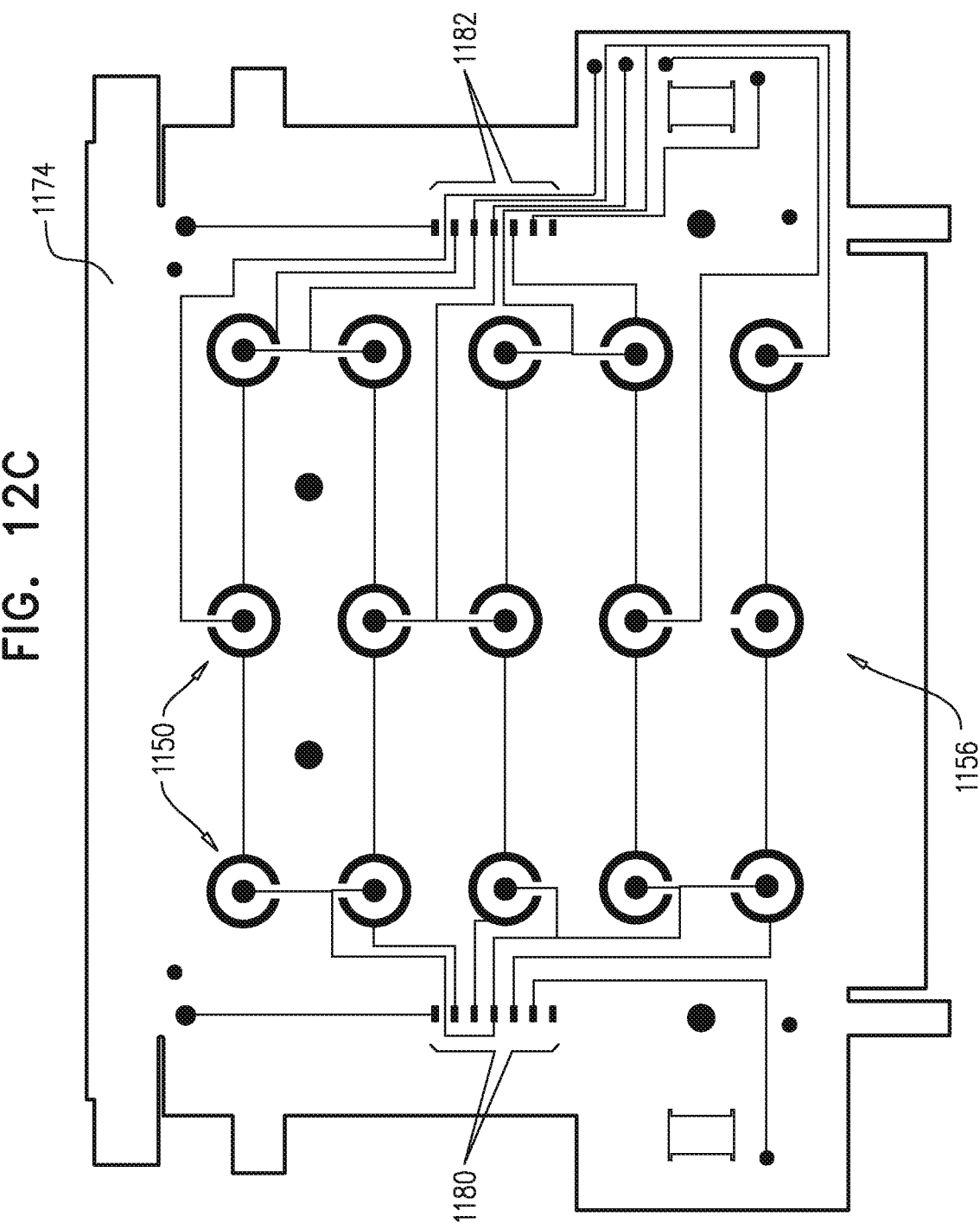

Turning now to FIG. 12C, it is seen that entry key contact pad pairs 1150 of downwardly-facing array 1156 are connected to zebra connector contacts 1180 and 1182, which are engaged by corresponding zebra connectors 1190 and 1192 mounted on printed circuit board 1120 (FIG. 15).

Figure 13A:
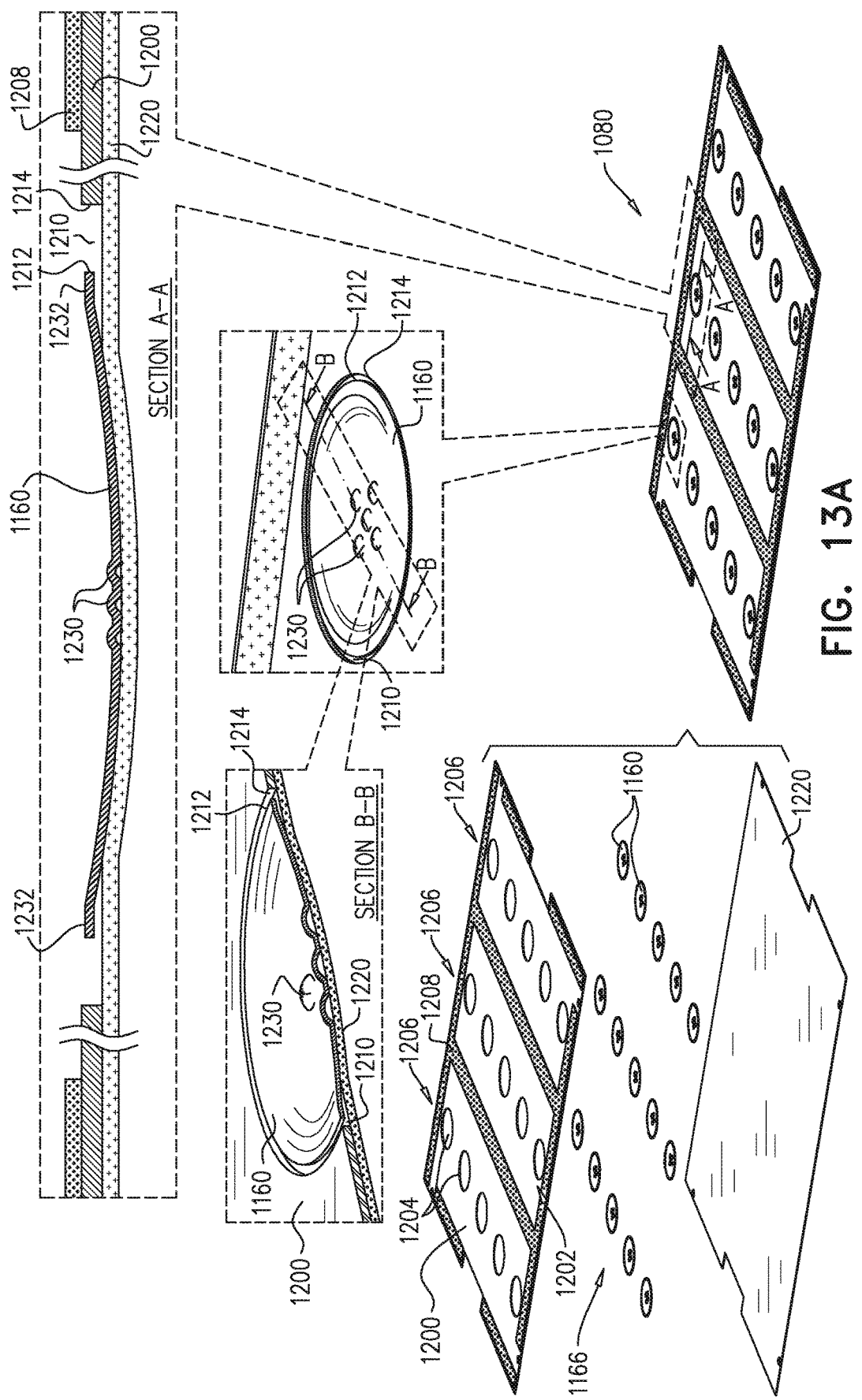
FIG. 13A is a simplified illustration of a subassembly of the dome assembly shown in FIGS. 9A and 9B and includes a downward-facing assembled view and corresponding sectional and exploded views.
Figure 13B:
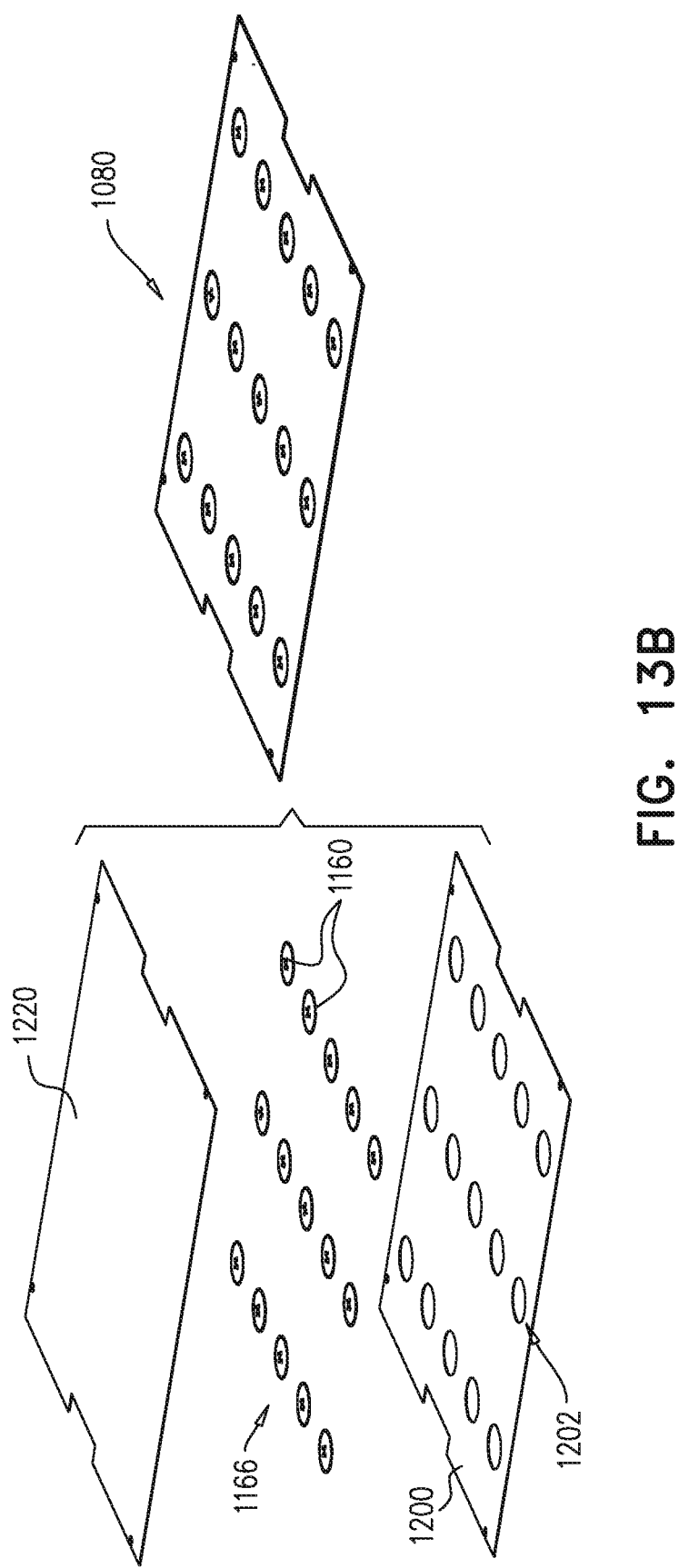
FIG. 13B is a simplified illustration of a subassembly of the dome assembly shown in FIGS. 9A and 9B and includes an upward facing assembled view and a corresponding exploded view.

Reference is now made to FIG. 13A, which is a simplified illustration of a subassembly of the dome assembly 1080 of FIGS. 9A and 9B and includes a downward-facing assembled view and corresponding sectional and exploded views as well as enlargements, and to FIG. 13B, which is a simplified illustration of a subassembly of the dome assembly 1080 and includes an upward facing assembled view and a corresponding exploded view.

As seen in FIGS. 13A and 13B, the dome assembly 1080 preferably includes an apertured plastic sheet 1200, typically formed of PET and having an array 1202 of apertures 1204 whose locations generally correspond to those of keys 1053 (FIG. 9A). Array 1202 preferably includes three rows 1206 of apertures 1204. Strips 1208 of double sided adhesive are preferably located between rows 1206 and along most of the periphery of apertured plastic sheet 1200. Strips 1208 are operative to attach the dome assembly 1080 to the underside of flexible PCB 1070 at locations intermediate and peripherally of rows of entry key contact pad pairs 1150 (FIGS. 10A and 10B).

Preferably, each of apertures 1204 is centered about a location of the center of a corresponding entry key contact pad pair 1150 and is centered about a location of the center of a corresponding protrusion 1092 (FIG. 9A).

Dimpled domes 1160 of array 1166 (FIG. 10A) are each arranged in a corresponding aperture 1204 and are centered with respect thereto, thereby preferably defining a circumferential gap 1210 between a circumferential edge 1212 of each dome and a corresponding circumferential edge 1214 of each corresponding aperture 1204 in apertured plastic sheet 1200.

Dimpled domes 1160 are supported onto apertured plastic sheet 1200 by a layer 1220 of adhesive. As seen clearly in a sectional enlargement forming part of FIG. 13A, each of domes 1160 is generally concave as viewed from above and includes a plurality of upwardly facing dimples 1230 and a generally flat peripheral rim 1232. Domes 1160 are preferably formed of a conductive metal, such as nickel-plated stainless steel.

Reference is now made to FIGS. 14A, 14B, 14C, 14D, 14E, 14F and 14G, which are simplified illustrations of steps in folding of folded flexible PCB 1070 in various views.

Figure 14A:
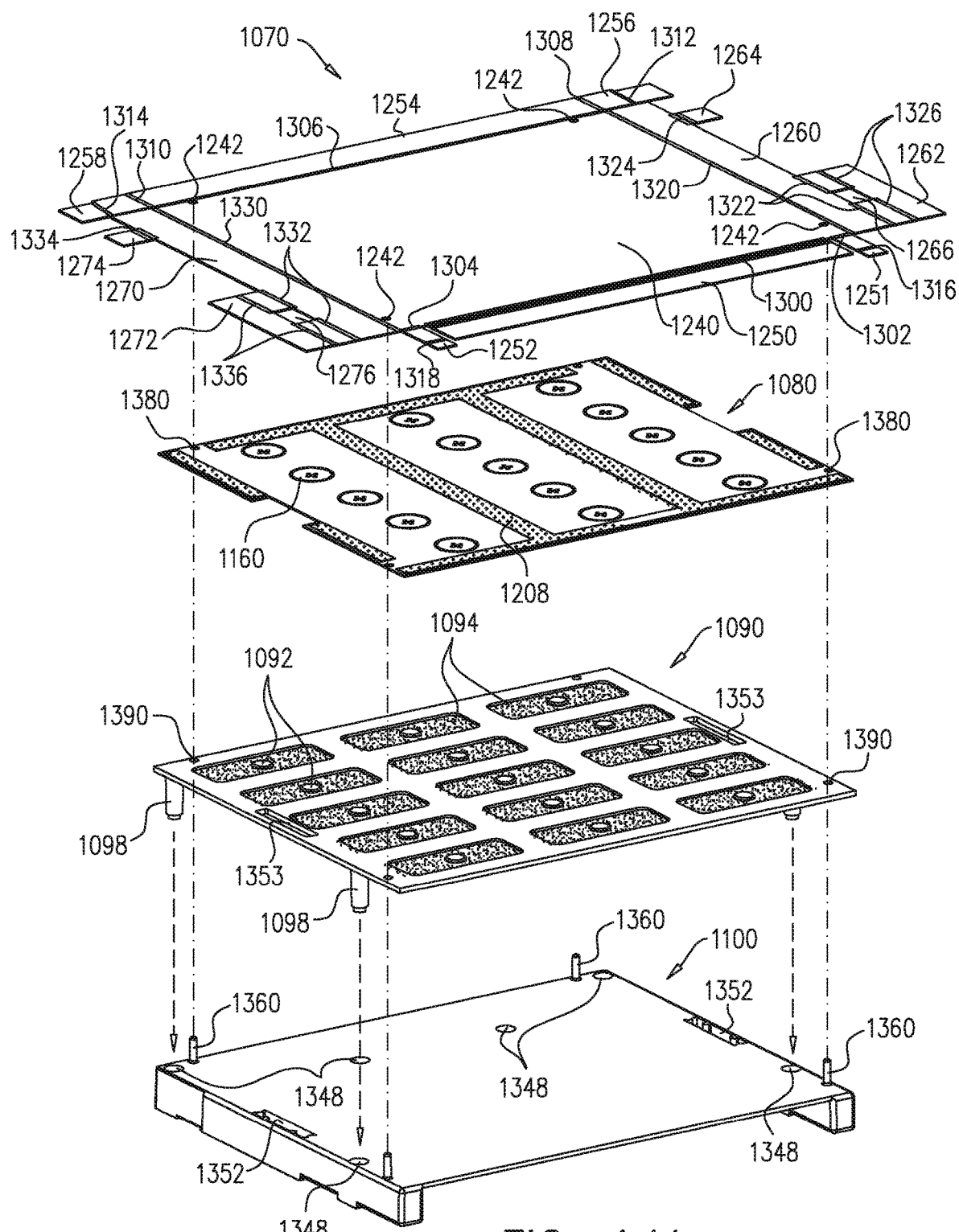

As seen in FIG. 14A, prior to folding, flexible PCB 1070, is a generally flat multi-layer PCB of generally rectangular configuration. The generally flat multi-layer PCB preferably includes a main portion 1240 having formed on an underside surface thereof (in the sense of FIG. 14A) array 1156 of entry key contact pad pairs 1150 (FIG. 10B). Main portion 1240 is formed with a plurality of alignment apertures 1242.

Extending respectively forwardly and rearwardly from main portion 1240 are a forward edge flap 1250, forward edge end flaps 1251 and 1252 and a rearward edge flap 1254, including end flaps 1256 and 1258. Extending from a first side of main portion 1240 is a first side flap 1260, from which extend a first forward side apertured flap 1262 and a first rearward side flap 1264. First forward side apertured flap 1262 defines an aperture 1266. Extending from a second side of main portion 1240 is a second side flap 1270, from which extend a second forward side apertured flap 1272 and a second rearward side flap 1274. Second forward side apertured flap 1272 defines an aperture 1276.

Preferably, extending between main portion 1240 and forward edge flap 1250 is at least one fold line 1300. Preferably, extending between main portion 1240 and forward edge end flaps 1251 and 1252 are respective at least one fold lines 1302 and 1304. Preferably, extending between main portion 1240 and rearward edge flap 1254 is at least one fold line 1306. Preferably, extending between rearward edge flap 1254 and end flaps 1256 and 1258 are respective at least one fold lines 1308 and 1310. Preferably, extending across end flaps 1256 and 1258 are respective at least one fold lines 1312 and 1314. Preferably, extending across forward edge end flaps 1251 and 1252 are respective at least one fold lines 1316 and 1318.

Preferably, extending between main portion 1240 and first side flap 1260 is at least one fold line 1320. Preferably, extending between first side flap 1260 and first forward side apertured flap 1262 is at least one fold line 1322. Preferably extending between first side flap 1260 and first rearward side flap 1264 is at least one fold line 1324. Preferably extending across first forward side apertured flap 1262 at an edge of aperture 1266 is at least one fold line 1326.

Preferably, extending between main portion 1240 and second side flap 1270 is at least one fold line 1330. Preferably, extending between second side flap 1270 and second forward side apertured flap 1272 is at least one fold line 1332. Preferably, extending between second side flap 1270 and second rearward side flap 1274 is at least one fold line 1334. Preferably, extending across second forward side apertured flap 1272 at an edge of aperture 1276 is at least one fold line 1336.

As seen in FIGS. 14A and 14B, main portion 1240 is adhered to contact subassembly 1080 by means of double sided adhesive 1208. Protrusion array element 1090 is mounted onto frame 1100 and aligned therewith by insertion of the plurality of case open switch pins 1098 in corresponding apertures 1348 in frame 1100.

As seen in FIGS. 9B, 10B, 14A and 14D, frame 1100, which partially surrounds smart card connector 1110, also includes a plurality of downwardly directed bosses 1350, each associated with a corresponding aperture 1348. As seen in FIGS. 10A, 14A and 14D, frame 1100 also includes a pair of side apertures 1352 which accommodate zebra connectors 1190 and 1192, mounted on printed circuit board 1120 (FIG. 9A).

Figure 14C:
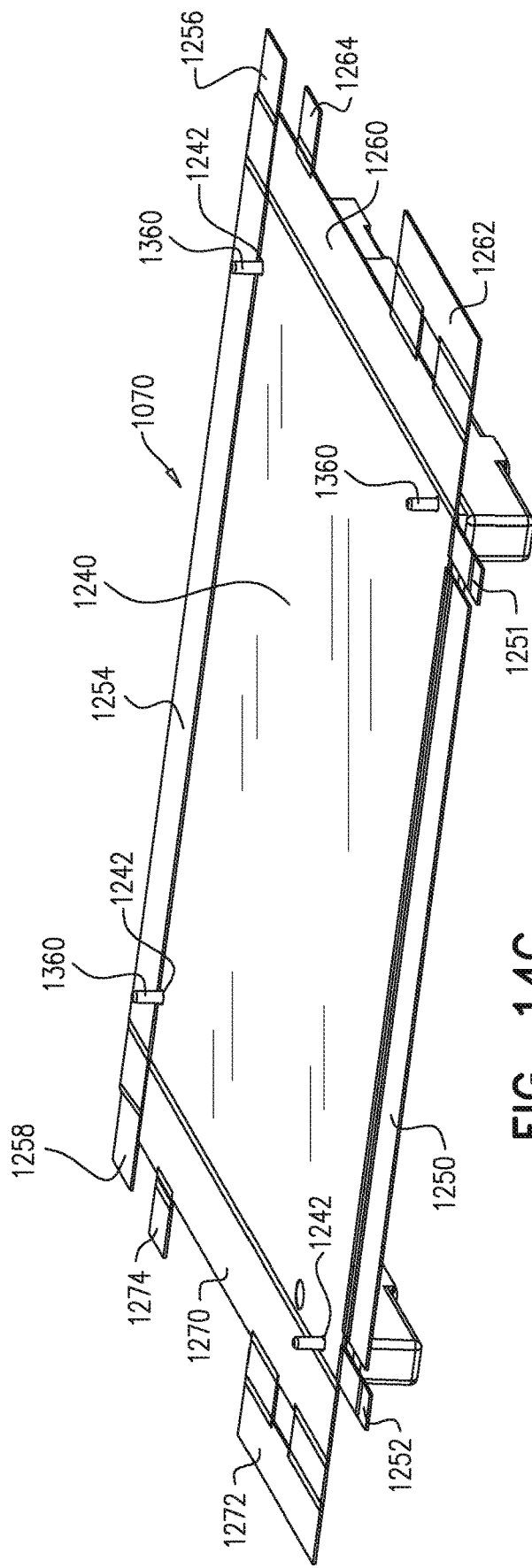

Frame 1100 also includes four upwardly directed alignment pins 1360 which serve to mutually align flexible PCB 1070, contact subassembly 1080 and protrusion array element 1090 with frame 1100, by extending through respective apertures 1242, 1380 and 1390 formed in flexible PCB 1070, contact subassembly 1080 and protrusion array element 1090 respectively, as seen in FIGS. 14A-14C.

As seen particularly in FIGS. 9B, 10B and 14D, an underside of frame 1100 includes a generally flat main portion 1400 surrounded on three sides by a U-shaped support portion 1402, including a central portion 1404 and a pair of arms 1406 and 1408, extending perpendicularly therefrom. Arms 1406 and 1408 are each formed with a corresponding downwardly directed boss 1350, each associated with a corresponding aperture 1348.

U-shaped support portion 1402 has a generally recessed flat bottom surface 1420, surrounded by an upstanding peripheral wall 1422. Anti-tamper meshes 1170 and 1172, forming part of flexible PCB 1070 (FIG. 9A), peripheral wall 1422, a plurality of internal walls 1424 and the anti-tamper mesh 1426 on the printed circuit board 1120 (FIG. 15) define a number of protected enclosures 1430 in which various electronic components mounted on or connected to the printed circuit board 1120 (FIG. 15), such as magnetic stripe reader connector 1042 and corresponding connector 1432 (FIG. 15), LCD connector 1044 and corresponding connector 1434 (FIG. 15), main processor 1436 and memory 1438, which may contain highly sensitive information, such as encryption keys, and tamper detection and alarm circuitry 1175 may be located.

It is appreciated that the anti-tamper mesh 1426 together with anti-tamper meshes 1170 and 1172 provide a protective enclosure which encloses contact subassembly 1080, protrusion array element 1090, frame 1100 and smart card connector 1110. Preferably the protective enclosure entirely encloses the tamper detection switch assembly 1500.

As seen in FIGS. 14D and 14E, preferably forward edge flap 1250, forward edge end flaps 1251 and 1252 and rearward edge flap 1254, including end flaps 1256 and 1258 are folded up over corresponding side edge surfaces of frame 1100.

As seen in FIGS. 14F and 14G, first side flap 1260, first forward side apertured flap 1262, first rearward side flap 1264, second forward side apertured flap 1262, second side flap 1270, second forward side apertured flap 1272, and second rearward side flap 1274 are folded up over corresponding side edge surfaces of frame 1100.

It is seen that apertures 1266 and 1276 are aligned over correspondingly located bosses 1350 and case open switch pins 1098.

Returning to FIG. 15 and particularly to the enlargement therein, there is seen an example of a tamper detection switch assembly 1500, which preferably includes a carbon pill 1502, which is fixed to the bottom of a case open switch pin 1098, and a pair of electrical contacts 1504, formed on printed circuit board 1120, preferably each including a central conductor 1506 and at least one circumferential conductor 1508. Preferably an outer grounded ring 1510 is also provided. It is appreciated that any of conductors 1506, 1508 and 1510 may include plural segmented portions (not shown).

When the housing is closed and top housing portion 1002 and bottom housing portion 1004 are fully engaged, carbon pills 1502, fixed to the bottom surfaces of case open switch pins 1098, are positioned so as to short circuit respective electric central conductors 1506 and respective at least one circumferential conductors 1508. Alternatively, carbon pills 1502 may be replaced by deformable conductive domes.

In accordance with a preferred embodiment of the present invention, the protective anti-tamper mesh 1426 of printed circuit board 1120 is formed with a dense array of conductors side by side and is connected to alarm circuitry 1175, described hereinbelow.

It is a particular feature of an embodiment of the present invention that the tamper detection switch assembly 1500 and specifically the case open switch pins 1098 are entirely enclosed by anti-tamper meshes. This structure is realized by constructing case open switch pins 1098 as part of the protrusion array element 1090, which is located below contact subassembly 1080 of the security volume assembly 1040 of FIGS. 9A & 9B. In this case, the tamper detection switch assembly is not part of the keypad element 1050.

Tamper detection and alarm circuitry 1175 may be conventional circuitry which provides an alarm, such as an audio or visually sensible alarm, in response to sensed detection of tampering, evidenced, for example by a short circuit or an open circuit in one or more protective mesh, such as mesh 1426. Tamper detection and alarm circuitry 1175 may also be responsive to tampering for erasing sensitive information and disabling communication of sensitive information.

Preferably, printed circuit board 1120 is also formed with a plurality of apertures 1550 for precise parallel spacing between smart card connector assembly 1110 and printed circuit board 1120.

Reference is now made to FIGS. 16A & 16B, which are simplified illustrations of key engagement operation of the smart card data entry device of FIGS. 8A-14E wherein FIG. 16A shows a key-not depressed operative orientation and FIG. 16B shows a key depressed operative orientation.

FIGS. 16A and 16B are taken along lines XVIA-XVIA in FIG. 8A but do not include smart card connector 1110 and printed circuit board 1120.

Turning initially to FIG. 16A, it is seen that in a key-not depressed operative orientation, underside surface 1055 of key 1053 is vertically (in the sense of FIGS. 16A & 16B) spaced from flexible PCB 1070 and thus conductive disk 1152 is vertically spaced from dome 1160 and more particularly from dimples 1230. Accordingly, there is no electrical contact between conductive disk 1152 and conductive ring 1154. Dome 1160 is concave when viewed from above, as seen in FIG. 13A. Typically dome 1160 and its underlying adhesive layer 1220 lies on a top surface of protrusion 1092.

In the key-depressed operative orientation shown in FIG. 16B, it is seen that in a key-depressed operative orientation, underside surface 1055 of key 1053 is vertically (in the sense of FIGS. 16A & 16B) depressed downwardly into downward pushing engagement with flexible PCB 1070, thereby pressing the flat peripheral rim 1232 of the dome 1160 downward in electrical contact with conductive ring 1154, thus causing conductive disk 1152 to form an electrical connection with dome 1160 and more particularly with dimples 1230. Accordingly, there is formed an electrical connection between conductive disk 1152 and conductive ring 1154. The dome 1160 is now seen to be convex at its center when viewed from above due to engagement of the top surface of protrusion 1092 with dome 1160. It is appreciated that the pushing engagement need not be direct touching engagement with the dome, such as in the illustrated embodiment wherein engagement with the dome is via its underlying adhesive layer 1220.

It will be appreciated by persons skilled in the art that the present invention is not limited by what has been particularly shown and described hereinabove. Rather the scope of the present invention includes combinations and subcombinations of features described above as well as modifications and improvements thereof that are not in the prior art.

The invention claimed is:

1. A key entry device comprising:
    a housing;
    a keypad array disposed within said housing and including a plurality of keys;
    a key contact array disposed within said housing below said keypad array and including a plurality of contact pairs, each aligned with one of said plurality of keys;
    a dome array underlying said keypad array and said key contact array and including a plurality of domes, each aligned with one of said plurality of keys and one of said plurality of contact pairs; and
    a protective enclosure comprising at least one anti-tamper mesh surrounding said key contact array and said dome array.

2. The key entry device according to claim 1 and wherein said key contact array is formed on a flexible printed circuit substrate and underlies at least one anti-tamper mesh.

3. The key entry device according to claim 2 and wherein said at least one anti-tamper mesh is also formed on said flexible printed circuit substrate.

4. The key entry device according to claim 1 wherein said at least one anti-tamper mesh comprises a plurality of anti-tamper meshes.

5. The key entry device according to claim 1 and also comprising a plurality of case open switch assemblies located entirely within said protective enclosure and protected thereby.

6. The key entry device according to claim 1 and also comprising a protrusion array underlying said dome array and including a plurality of protrusions, each aligned with one of said domes, whereby depression of one of said plurality of keys of said keypad array causes a corresponding one of said domes of said dome array to be displaced downwardly and to be deformed by pushing engagement with a corresponding one of said protrusions of said protrusion array into contact with at least one of said contact pairs of said key contact array.

7. The key entry device according to claim 6 and wherein said depression of one of said plurality of keys causes a corresponding portion of said dome array to be displaced towards a corresponding portion of said protrusion array.

8. The key entry device according to claim 6 and wherein said depression of one of said plurality of keys causes an underside surface of said one of said plurality of keys to be depressed downwardly into downward pushing engagement with a corresponding contact pair of said key contact array, thereby pressing a flat peripheral rim of a corresponding one of said plurality of domes downward in electrical contact with a conductive ring, being a first one of said contact pair, thus causing a conductive disk, being a second one of said contact pairs, to form an electrical connection with said one of said plurality of domes, thereby forming an electrical connection between said conductive disk and said conductive ring.

9. The key entry device according to claim 6 and wherein said one of said plurality of domes is thereby deformed to be convex at its center when viewed from above due to engagement of a top surface of said one of said protrusions with said one of said domes.

10. The key entry device according to claim 1 and wherein said protective enclosure also surrounds said protrusion array.

11. The key entry device according to claim 5 and wherein said plurality of case open switch assemblies includes elements integrally formed with said protrusion array.

12. The key entry device according to claim 11 and wherein said elements are directed in a direction opposite to a direction of said protrusions.

13. The key entry device according to claim 1 and wherein at least one of said plurality of domes has a generally concave orientation as viewed from above prior to key depression and has an at least partially convex orientation as viewed from above upon key depression.

* * * * *